(12) United States Patent
Zhang et al.

(10) Patent No.: US 12,112,014 B2
(45) Date of Patent: Oct. 8, 2024

(54) WIDGET DISPLAY METHOD AND ELECTRONIC DEVICE

(71) Applicant: HUAWEI TECHNOLOGIES CO., LTD., Guangdong (CN)

(72) Inventors: Yanan Zhang, Shenzhen (CN); Hongjun Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/261,115

(22) PCT Filed: Jan. 5, 2022

(86) PCT No.: PCT/CN2022/070340
§ 371 (c)(1),
(2) Date: Jul. 12, 2023

(87) PCT Pub. No.: WO2022/152024
PCT Pub. Date: Jul. 21, 2022

(65) Prior Publication Data
US 2024/0077987 A1    Mar. 7, 2024

(30) Foreign Application Priority Data
Jan. 18, 2021   (CN) .......................... 202110063910.4

(51) Int. Cl.
*G06F 3/04817*   (2022.01)
*G06F 3/0488*    (2022.01)
*G06F 9/451*     (2018.01)

(52) U.S. Cl.
CPC ........ *G06F 3/04817* (2013.01); *G06F 3/0488* (2013.01); *G06F 9/451* (2018.02)

(58) Field of Classification Search
None
See application file for complete search history.

(56) References Cited

U.S. PATENT DOCUMENTS

2012/0236037 A1* 9/2012 Lessing ................. G06F 3/0485
345/661
2013/0159941 A1* 6/2013 Langlois ............. H04M 1/7243
715/863

(Continued)

FOREIGN PATENT DOCUMENTS

| CN | 104598104 A | 5/2015 |
| CN | 109814766 A | 5/2019 |
| CN | 111240789 A | 6/2020 |

*Primary Examiner* — Toan H Vu
(74) *Attorney, Agent, or Firm* — HUAWEI TECHNOLOGIES CO., LTD.

(57) ABSTRACT

This application provides a widget display method applied to an electronic device, and the method includes: displaying, in a first area of a first page of a home screen, a first widget that has a first size; in response to detecting that an ongoing task exists in a first application, simultaneously displaying, in the first area, a widget of the first application and the first widget with the size reduced, where the widget of the first application displays first content, the widget of the first application has a second size, and the second size is less than the first size; and in response to the fact that the electronic device meets a preset condition, enlarging the size of the widget of the first application, where the enlarged widget displays more content than the first content. This application provides a widget display method and an electronic device, to improve user experience.

20 Claims, 87 Drawing Sheets

(56) References Cited

U.S. PATENT DOCUMENTS

| | | | |
|---|---|---|---|
| 2014/0096046 A1* | 4/2014 | Zhong | G06F 3/0481 |
| | | | 715/765 |
| 2014/0304651 A1* | 10/2014 | Johansson | G06F 3/04883 |
| | | | 715/810 |
| 2016/0077720 A1* | 3/2016 | Park | G06F 3/04883 |
| | | | 715/765 |
| 2018/0367489 A1* | 12/2018 | Dye | G06F 3/04817 |

* cited by examiner

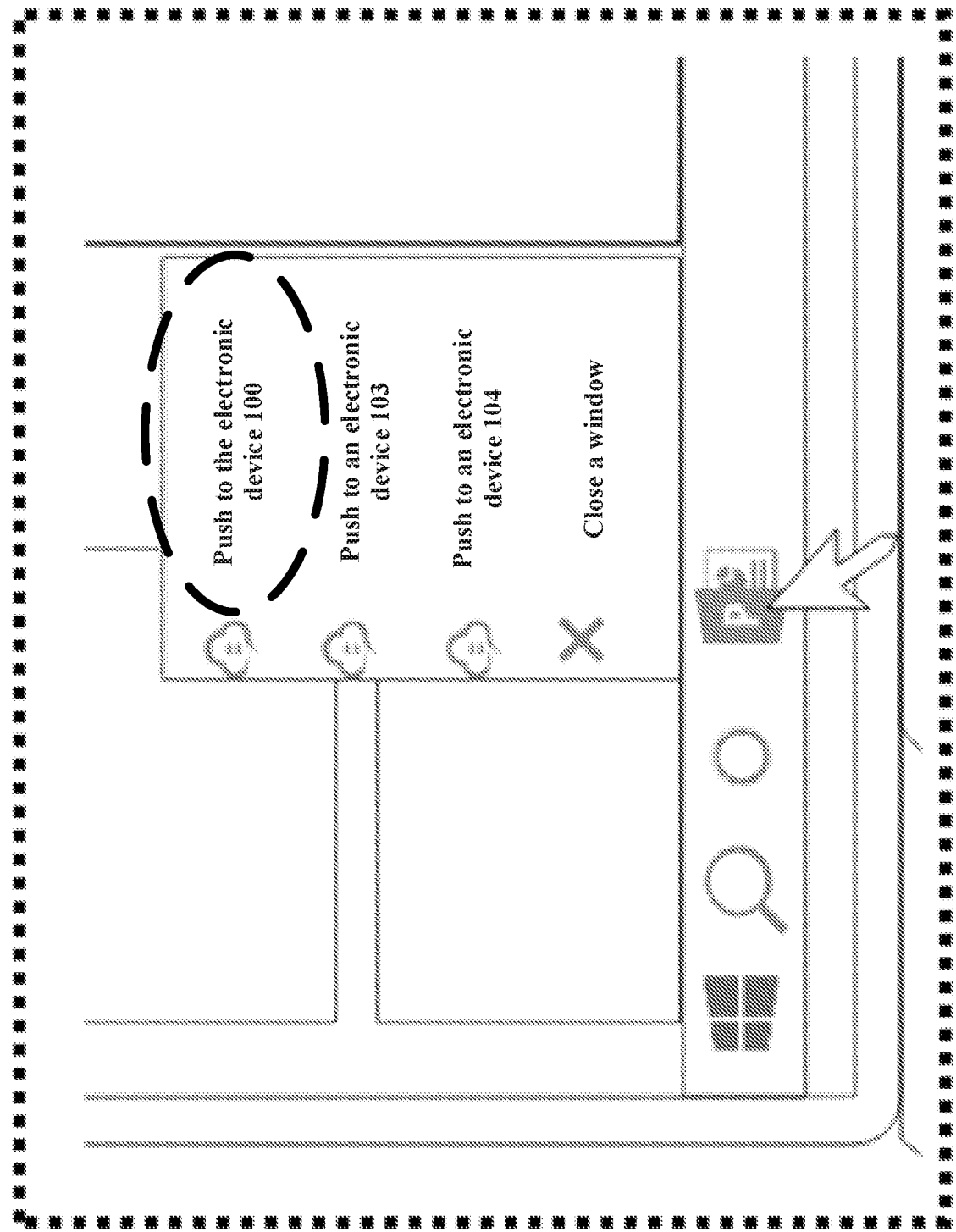

WIDGET DISPLAY METHOD AND ELECTRONIC DEVICE

This application is a National Stage of International Application No. PCT/CN2022/070340, filed on Jan. 5, 2022, which claims priority to Chinese Patent 202110063910.4, filed on Jan. 18, 2021. Both of the aforementioned applications are hereby incorporated by reference in their entireties.

TECHNICAL FIELD

This application relates to the field of electronic devices, and more specifically, to a widget display method and an electronic device.

BACKGROUND

A mobile phone is used as an example. A widget can enrich a home screen of the mobile phone, and provides information required by a user, thereby effectively utilizing a spatial location of a touchscreen. For example, the user may add a music widget on the home screen of the mobile phone, and by using the music widget on the home screen, the user may control playing music, pausing music, playing a previous song, playing a next song, and the like. The user can also add a calendar widget to the home screen when the user expects to know calendar information. However, the user needs to manually add the widget to the home screen each time, resulting in a tedious and complex operation and poor user experience.

SUMMARY

This application provides a widget display method and an electronic device, to help improve user experience.

According to a first aspect, a widget display method applied to an electronic device is provided. The method includes: displaying, in a first area of a first page of a home screen, a first widget that has a first size; in response to detecting that an ongoing task exists in a first application, simultaneously displaying, in the first area, a widget of the first application and the first widget with the size reduced, where the widget of the first application displays first content, the widget of the first application has a second size, and the second size is less than the first size; and in response to the fact that the electronic device meets a preset condition, adjusting the size of the widget of the first application from the second size to the first size, where the widget that is of the first application and that has the first size displays second content, the second content is more than the first content, and the second content includes the first content.

When detecting that the ongoing task (ongoing task) exists in the first application, the electronic device can automatically display the widget of the first application on the home screen of the device, and display the widget in an area that is on a graphical interface and in which the first has been displayed. This implements automatic addition of the widget, and a location of the first display can also be reused. Screen space of the electronic device is limited. The location of the first widget is reused, so that the home screen can be clean and tidy, the widget does not need to be added at a new location, and information that is required by a user and has a higher priority can be provided for the user.

The electronic device may detect a scenario change, to adjust the size of the widget and/or the content displayed by the widget, and/or a layout of the content displayed by the widget, so as to provide the user with more information, facilitate interaction with the user, and improve user experience.

With reference to the first aspect, in some possible implementations of the first aspect, when the first application is a schedule application, a manner of detecting that an ongoing task exists in the first application is one or a combination of several of the following manners: determining, by identifying schedule content in the schedule application, that a time difference between system time of the electronic device and time in the schedule content is less than a first time threshold; or determining, by identifying schedule content in the schedule application, that a distance difference between a geographical location of the electronic device and a geographical location in the schedule content is less than a first distance threshold.

With reference to the first aspect, in some possible implementations of the first aspect, the preset condition is one or a combination of a plurality of the following conditions: determining that the time difference between the system time of the electronic device and the time in the schedule content is less than a second time threshold, where the second time threshold is less than the first time threshold; or determining that the distance difference between the geographical location of the electronic device and the geographical location in the schedule content is less than a second distance threshold, where the second distance threshold is less than the first distance threshold.

With reference to the first aspect, in some possible implementations of the first aspect, when the widget of the first application and the first widget with the size reduced are simultaneously displayed, the method further includes: detecting a pinch gesture, wherein a first contact point of the pinch gesture is in contact with the widget of the first application, and a second contact point of the pinch gesture is in contact with the first widget; and in response to the pinch gesture, combining the widget of the first application and the first widget into a first composite widget for displaying in the first area.

A user may perform function fusion on different widgets by using the composite widget. When any widget meets a trigger condition for displaying on the home screen, the home screen displays the composite widget, and the user does not need to manually trigger generation of another widget. The electronic device can intelligently push the widget to the user based on the user operation (pinch and combine the widget), which is more intelligent.

With reference to the first aspect, in some possible implementations of the first aspect, when the widget of the first application and the first widget with the size reduced are simultaneously displayed, the method further includes: detecting that an ongoing task exists in a media application, stopping displaying the first widget, and simultaneously displaying the widget of the first application and a widget of the media application in the first area.

After it is detected that the media application is played on the background, the widget generated by the media application is displayed on the home screen, and a user can directly interact with the widget of the application.

With reference to the first aspect, in some possible implementations of the first aspect, the method further includes: detecting that the system time of the electronic device exceeds end time in the schedule content, stopping displaying the widget that is of the first application and that has the first size, and displaying, in the first area, the first widget that has the first size.

The electronic device may stop displaying the schedule widget based on the end time of the schedule, and display another widget on the home screen. The widget displayed on the home screen may be intelligently changed based on a user requirement, to provide a user with content that the user is more concerned about, thereby improving user experience.

With reference to the first aspect, in some possible implementations of the first aspect, the detecting that an ongoing task exists in the schedule application is specifically: detecting, by using a broadcast receiver component in the schedule application, that the ongoing task exists in the schedule application.

With reference to the first aspect, in some possible implementations of the first aspect, the detecting that an ongoing task exists in a first application is specifically: detecting that, on another electronic device, the ongoing task exists in the first application with a same user account logged on to; or after the electronic device is paired with another electronic device, detecting that the ongoing task exists in the first application on the another electronic device.

A user can continue the task in different places by generating the widget of the application across devices. The electronic device may receive the ongoing task in the application on the another electronic device, and display the widget of the application on the home screen. The user can interact with the application between different electronic devices, thereby improving user experience.

With reference to the first aspect, in some possible implementations of the first aspect, the first page is a home page of the home screen; or the first widget is a time weather widget or a calendar widget; or both a 4G signal identifier and a 5G signal identifier are displayed in a notification bar of the screen; or the first area is above the first page; or the first widget is transparent or semi-transparent; or the first application is a calendar application, a memo application, or a reminders application; or the first application is an audio application or a video application; or the ongoing task is playing music, the first content is a song name, a singer, a playing/pausing control, a next song playing control, and a previous song playing control, and the second content is the song name, the singer, the playing/pausing control, the next song playing control, the previous song playing control, a favorites control, and a playing mode switching control; or the ongoing task is a travel task, the first content is departure time, a train number, a departure station, and an arrival station, and the second content is the departure time, arrival time, the train number, the departure station, the arrival station, and a seat number; or the ongoing task is an express delivery task, the first content is a pick-up location and pick-up time, and the second content is the pick-up location, the pick-up time, and a pick-up code; or the ongoing task is a movie task, the first content is a cinema location and movie showing time, and the second content is the cinema location, the movie showing time, and a seat number; or the ongoing task is a conference task, the first content is conference time and a conference location, and the second content is the conference time, the conference location, and a conference list.

When detecting that the ongoing task (ongoing task) exists in the first application, the electronic device can automatically display the widget of the first application on the home screen of the device, and display the widget in an area that is on a graphical interface and in which the time weather widget has been displayed. This implements automatic addition of the widget, and a location of the time weather widget can also be reused. There are many places in which time is displayed and viewed on the electronic device, and although the device displays the weather time widget on the home screen, a user does not use the weather time widget in most cases. Therefore, by using the technical solution in this embodiment, the location of the weather time widget may be reused for displaying the widget of the application that includes the ongoing task. Screen space of the electronic device is limited. The location of the time weather widget is reused, so that the home screen can be clean and tidy, the widget does not need to be added at a new location, and information that is required by the user and has a higher priority can be provided for the user.

According to a second aspect, an electronic device is provided, including a display, a memory, and one or more processors. The memory includes instructions, and when the instructions are executed by the one or more processors, the electronic device is enabled to perform the widget display method according to the first aspect and the possible implementations of the first aspect.

According to a third aspect, a computer storage medium is provided, including computer instructions. When the computer instructions are run on an electronic device, the electronic device is enabled to perform the widget display method according to any possible implementation of any one of the foregoing aspects.

According to a fourth aspect, a computer program product is provided. When the computer program product runs on an electronic device, the electronic device is enabled to perform the widget display method according to any possible implementation of any one of the foregoing aspects.

BRIEF DESCRIPTION OF DRAWINGS

FIG. 3A to FIG. 3M-1 and FIG. 3M-2 are a schematic diagram of a group of graphical user interfaces according to an embodiment of this application;

FIG. 4A to FIG. 4G-1 and FIG. 4G-2 are a schematic diagram of another group of graphical user interfaces according to an embodiment of this application;

FIG. 6A-1 and FIG. 6A-2 to FIG. 6G are a schematic diagram of another group of graphical user interfaces according to an embodiment of this application.

DESCRIPTION OF EMBODIMENTS

The following describes technical solutions in embodiments of this application with reference to accompanying drawings in embodiments of this application. In descriptions in embodiments of this application, unless otherwise specified, "/" means "or". For example, A/B may indicate A or B. A term "and/or" in this specification is merely an association relationship for describing associated objects, and indicates that three relationships may exist. For example, A and/or B may indicate the following three cases: Only A exists, both A and B exist, and only B exists. In addition, in the descriptions in embodiments of this application, "a plurality of" means two or more.

Terms such as "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

Terms used in the descriptions of the technical solutions in this specification are merely intended to describe specific embodiments, but are not intended to limit this application.

Figure 1:
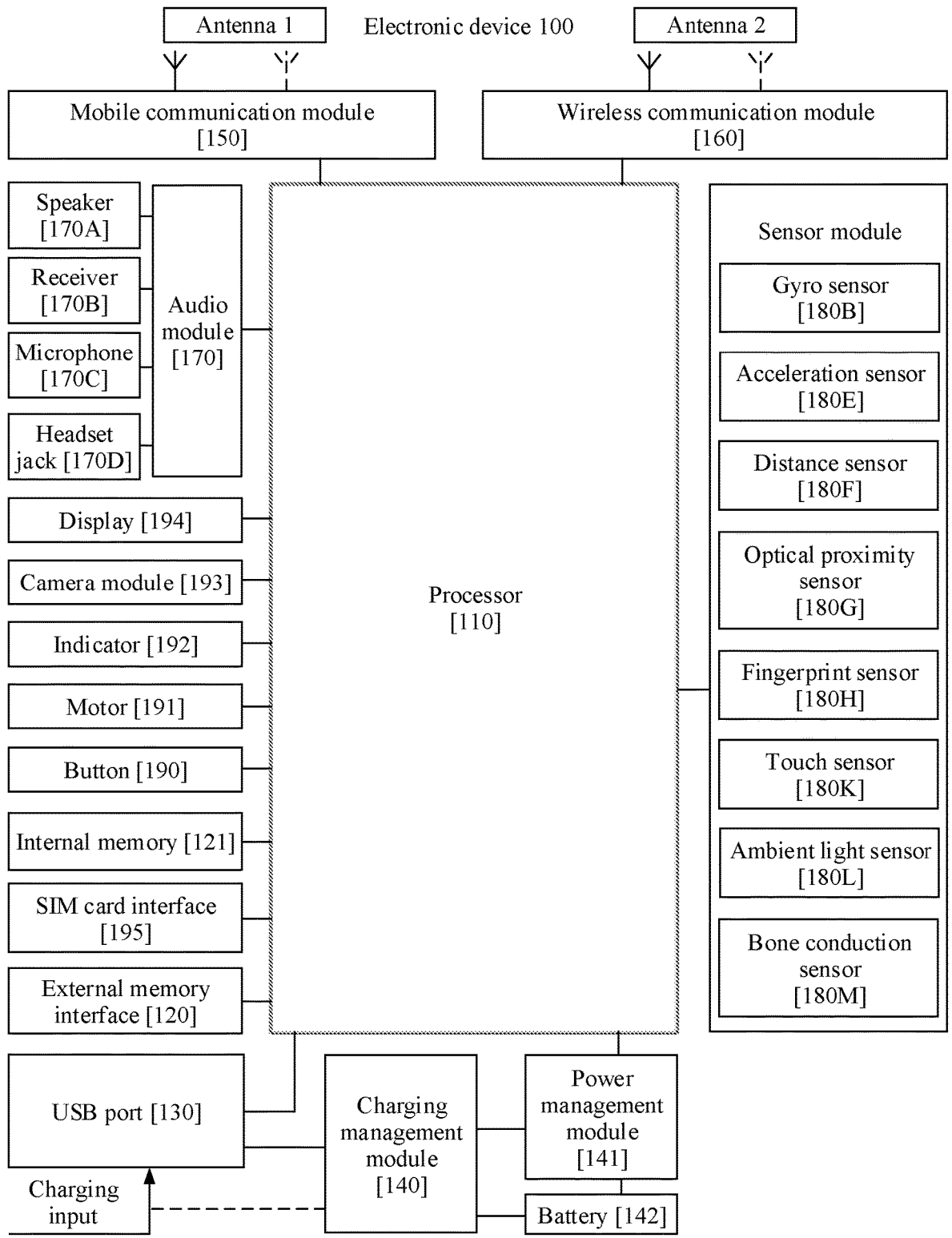
FIG. 1 is a schematic diagram of a structure of an electronic device according to an embodiment of this application.

FIG. 1 is a schematic diagram of a structure of an electronic device 100.

The electronic device 100 may include at least one of a mobile phone, a foldable electronic device, a tablet computer, a home screen computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, or a smart city device. A specific type of the electronic device 100 is not particularly limited in this embodiment of this application. The widget display method provided in embodiments of this application may be applied to the electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module, a button 190, a motor 191, an indicator 192, a camera module 193, a display 194, a subscriber identification module (subscriber identification module, SIM) card interface 195, and the like. The sensor module may include a pressure sensor (not shown in the figure), a gyro sensor 180B, a barometric pressure sensor (not shown in the figure), a magnetic sensor (not shown in the figure), an acceleration sensor 180E, a distance sensor 180F, an optical proximity sensor 180G, a fingerprint sensor 180H, a temperature sensor (not shown in the figure), a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements (for example, the electronic device 100 may include a lightening interface instead of the USB port 130). The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The processor 110 may generate an operation control signal based on an instruction operation code and a time sequence signal to complete control of instruction fetching and instruction execution.

A memory may be further disposed in the processor 110, and is configured to store instructions and data. In some embodiments, the memory in the processor 110 may be a cache. The memory may store instructions or data that has been used or frequently used by the processor 110. If the processor 110 needs to use the instructions or the data, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like. The processor 110 may be connected to a module such as a touch sensor, an audio module, a wireless communication module, a display, and a camera through at least one of the foregoing interfaces.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The USB port 130 is a port that conforms to a USB standard specification, and may be configured to connect to the electronic device 100 and a peripheral device. The USB port 130 may be specifically a mini USB port, a micro USB port, a USB Type-C port, or the like. The USB port 130 may be configured to connect to a charger, so that the charger can charge the electronic device 100, or may be configured to connect to another electronic device, to implement data transmission between the electronic device 100 and the another device. The USB port 130 may alternatively be configured to connect to a headset, to output, through the headset, audio stored in the electronic device. The port may alternatively be configured to connect to another electronic device such as a VR device. In some embodiments, standard specifications of the universal serial bus may be USB1.x, USB2.0, USB3.x, and USB4.

The charging management module 140 is configured to receive a charging input of the charger. The charger may be a wireless charger, or a wired charger. In some embodiments of wired charging, the charging management module 140 may receive a charging input of the wired charger through the USB port 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display 194, the camera module 193, the wireless communication module 160, and the like. The power management module 141 may be further configured to monitor parameters such as a battery capacity, a battery cycle count, and a battery health status (electricity leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave by using the antenna 1 for radiation. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), Bluetooth low energy (Bluetooth low energy, BLE), ultra-wideband (ultra-wideband, UWB), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave through the antenna 2 for radiation.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel.

The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or more displays 194. The electronic device 100 may implement a photographing function by using the camera module 193, the ISP, the video codec, the GPU, the display 194, the application processor AP, the neural-network processing unit NPU, and the like.

The camera module 193 may be configured to collect color image data and depth data of a photographed object. The ISP may be configured to process the color image data collected by the camera module 193. For example, during photographing, a shutter is opened, and light is transferred to a photosensitive element of the camera through a lens. An optical signal is converted into an electrical signal, and the photosensitive element of the camera transfers the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario.

In some embodiments, the ISP may be disposed in the camera module 193.

In some embodiments, the camera module 193 may include a color camera module and a 3D sensing module.

In some embodiments, a photosensitive element of a camera of the color camera module may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV.

In some embodiments, the 3D sensing module may be a (time of flight, TOF) 3D sensing module or a structured light (structured light) 3D sensing module. Structured light 3D sensing is an active depth sensing technology, and basic components of the structured light 3D sensing module may include an infrared (Infrared) transmitter, an IR camera module, and the like. A working principle of the structured light 3D sensing module is to first transmit a light spot of a specific pattern (pattern) to a photographed object, and then receive coding (light coding) of the light spot of the pattern on a surface of the object, to compare the light spot with an original projected light spot in terms of a similarity and a difference, and calculate three-dimensional coordinates of the object according to a trigonometric principle. The three-dimensional coordinates include a distance between the electronic device 100 and the photographed object. TOF 3D sensing may be an active depth sensing technology. Basic components of the TOF 3D sensing module may include an infrared (Infrared) transmitter, an IR camera module, and the like. A working principle of the TOF 3D sensing module is to calculate a distance (that is, a depth) between the TOF 3D sensing module and a photographed object by using an infrared refraction time, to obtain a 3D depth-of-field image.

The structured light 3D sensing module may be further applied to fields such as facial recognition, somatic game console, and industrial machine vision detection. The TOF 3D sensing module may be further applied to fields such as a game console and augmented reality (augmented reality, AR)/virtual reality (virtual reality, VR).

In some other embodiments, the camera module 193 may further include two or more cameras. The two or more cameras may include a color camera, and the color camera may be configured to collect color image data of a photographed object. The two or more cameras may collect depth data of a photographed object by using a stereo vision (stereo vision) technology. The stereo vision technology is based on a principle of a parallax of human eyes. Under a natural light source, two or more cameras are used to photograph an image of a same object from different angles, and then an operation such as a triangulation method is performed to obtain distance information, that is, depth information, between the electronic device 100 and the photographed object.

In some embodiments, the electronic device 100 may include one or more camera modules 193. Specifically, the electronic device 100 may include one front-facing camera module 193 and one rear-facing camera module 193. The front-facing camera module 193 may be usually configured to collect color image data and depth data of a photographer facing the display 194, and the rear-facing camera module may be configured to collect color image data and depth data of a photographed object (such as a character or a scenery) facing the photographer.

In some embodiments, the CPU, the GPU, or the NPU in the processor 110 may process color image data and depth data that are collected by the camera module 193. In some embodiments, the NPU may identify, by using a neural network algorithm based on a skeleton point identification technology, for example, a convolutional neural network (CNN) algorithm, color image data collected by the camera module 193 (specifically, the color camera module), to determine a skeleton point of the photographed character. The CPU or the GPU may also run a neural network algorithm to determine the skeleton point of the photographed character based on the color image data. In some embodiments, the CPU, the GPU, or the NPU may be further configured to: determine the figure (for example, a body proportion and a fatness and thinness degree of a body part between skeleton points) of the photographed character based on depth data collected by the camera module 193 (which may be the 3D sensing module) and the identified skeleton point, further determine a body beautification parameter for the photographed character, and finally process a photographed image of the photographed character based on the body beautification parameter, so that a body shape of the photographed character in the photographed image is beautified. In a subsequent embodiment, how to perform body shaping processing on an image of a photographed character based on color image data and depth data that are collected by the camera module 193 is described in detail. Details are not described herein.

The digital signal processor is configured to process a digital signal, and may further process another digital signal. For example, when the electronic device 100 selects a frequency, the digital signal processor is configured to perform Fourier transform on frequency energy, and the like.

The video codec is configured to: compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, with reference to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be used to connect to an external storage card, for example, a Micro SD card, to extend a storage capability of the electronic device 100. The external storage card communicates with the processor 110 through the external memory interface 120, to implement a data storage function. For example, files such as music and a video are stored in the external storage card, or files such as music and a video are transmitted from the electronic device to the external storage card.

The internal memory 121 may be configured to store computer-executable program code. The executable program code includes instructions. The internal memory 121 may include a program storage area and a data storage area. The program storage area may store an operating system, an application required by at least one function (for example, a sound play function and an image play function), and the like. The data storage area may store data (for example, audio data and an address book) and the like created during use of the electronic device 100. In addition, the internal memory 121 may include a high-speed random access memory, and may further include a nonvolatile memory, for example, at least one magnetic disk storage device, a flash storage device, a universal flash storage (universal flash storage, UFS), and the like. The processor 110 runs the instructions stored in the internal memory 121, and/or the instructions stored in the memory disposed in the processor, to perform various function methods of the electronic device 100 and data processing.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input to a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may listen to music or output an audio signal of a hands-free call by using the speaker 170A.

The receiver 170B, also referred to as an "earpiece", is configured to convert the audio electrical signal into the sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending a voice information, a user may make a sound near the microphone 170C through the mouth of the user, to input the sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is executed. When a touch operation whose touch operation intensity is greater than or equal to the first pressure threshold is performed on the Messages application icon, an instruction for creating a new SMS message is performed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the electronic device 100 jitters, obtains, through calculation based on the angle, a distance for which a lens module needs to compensate, and controls reverse motion of the lens to cancel the jitter of the electronic device 100, to implement image stabilization. The gyro sensor 180B may be further used in navigation and somatic game scenarios.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. When the electronic device is a foldable electronic device, the magnetic sensor 180D may be configured to detect folding or unfolding, or a folding angle of the electronic device. In some embodiments, when the electronic device 100 is a clamshell phone, the electronic device 100 may detect opening and closing of a flip cover based on the magnetic sensor 180D, and further set, based on a detected opening or closing state of the flip cover, a feature such as automatic unlocking of the flip cover. The acceleration sensor 180E may detect accelerations in various directions (usually on three axes) of the electronic device 100, and may detect magnitude and a direction of gravity when the electronic device 100 is static. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When intensity of detected reflected light is greater than a threshold, it may be determined that there is an object near the electronic device 100. When intensity of the detected reflected light is less than a threshold, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L may be configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is blocked. For example, the electronic device is in a pocket. When it is detected that the electronic device is blocked or is in a pocket, some functions (for example, a touch function) may be disabled, to prevent a misoperation.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature detected by the temperature sensor 180J exceeds a threshold, the electronic device 100 lowers performance of a processor, to reduce power consumption of the electronic device to implement thermal protection. In some other embodiments, when the temperature detected by the temperature sensor 180J is less than another threshold, the electronic device 100 heats the battery 142. In some other embodiments, when the temperature is less than still another threshold, the electronic device 100 may boost an output voltage of the battery 142.

The touch sensor 180K is also referred to as a "touch device". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may parse out a voice signal based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 may include a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt, or may be configured to provide a touch vibration feedback. For example, touch operations performed on different applications (for example photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator lamp, and may be configured to indicate a charging status and a power change, or may be configured to indicate a message, a missed call, a notification, and the like.

The SIM card interface 195 is configured to connect to an SIM card. The SIM card may be inserted into the SIM card interface 195 or removed from the SIM card interface 195, to implement contact with or separation from the electronic device 100. The electronic device 100 may support one or more SIM card interfaces. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. The software system of the electronic device 100 may be an Android system, a Linux system, a Windows system, a HarmonyOS system, an iOS system, or the like.

In embodiments of this application, an Android system with a layered architecture is used as an example to describe a software structure of the electronic device 100.

Figure 2:
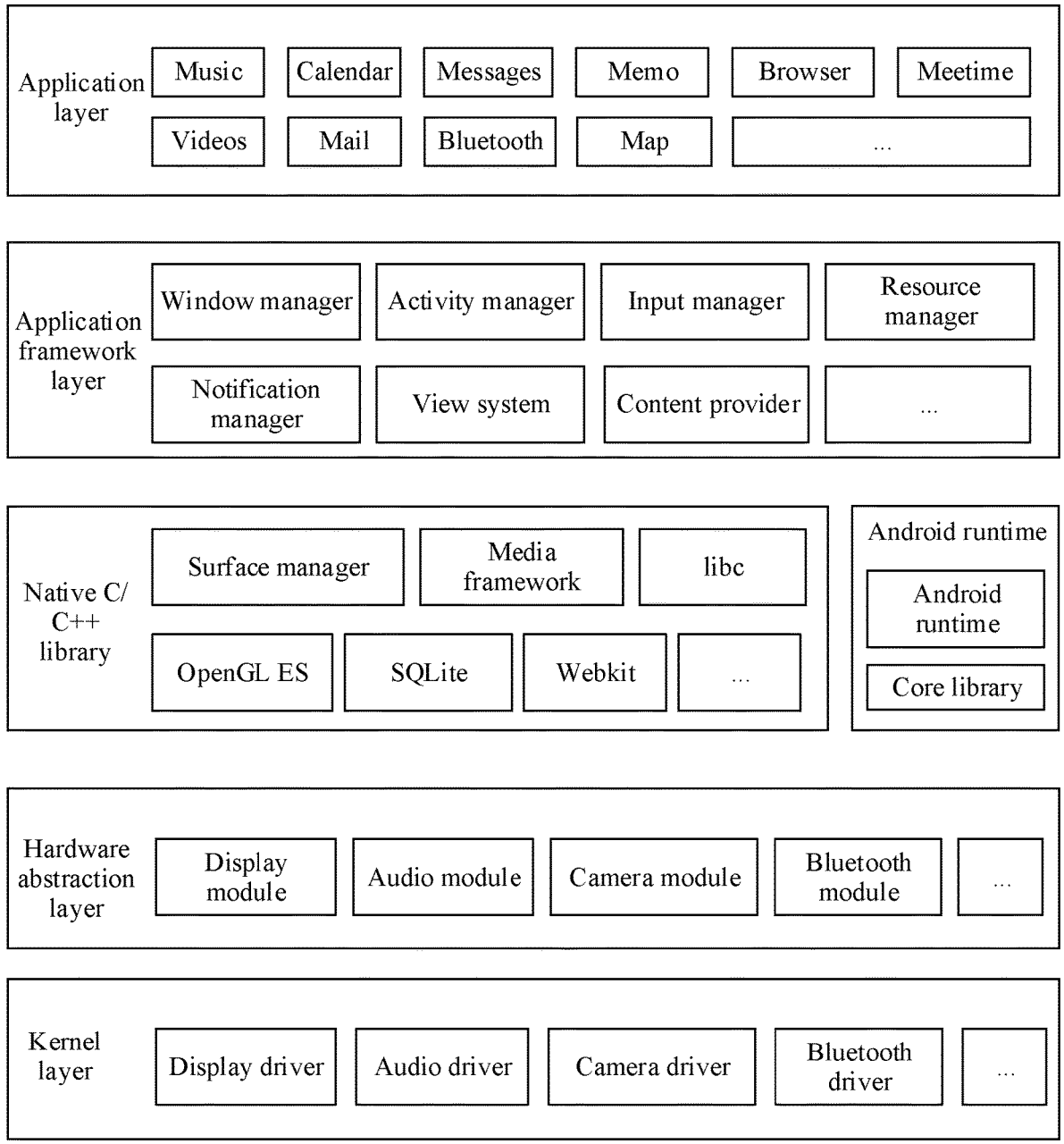
FIG. 2 is a block diagram of a software structure of an electronic device according to an embodiment of this application.

FIG. 2 is a block diagram of a software structure of an electronic device 100 according to an embodiment of this application. In the layered architecture, software is divided into several layers, and each layer has a clear role and task. The layers communicate with each other through a software interface. In some embodiments, the Android system is divided into five layers: an application layer, an application framework layer, an Android runtime (Android runtime) and system library, a hardware abstraction layer, and a kernel layer from top to bottom.

The application layer may include a series of application packages.

As shown in FIG. 2, the application packages may include applications such as Music, Calendar, Messages, Memo, Meetime, Browser, Videos, Mail, Bluetooth, and Map.

In this embodiment of this application, for a media application, (for example, the music application or the video application shown in FIG. 2), the electronic device 100 may detect that an ongoing task (ongoing task) exists in the media application (for example, the music application or the video application) in the electronic device 100, and display a media widget on a home screen.

In some embodiments, the electronic device 100 may further detect a scenario change (for example, a change of system time or a geographical location of the electronic device 100), to adjust a size of the media widget displayed on the home screen and/or content displayed by the media widget, and/or a layout of the content displayed by the media widget.

In the Android (Android) operating system, an Android application may be constructed by at least one of the following components:

An activity may be referred to as an "activity" in some embodiments. The activity is an interface for interaction between the system and a user, and can be a user interface (visible to the user) on a single screen. For example, an email application may have an activity that displays a list of new emails, an activity for writing an email, and an activity for reading an email. Each activity exists independently of another activity. In addition, another application can start any of the activities (if the email application allows the another application to start any of the activities). For example, a camera application may start the activity that is in the email application and that is for writing a new email, so that the user can share a picture. The activity helps complete important interaction between the system and the application. The system can track content (for example, content displayed on the screen) about which the user is currently concerned by using the activity, to ensure that the system continues to run a process hosting the activity.

A service may be referred to as a "service" in some embodiments. The service is an application component that can run an operation for a long time on the background without providing an interface. The service can be started by another application component (for example, the activity), and the service continues to run on the background even if the user switches to another application. For example, when the user uses the email application, the service may play music on the background or fetch data over a network, but this does not block interaction between the user and the email application (for example, the activity for writing an email).

The service can be classified into a foreground service and a background service. If an application has a service, but the service is visible to the user during running, the service is the foreground service. For example, for a music application, because music playing is a service that can be directly perceived by the user, the music application may send, to the user, a notification, indicating that the music application expects to appear on the foreground (to avoid being closed on the background), to notify the system of the message. In this case, the system understands that the system should spare no effort to keep the service process running since disappearance of the process makes the user unpleasant.

A broadcast receiver may be referred to as a "broadcast receiver" in some embodiments. The broadcast receiver component enables the system to deliver an event to the application, allowing the application to respond to a broadcast notification within the system range. Because the broadcast receiver is another clearly defined application entry, the system can also deliver the broadcast to an application that is not currently running. For example, the system can send a broadcast, and when the application receives the broadcast, the application can issue a notification by using a notification manager (a notification manager at the application framework layer shown in FIG. 2), to notify the user of an upcoming event. It should be understood that the broadcast may be initiated by the system. For example, the system may send a broadcast notifying that the screen is turned off, a battery level is low, or a photo has been taken. The broadcast may also be initiated by the application. For example, if the user expects to enter an interface for writing an email when receiving an SMS message, the user may send a broadcast event by using a messages application. After receiving the broadcast, a broadcast receiver of the email application triggers generation of an activity for writing an email. It should be understood that the broadcast receiver is not displayed on the user interface, but may create a status bar notification, and remind the user by using the notification manager when a broadcast event occurs.

A content provider may be referred to as a "content provider" in some embodiments. The content provider can store and read data between a plurality of applications, and can be equivalent to a database. For an application A that includes the content provider, another application can query or modify data in the application A by using the content provider (provided that the content provider allows the another application to query or modify the data in the application A by using the content provider). For example, a contacts application includes a content provider that manages contacts information. Therefore, any application with appropriate permission can query, read, and write information related to a contact.

It should be understood that starting the activity or interaction between activities is implemented by using a message. For example, starting an activity or another activity in an activity may be triggered by sending an Intent message.

It should be further understood that, in the Android system, the application is like a container, and may include a plurality of activities, a plurality of services, or a plurality of broadcast receivers. The activities, services, and broadcast receivers are independent of each other. Interaction between the activities, services, and broadcast receivers can be triggered by the Intent message.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a resource manager, a notification manager, an activity manager, an input manager, and the like.

The window manager provides a window manager service (Window Manager Service, WMS), which can be used for window management, window animation management, surface management, and as a transit point for an input system.

The content provider is configured to: store and obtain data, and enable the data to be accessed by an application. The data may include a video, an image, audio, calls that are made and received, a browsing history and bookmarks, an address book, and the like.

The view system includes visualized controls such as a control for displaying text and a control for displaying an image. The view system may be configured to construct an application. A display interface may include one or more views. For example, a display interface including a Messages notification icon may include a text display view and an image display view.

In this embodiment of this application, a widget displayed on the home screen of the electronic device 100 may include one or more views, and the widget may include a view for displaying text and a view for displaying a picture. For example, a music widget includes a view for displaying lyrics and a view for displaying a picture of a singer.

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the display in a form of a dialog window. For example, text information is displayed in the status bar, an alert sound is played, the electronic device vibrates, or an indicator lamp blinks.

The activity manager can provide an activity manager service (Activity Manager Service, AMS), which can be used for startup, switch, and scheduling of system components (for example, an activity, a service, a content provider, a broadcast receiver), and management and scheduling of an application process.

The input manager can provide an input manager service (Input Manager Service, IMS), which can be used for system input management, for example, a touchscreen input, a key input, and a sensor input. The IMS obtains an event from an input device node and allocates the event to an appropriate window through interaction with the WMS.

The Android runtime includes a core library and Android runtime. The Android runtime is responsible for converting source code into machine code. The Android runtime mainly includes an ahead of time (ahead of time, AOT) compilation technology and a just in time (just in time, JIT) compilation technology.

The core library is mainly used to provide functions of basic Java libraries, such as a basic data structure library, a mathematics library, an I/O library, a tool library, a database, and a network library. The core library provides the API for the user to develop the Android application.

A native C/C++ library may include a plurality of functional modules, such as a surface manager (surface manager), a media framework (Media Framework), libc, OpenGL ES, SQLite, and Webkit.

The surface manager is configured to: manage a display subsystem, and provide fusion of 2D and 3D layers for a plurality of applications. The media framework supports playback and recording of audio and videos in a plurality of commonly used formats, static image files, and the like. The media library may support a plurality of audio and video coding formats, for example, MPEG-4, H.264, MP3, AAC, AMR, JPG, and PNG. OpenGL ES provides drawing and manipulation of 2D and 3D graphics in the application. SQLite provides a lightweight relational database for the application of the electronic device 100.

The hardware abstraction layer runs in user space (user space), encapsulates drivers of the kernel layer, and provides an invoking interface for the upper layer.

The kernel layer is a layer between hardware and software. The kernel layer includes at least a display driver, a camera driver, an audio driver, a Bluetooth driver, and a sensor driver.

The following describes an example of a working process of software and hardware of the electronic device 100 with reference to a capture photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. A camera application invokes an interface of the application framework layer to open the camera application, then enables the camera driver by invoking the kernel layer, and captures a static image or a video by using the camera module 193.

Before the technical solutions in embodiments of this application are described, nouns in embodiments of this application are first described.

The following uses Android as an example to describe concepts of foreground and background applications:

Foreground application (foreground application): An interface of the application is visible to a current user and can interact with the user.

Background application (background application): The application does not have any interface that can interact with the user.

The user opens the music application, and the electronic device 100 presents an interface of the music application. In this case, the music application belongs to the foreground application, but in this case, the music application does not have an ongoing task. When the user plays audio, plays a video, downloads audio, or downloads a video on the interface of the music application, the music application has the ongoing task (for example, in a specific implementation of the Android system, the music application invokes or creates an activity) on the foreground. If the user stops playing audio, stops playing a video, or stops a download task on the interface of the music application, the electronic device 100 considers that the music application does not have the ongoing task.

If the user switches from the interface of the music application to another graphical user interface of the electronic device 100, and the music application is still playing audio, downloading audio, or downloading a video, the electronic device 100 considers that the music application has the ongoing task (for example, in a specific implementation of the Android system, the music invokes or creates a background task) on the background.

If the user switches from the interface of the music application to another graphical user interface of the electronic device 100, the music application is still playing audio, downloading audio, or downloading a video, but the electronic device 100 displays a notification card of the music application, the electronic device 100 considers that the music application has the ongoing task (for example, in a specific implementation of the Android system, the music invokes or creates a foreground task) on the foreground.

When the device detects a predefined gesture operation of the user, the device switches from the interface of the music application to another graphical user interface of the electronic device, and the music application does not play audio or does not have a download task on the background, the music application does not have the task continuously performed on the background.

For the media application, the "ongoing task (ongoing task)" may be the "ongoing task of the foreground application" or the "ongoing task of the background application" of the electronic device.

It should be understood that the "ongoing task of the foreground application" herein means that the foreground application has a visible activity. For example, if the user opens the music application and plays audio, plays a video, downloads audio, or downloads a video in the interface of the music application, and the screen of the electronic device currently displays the interface of the music application, the music application has the ongoing task on the foreground. It should be understood that the "ongoing task of the background" herein is the task (for example, which may be a service component of the media application, and the service component continuously runs on the background) that is currently continuously performed on the background. For example, if the user switches from the interface of the music application to another graphical user interface of the electronic device 100, and the music application plays audio, downloads audio, or downloads a video on the background, the music application has the ongoing task on the background. If the user stops playing audio, stops playing a video, or stops a download task on the interface of the music application, the device detects the predefined gesture operation of the user, and the device switches from the interface of the music application to another graphical user interface of the electronic device, and the music application does not play audio or does not have a download task on the background, the music application does not have the task continuously performed on the background.

In some embodiments, the "ongoing task" may be a task that the user has not completed. For example, the user processes a slides task in the electronic device 100. In this case, if the user leaves and does not close an application related to the slide, the slide task that is not completed by the user is the "ongoing task".

In some embodiments, the "ongoing task" may alternatively be a schedule, and the schedule includes time information and/or geographical location information. For example, if the user adds a schedule "go shopping, time: Sep. 1, 2020, and location: Beijing shopping mall" to the calendar application, the schedule added by the user may be the "ongoing task". In some other embodiments, the electronic device 100 detects that a travel task exists in a schedule application (for example, Calendar, Memo, Reminders, Email, and Messages) in the electronic device 100, and the electronic device 100 detects that a geographical location of the electronic device 100 is close to a departure station, or system time of the electronic device 100 is close to departure time. In this case, the electronic device 100 determines the travel task as the "ongoing task".

Widget: The widget in embodiments of this application may be a micro application view that is embedded in another application (for example, a home screen, a messages application, or an email application) and that receives regular update. For example, the widget may be an application widget (Widget) displayed on the home screen. In some embodiments, the widget may alternatively be a card displayed on a leftmost screen. In some embodiments, the widget may be a notification card of a lock screen interface.

The application widget on the home screen is used as an example. The user can customize a home screen by using the application widget. In addition, the user may enter an application associated with the application widget by tapping the application widget, and the user moves the widget or adjusts a size of the widget.

The application widget may include a messages widget, a control widget, and a hybrid widget.

The messages widget may periodically update a displayed message, to provide different content for the user. For example, a weather widget may update weather information over time. For example, the schedule widget in embodiments of this application may provide a message for the user, and as a scenario (for example, the system time or the geographical location of the electronic device) changes, the schedule widget may display more messages.

The control widget may provide a control for the user to operate, to implement control of an application associated with the widget. For example, the music widget described in embodiments of this application includes a playing/pausing control, and the user may tap the control to play/pause music.

The hybrid widget may have both the functions of the messages widget and the control widget. For example, the music widget in embodiments of this application may include a control and dynamically displayed lyrics.

It should be understood that the widget (widget) in embodiments of this application may further be referred to as a small component, a small tool, or a card. A specific name of the widget is not limited in this application.

FIG. 3A to FIG. 3M-1 and FIG. 3M-2 show a set of example graphical user interfaces (Graphical User Interface, GUI) in which an electronic device 100 detects that an ongoing task (ongoing task) exists in a media application (for example, a music application or a video application) in the electronic device 100 and displays a media widget on a home screen.

Figure 3A:
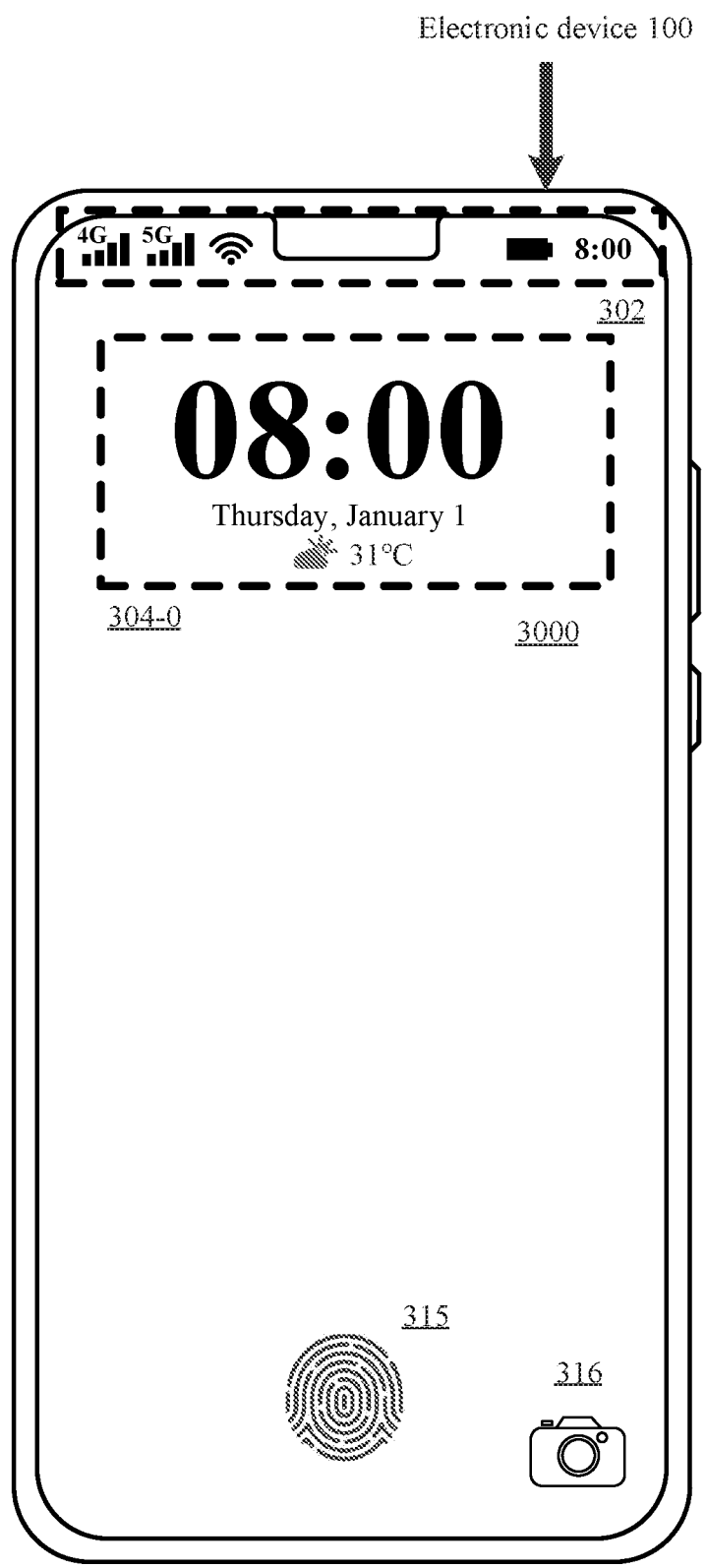

FIG. 3A is an example graphical user interface 3000 displayed on a display 194 on the electronic device 100. In some embodiments, the graphical user interface 3000 may be referred to as a lock screen interface. The graphical user interface 3000 may include one or a combination of a plurality of the following elements:

Application widget 304-0: In some embodiments, the application widget 304-0 may be located above the screen. It should be understood that "above" is an area greater than ½ of a height of the screen. In some embodiments, content displayed by the application widget 304-0 may include one or a combination of several of time information, weather information, or location information. In some embodiments, the application widget 304-0 may include at least one location and time information and weather information corresponding to the location. For example, the application widget 304-0 may include time information of Beijing, weather information of Beijing, time information of London, and weather information of London. In some embodiments, the application widget 304-0 may include two application widgets (for example, a music widget and a time weather widget that are displayed simultaneously). It should be understood that a size (including a width and a height) of the application widget 304-0 is not specifically limited in this embodiment of this application. In some embodiments, the size of the application widget 304-0 may be a small size. It should be understood that the "small size" in this embodiment of this application may mean that the width of the widget does not reach a maximum width of the widget that can be displayed on the home screen of the electronic device 100. In some embodiments, the application widget 304-0 may be a time weather widget or a calendar widget. It should be understood that, in some embodiments, the time weather widget may alternatively be referred to as a weather application widget.

Icon 315: Icon 315 is a fingerprint recognition icon. In some embodiments, the icon 315 may be switched between transparent display and opaque display.

Icon 316: Icon 316 is a camera icon. A user can quickly access a camera application interface by tapping the camera icon.

System status bar 302: The system status bar 302 may include a battery level (battery level) indicator, a time indicator (for example, 8:00 shown in the figure), and signal strength indicators (for example, 4G and 5G) for wireless communication of the user. It should be understood that, in some embodiments, the content displayed in the system status bar 302 is not limited thereto. For example, the system status bar 302 may further display a Bluetooth (Bluetooth) indicator, an alarm clock (alarm clock) indicator, and the like. It should be understood that an arrangement location of the content displayed in the system status bar 302 is not limited in this embodiment. For example, in some embodiments, a location of the time indicator may be in the middle.

It should be understood that display locations and a quantity of elements included in the graphical user interface 3000 are not specifically limited in this embodiment of this application.

It should be understood that, in some embodiments, the graphical user interface 3000 may further include more elements.

In some embodiments, the GUI 3000 may further include a lock screen wallpaper (not shown in the figure). In some embodiments, the lock screen wallpaper displayed in the GUI 3000 may be different each time the screen is turned on (for example, a home button is activated).

Figure 3B:
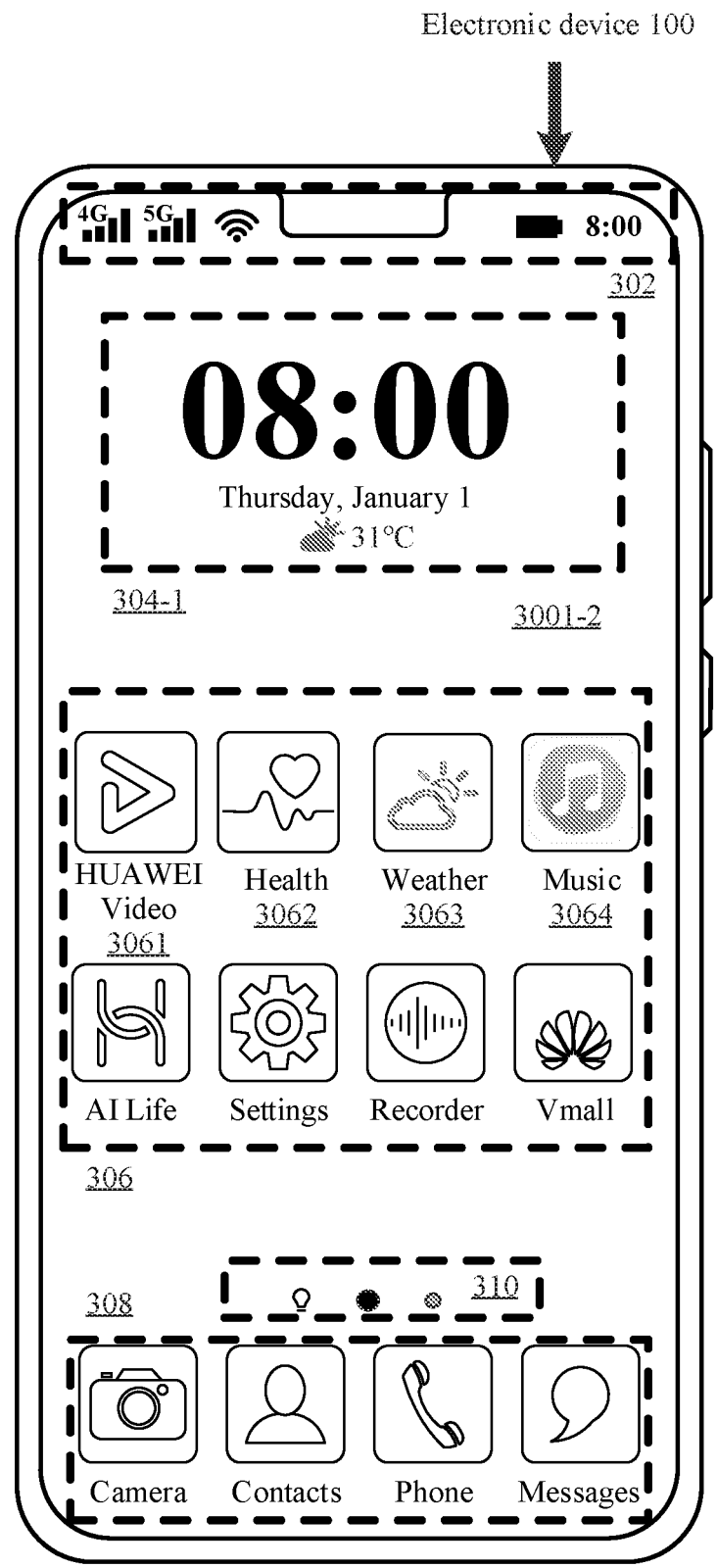

FIG. 3B shows an example graphical user interface 3001-2 displayed on the display 194 on the electronic device 100. It should be understood that the example graphical user interface 3001-2 may be referred to as the home screen, and a name of the graphical user interface 3001-2 is not specifically limited in this embodiment of this application. In some embodiments, the graphical user interface 3001-2 may be a home page (home screen) of the home screen. When detecting a predefined gesture (for example, sliding up from the bottom of the screen) on another page on the home screen, the electronic device may quickly switch to the home page of the home screen. It should be understood that in this embodiment of this application, the name of the "home page of the home screen" is used as an example for description, and does not indicate a specific limitation on the name of the example graphical user interface 3001-2. In some embodiments, the example graphical user interface 3001-2 may include one or a combination of several of the following elements:

Status bar (status bar) 302: Description of the status bar (status bar) 302 refers to the description of the status bar in FIG. 3A. Details are not described herein.

Dock bar (favourites tray) 308: The dock bar 308 may include application icons such as Camera, Contacts, Phone, and Messages. In some embodiments, the user may manually change the application icons displayed in the dock bar 308.

Figures 1, 3C:
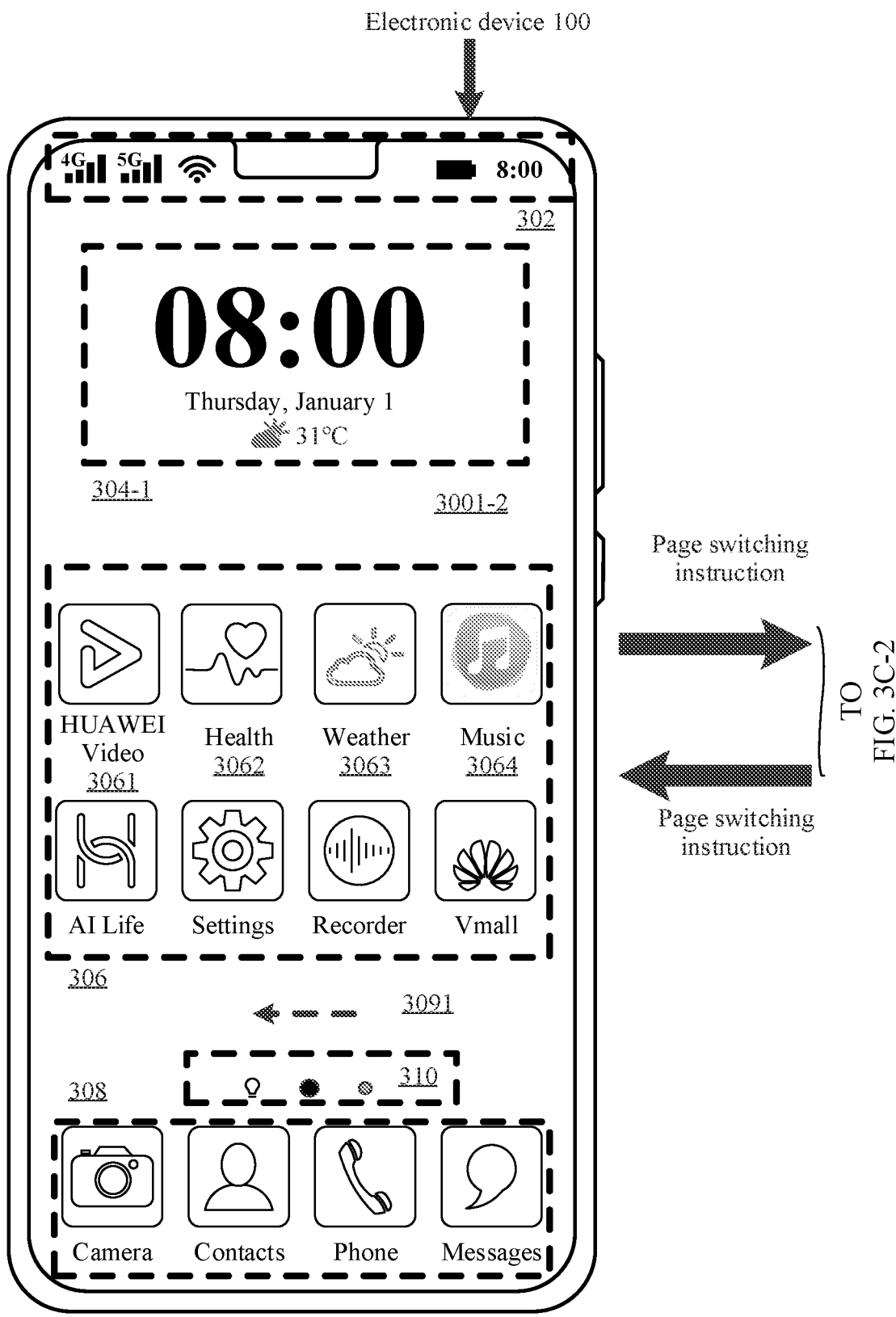
Figures 2, 3C:
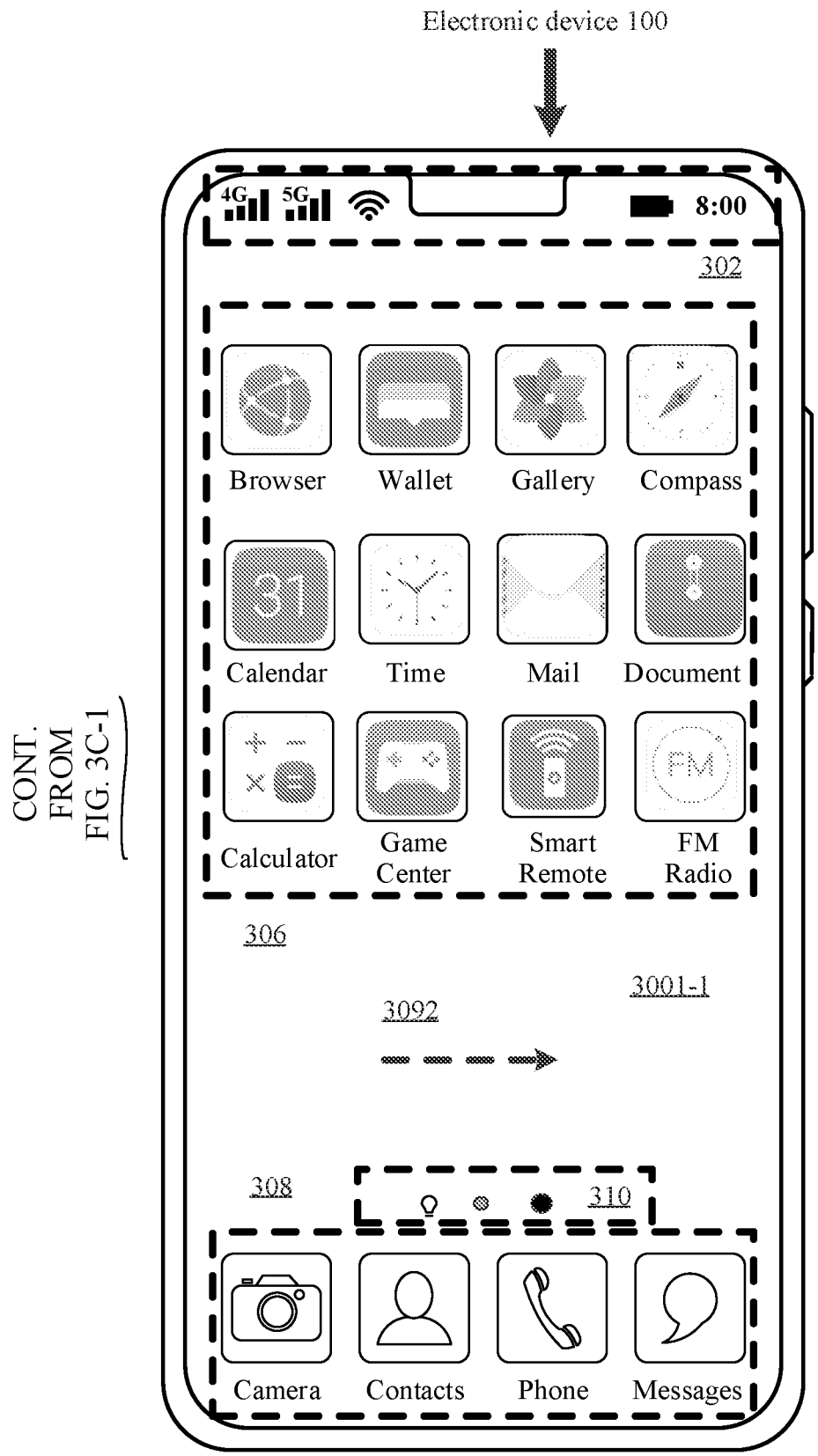
Figures 1, 3D:
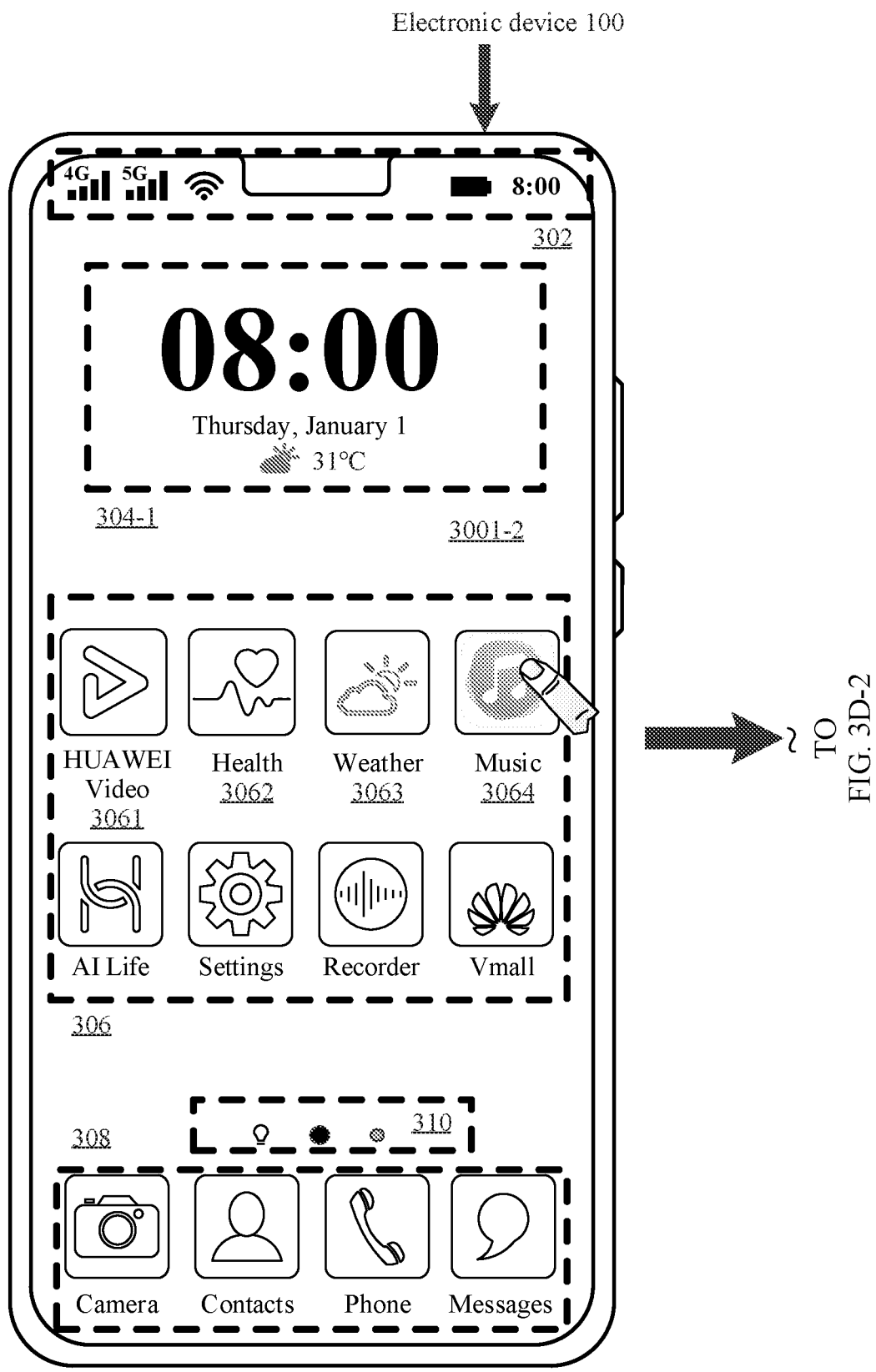
Figures 2, 3D:
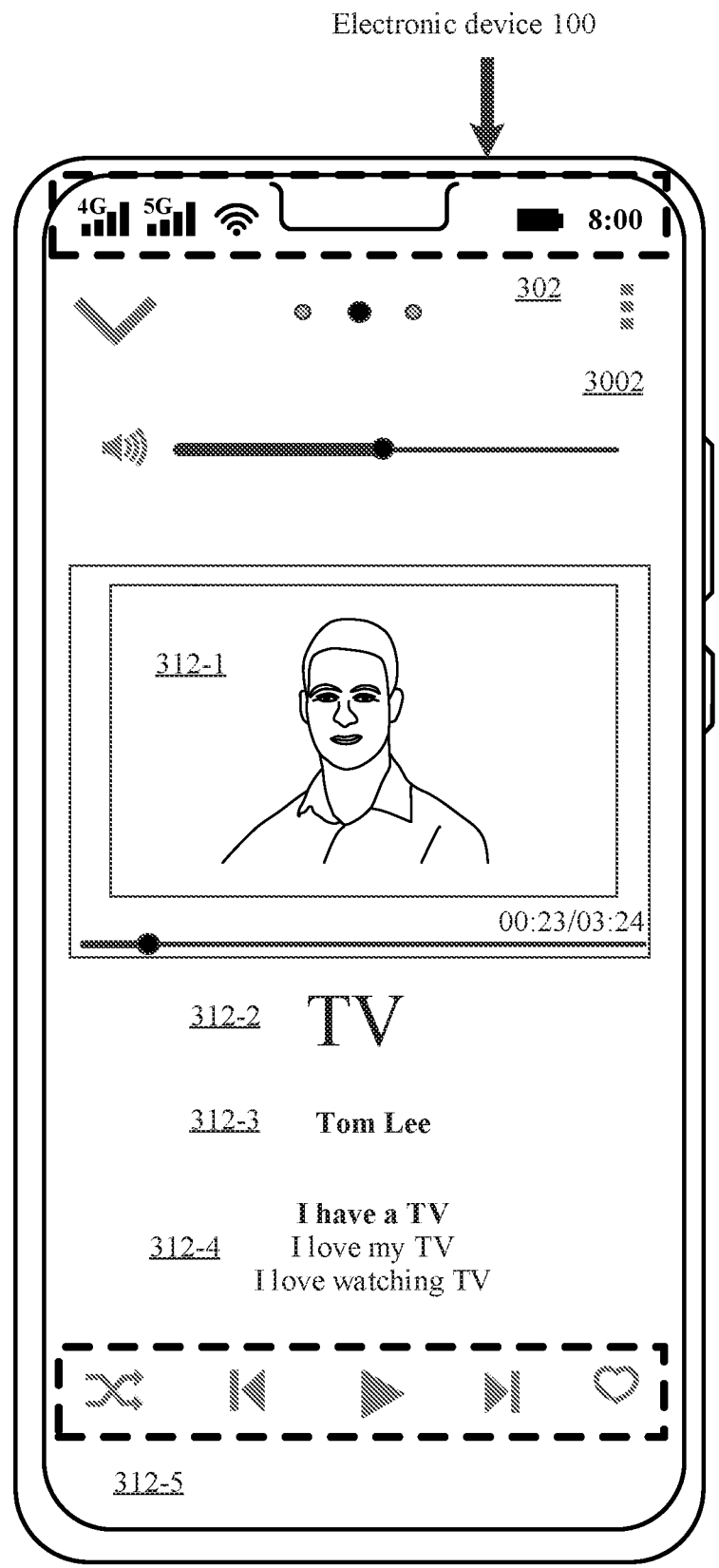

Home screen page mark 310: The home screen page mark 310 is used to display a quantity of pages included in the home screen and locate a current page. For example, in the GUI 3001-2 shown in FIG. 3B, the home screen page mark 310 indicates that the electronic device 100 includes at least two home screen pages. In some embodiments, a leftmost screen may also be referred to as the home screen page. After detecting a page switching instruction, the electronic device may switch (for example, as shown in FIG. 3C-1 and FIG. 3C-2, the electronic device 100 detects an input left slide predefined gesture 3091, and the electronic device 100 switches from the home page of the home screen to a home screen page GUI 3001-1 for display) between different home screen pages. In some embodiments, the user may adjust a display order (for example, adjust a display order of the GUI 3001-2 and the GUI 3001-1) of the home page of the home screen and another home screen page.

Application icon (icon) 306: The application icon 306 may include at least one application icon. The application icon 306 may include at least one or a combination of "HUAWEI Video" (HUAWEI Video) 3061, "Health" (Health) 3062, "Weather" (Weather) 3063, "Music" (Music) 3064, "AI Life" (AI Life), "Settings" (Settings), "Recorder" (Recorder), "Vmall" (Vmall), "Camera" (Camera), "Contacts" (Contacts), "Phone" (Phone), and "Messages" (Messages) applications. In some embodiments, the application icons displayed by the application icon 306 may be different. For example, a quantity of application icons may increase or decrease, and types of icons may also be different.

Application widget 304-1: For description of the application widget 304-1, refer to the description of the application widget 304-0 in the embodiment in FIG. 3A. Details are not described herein. It should be noted that the application widget 304-1 may further be any widget manually added by the user to the home screen of the electronic device 100. For example, in some embodiments, the first application widget 304-1 may be a time weather widget or a calendar widget.

It should be understood that, in some embodiments, different terms or names may exist in the status bar (status bar) 302, the widget (widget) 304-1, the application icon (icon) 306, the dock bar (favorites tray) 308, and the home screen page mark 310. In some embodiments, the application icon (application icon) 306 may be referred to as an application shortcut (application shortcut) or the like. The terms in this embodiment are merely examples.

It should be further understood that display positions of the elements in the graphical user interface 3001-2 are examples, and may be other arrangement manners in some other embodiments. It should be further understood that there may be more types of elements in the graphical user interface 3001-2.

According to an investigation, the widget 304-1 at the location exists since delivery and startup of the electronic device 100, and the user will not delete the widget. However, the widget occupies a large area of the screen and wastes screen space. Therefore, according to the technical solutions provided in this application, another widget can be intelligently displayed by using the area of the widget, to provide more useful information for the user, and improve utilization of the home screen.

In some embodiments, the electronic device 100 displays the application widget 304-1 on the home screen. It should be understood that the application widget 304-1 may be the time weather widget, the calendar widget, or another application widget. The electronic device 100 may detect the ongoing task (ongoing task) in the media application (for example, a music application or a video application) in the electronic device 100 and displays the media widget on the home screen. In some embodiments, the media widget may be displayed in a same area that is on the home screen and in which the application widget 304-1 has been displayed. In some embodiments, the same area may be in an area on the home page of the home screen.

The following uses the music application as an example to schematically describe a generation process of the media widget.

The application widget 304-1 displayed on the home screen is the time weather widget 304-1 (as shown in FIG. 3B). It should be understood that, in some embodiments, the application widget 304-1 may alternatively be a widget described in the embodiments of FIG. 4A to FIG. 4E-1 to FIG. 4E-3, a schedule widget described in the embodiments of FIG. 5A to FIG. 5EC-1 and FIG. 5EC-2, or an instant messaging application widget described in the embodiments of FIG. 6A-1 and FIG. 6A-2 to FIG. 6G.

It should be understood that the music application in this embodiment of this application may alternatively be replaced with another media application (for example, HUAWEI Video, Tencent Video, YOUTUBE, Sportify, iTunes, Himalaya FM, NetEase Cloud Music, and QQ Music). It should be understood that the media application includes an application whose main function is playing a video and/or whose main function is playing audio. A specific name of the media application is not limited in this embodiment of this application.

After the electronic device 100 detects an instruction for activating the music application, the electronic device 100 responds to the instruction, and the music application is activated. For example, after the electronic device 100 detects a gesture of tapping the music application icon button 3064 on the GUI 3001-2 displayed on the home screen in FIG. 3D-1 and FIG. 3D-2 by a finger of the user (not drawn to scale in the figure), the electronic device 100 responds to the gesture, and a music application interface 3002 is displayed on the display of the electronic device 100. In some embodiments, a location of the music application icon button 3064 may be in a folder (not shown in the figure) on the home screen page. In some embodiments, the manner of activating the music application by the user may alternatively be stylus tapping, voice control, floating control, or the like. In the GUI 3002, the music application interface may include a song name "TV" 312-2, a singer picture 312-1, a singer "Tom Lee" 312-3, a part of lyrics 312-4, a control 312-5, and the like. In some embodiments, the content displayed on the music application interface 3002 is not limited thereto, and may further include a lyrics creator, an album name, an arranger, or the like.

Figures 1, 3E:
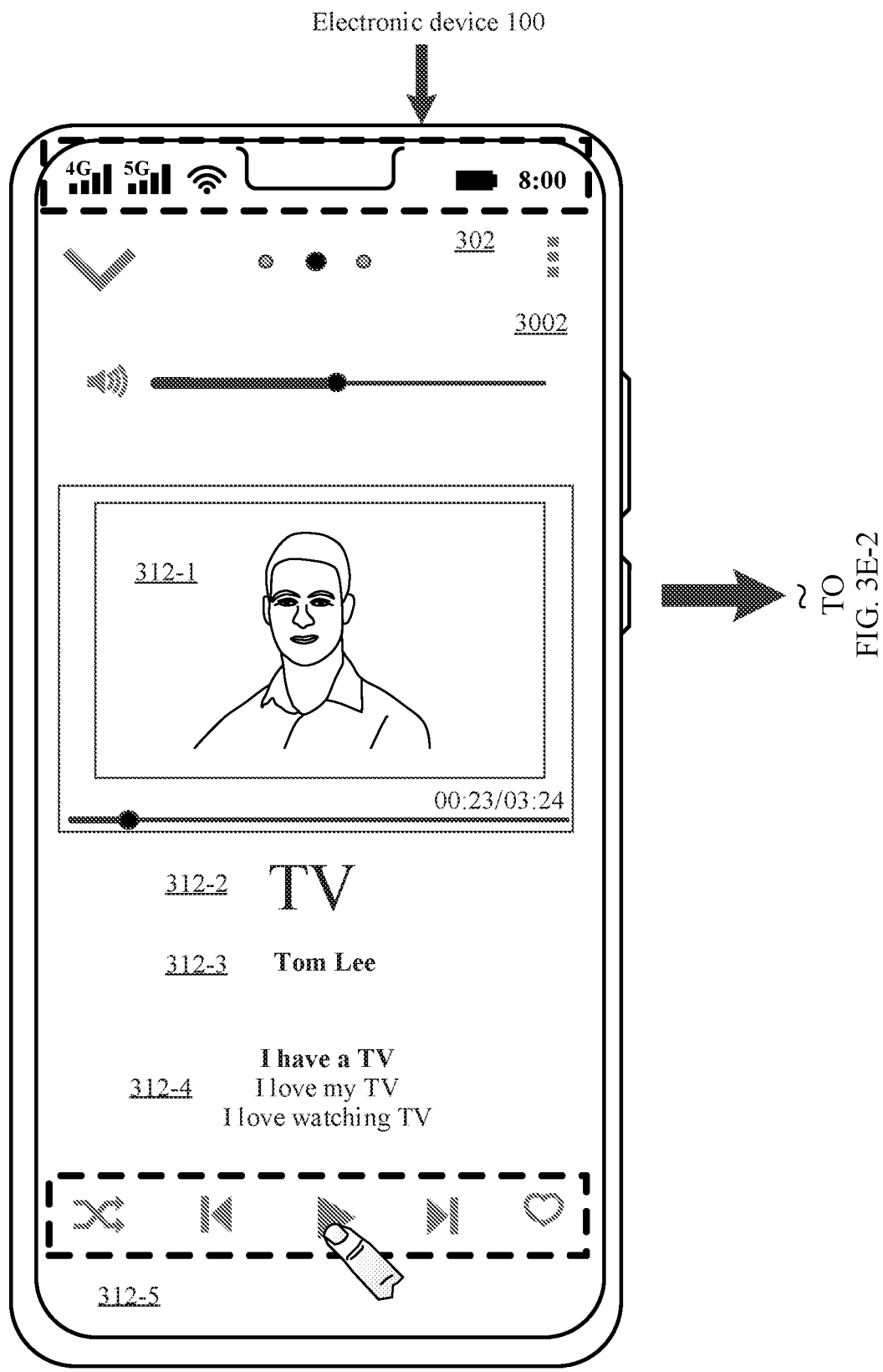
Figures 2, 3E:
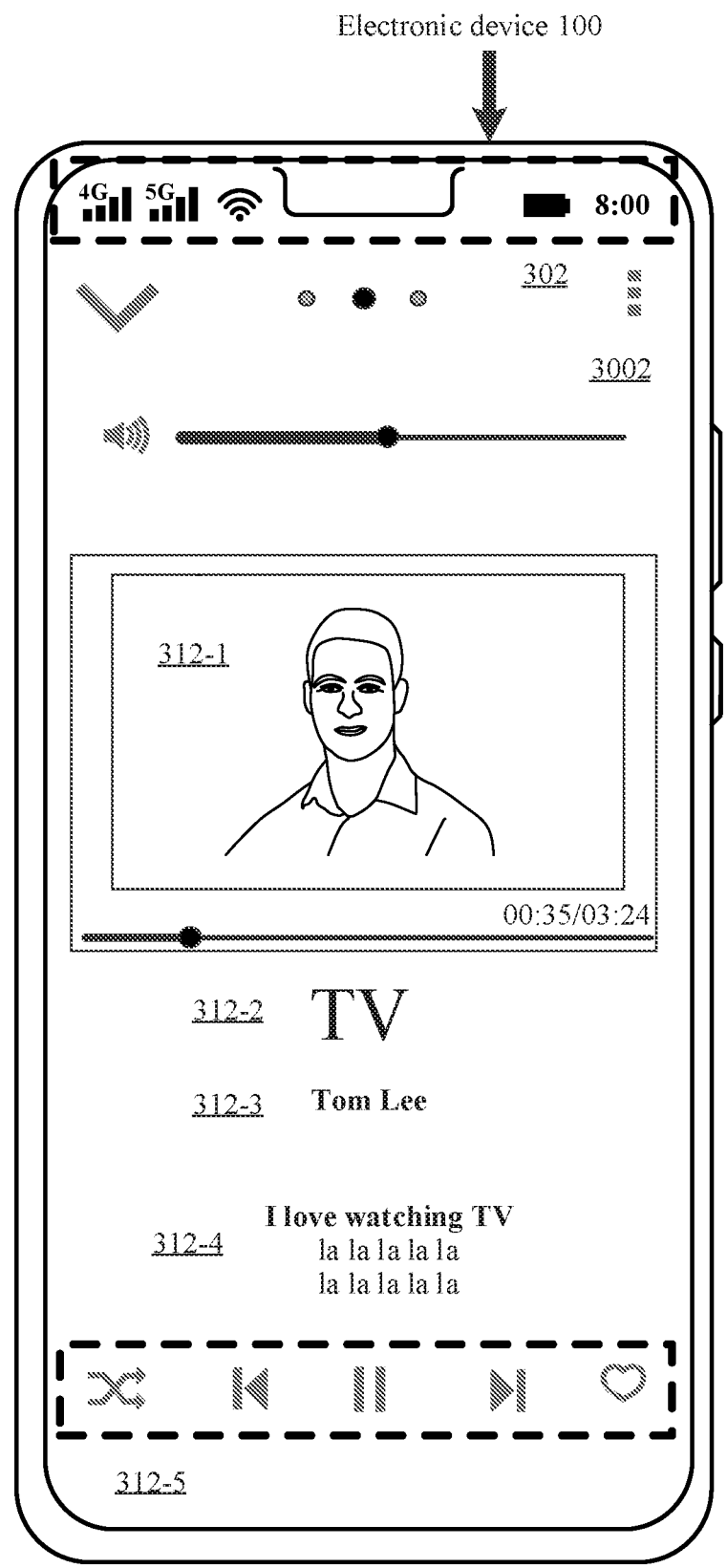

After detecting that a music playing control is activated (for example, the user taps the music playing control as shown in FIG. 3E-1 and FIG. 3E-2), the electronic device 100 displays an interface on which the music is being played.

When there is a song being played in the music application, after the electronic device 100 detects an input predefined gesture (for example, making an upward slide gesture at the bottom of the screen), the electronic device 100 may switch to the home screen from the displayed music application interface GUI 3002. It should be understood that a function of the operation of "making an upward slide gesture at the bottom of the screen" is to enable the electronic device 100 to switch to the home screen of the electronic device 100. It should be noted that the gesture operation for enabling the electronic device to return to the home screen of the electronic device is not limited to sliding up from the bottom of the screen. The gesture operation may be that the user taps a home button (not shown in the figure), or the user taps a return button (not shown in the figure). This is not specifically limited in this embodiment of this application.

Optionally, after the electronic device 100 switches to the home screen from the displayed music application interface GUI 3002, the home screen may simultaneously display a music widget 314-2 and a widget 304-2 (the application widget 304-1 with a size reduced).

Figure 3F:
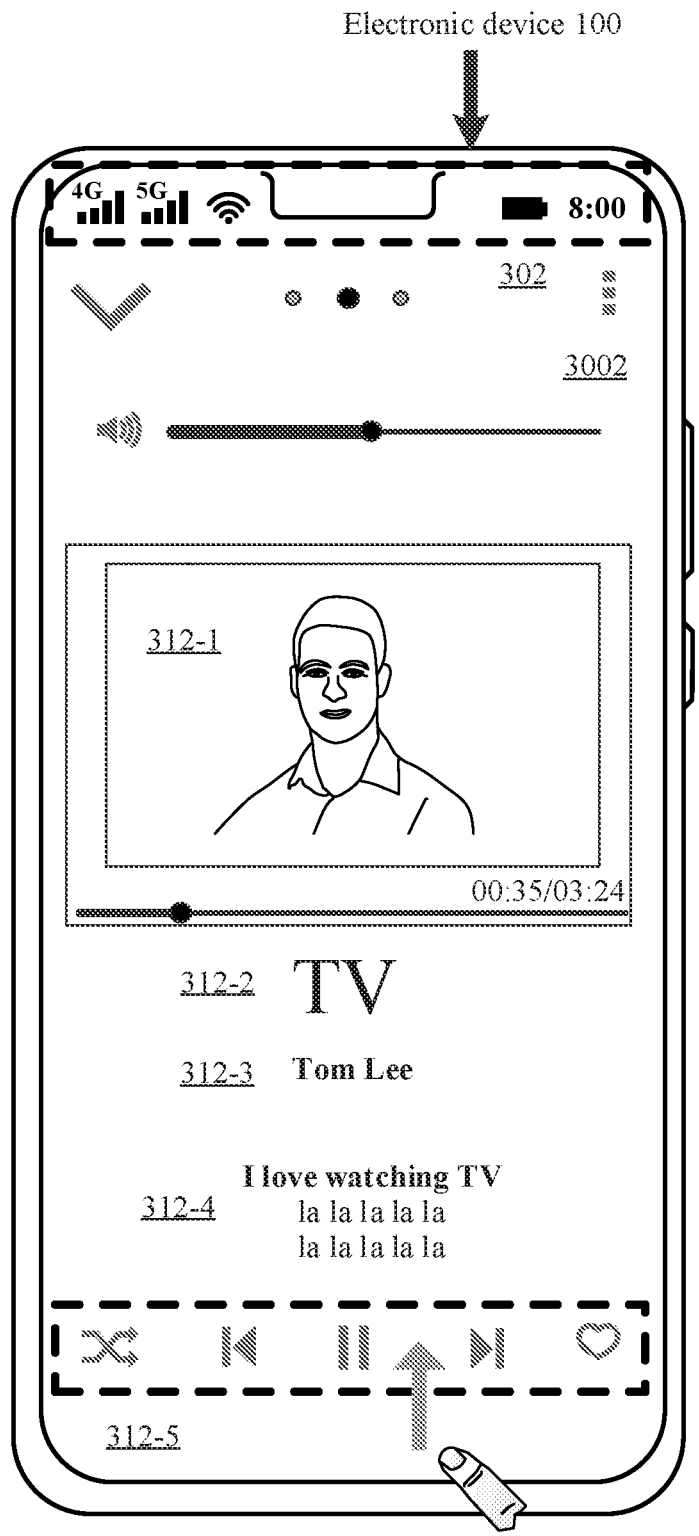
Figure 3F:
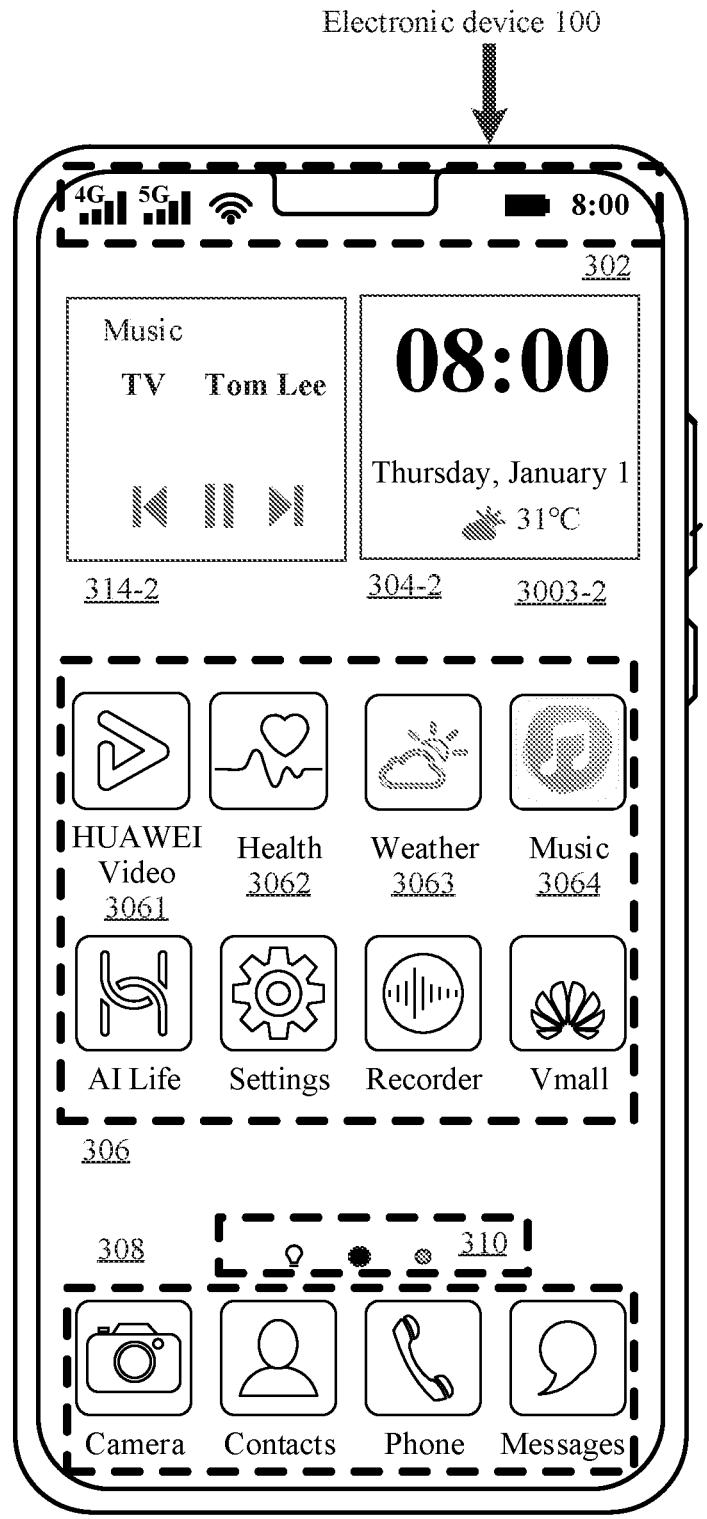
Figure 3F:
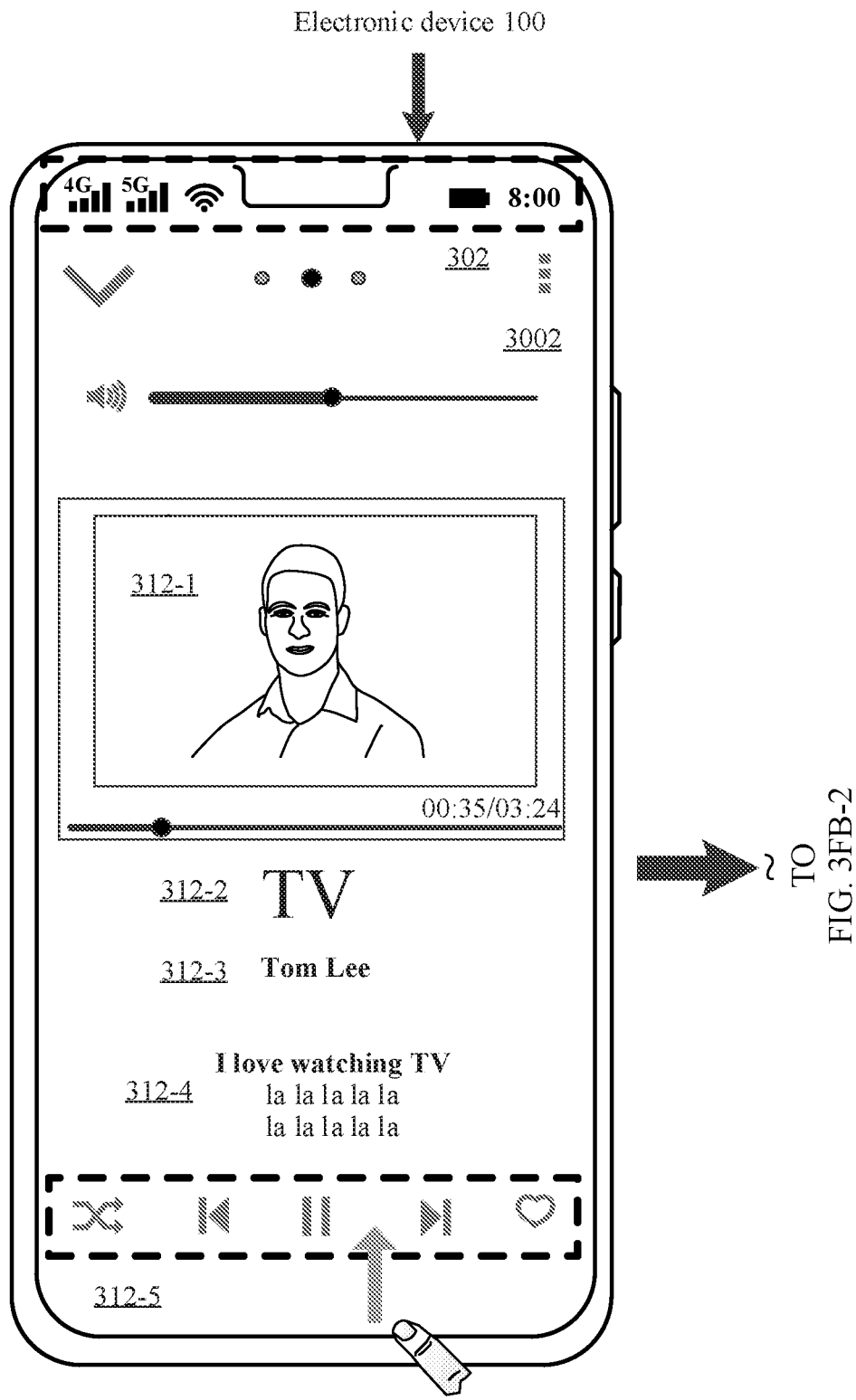
Figure 3F:
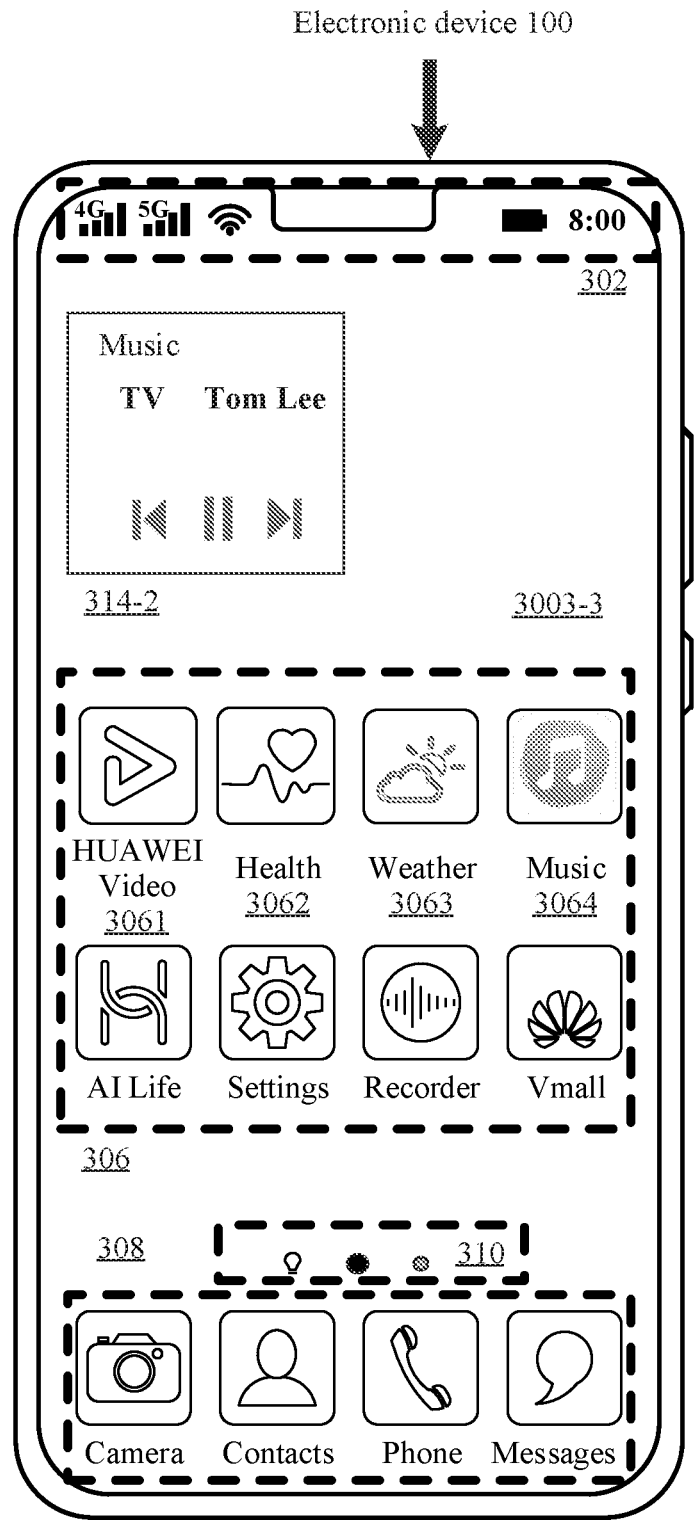
Figure 3F:
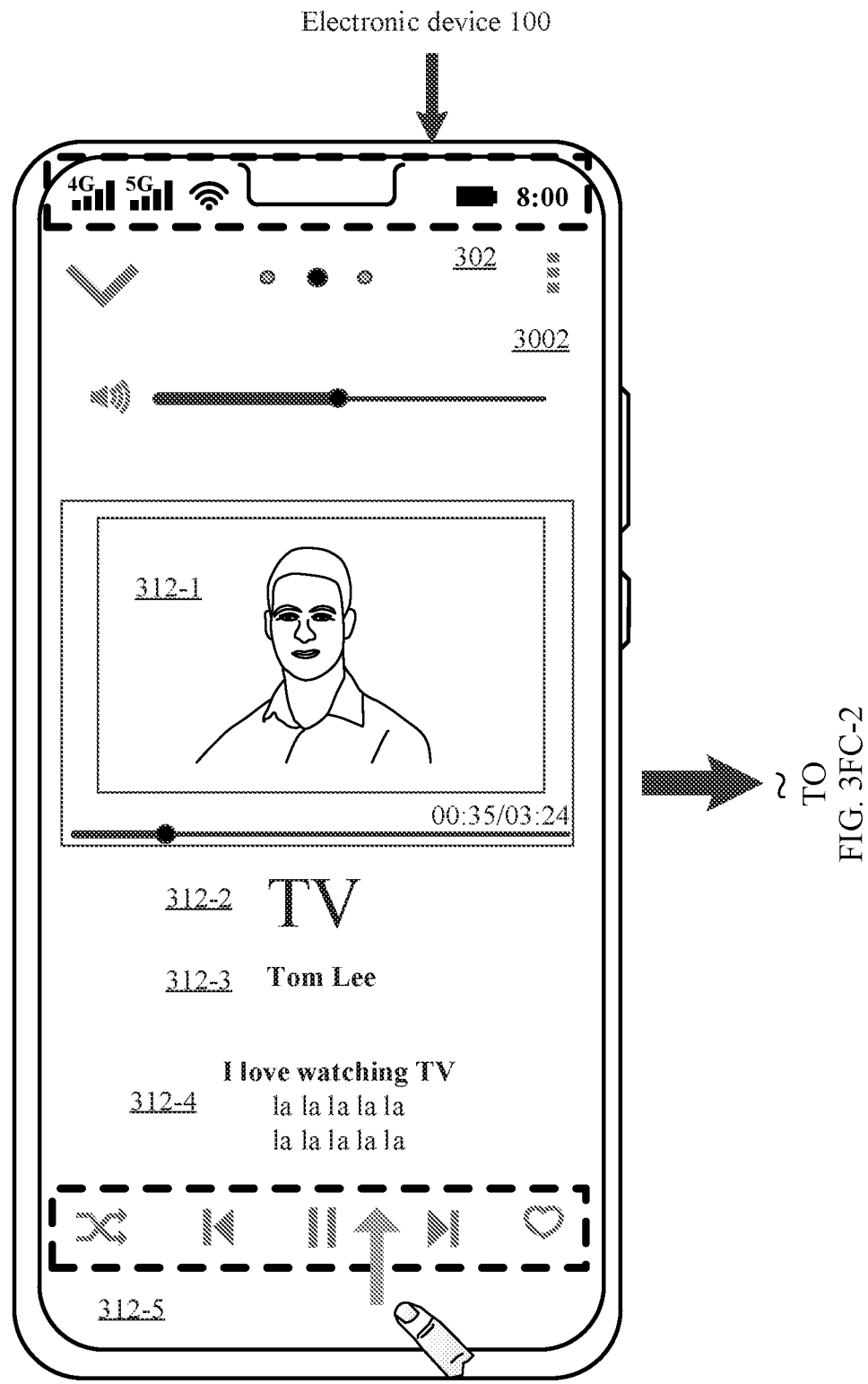
Figure 3F:
Figure 3F:
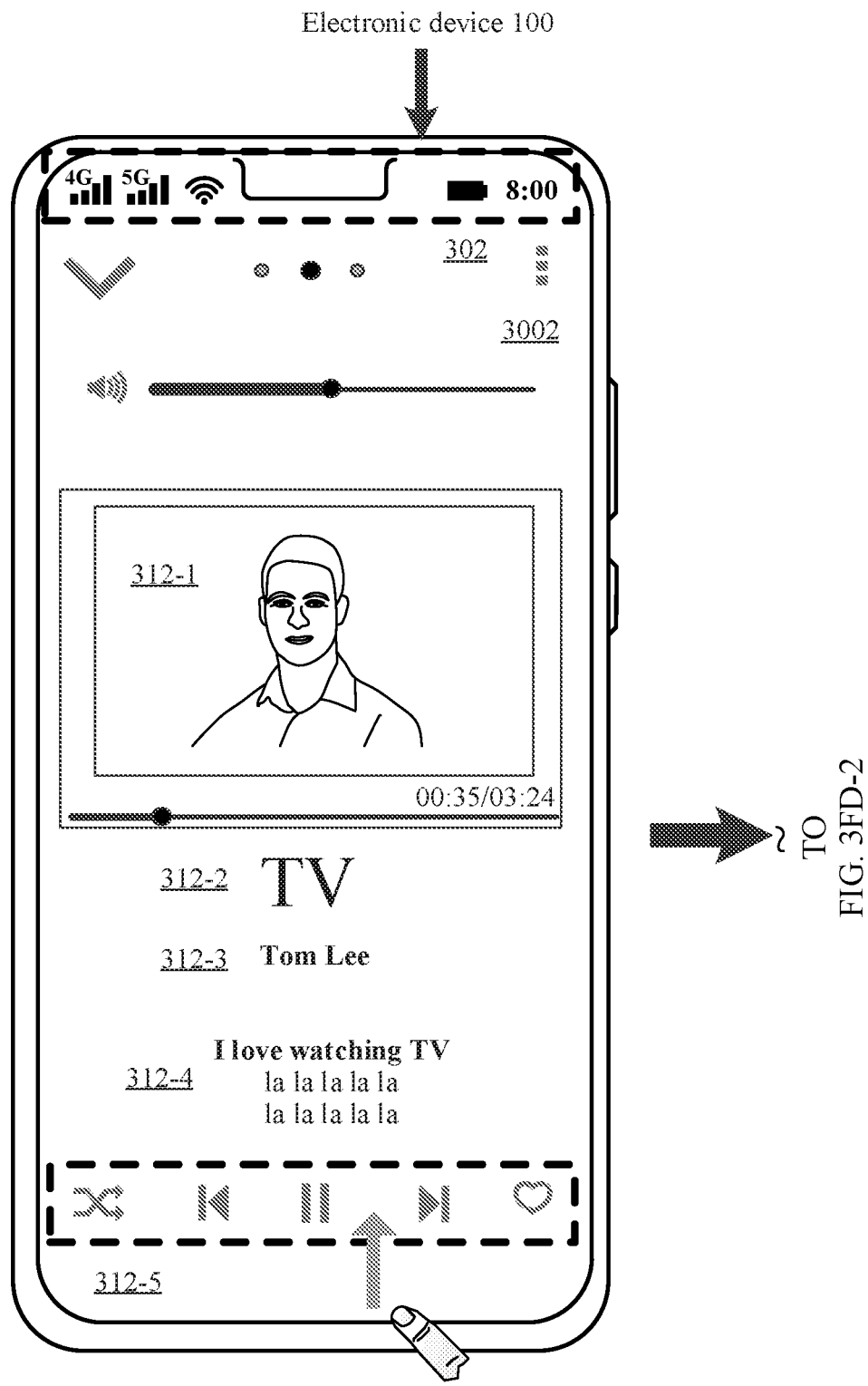
Figure 3F:
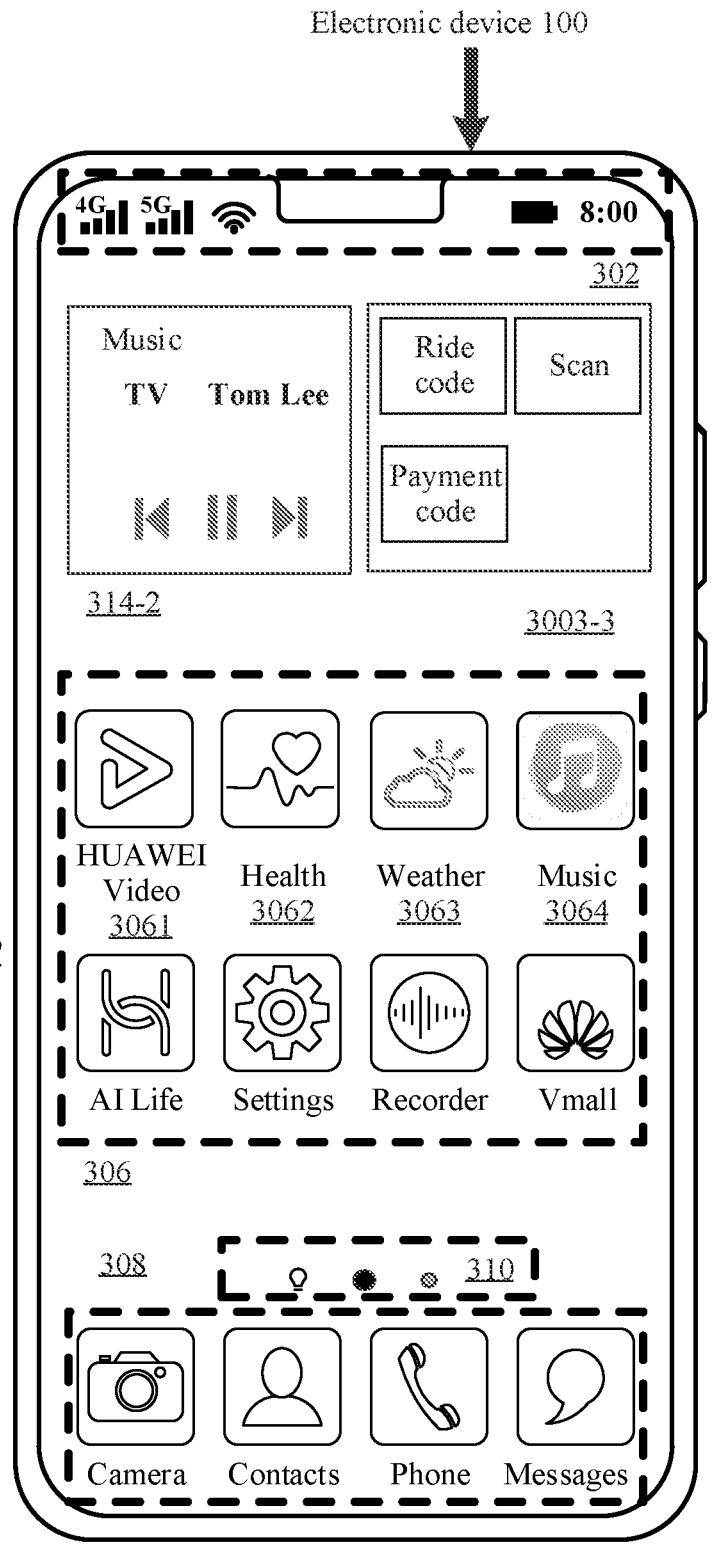

For example, the home screen may display a graphical user interface 3003-2, as shown in FIG. 3FA-1 and FIG. 3FA-2. The graphical user interface 3003-2 may include the music widget 314-2 and the time weather widget 304-2. The electronic device 100 displays the music widget 314-2 and the time weather widget 304-2 in an area that is on the home screen and in which the time weather widget 304-1 has been displayed. Optionally, the music widget 314-2 and the time weather widget 304-2 have a same size. In some embodiments, the sizes of the music widget 314-2 and the time weather widget 304-2 may be different. In some embodiments, the time weather widget 304-2 may display less content than the time weather widget 304-1. In some embodiments, the content displayed by the music widget 314-2 may include a widget name "Music", the song name "TV", the singer "Tom Lee", and an operation control. In some embodiments, the content displayed by the music widget 314-2 may further include the lyrics, the album name, and the like. It should be understood that a location layout of the content displayed by the music widget 314-2 is an example.

When detecting that the ongoing task (ongoing task) exists in the media application, the electronic device 100 can automatically display the widget of the application in the area that is on the home screen of the electronic device 100 and in which the widget 304-1 has been displayed. This implements automatic addition of the widget, and the location of the widget 304-1 can also be reused. The screen space of the electronic device is limited. The location of another widget is reused, so that the home screen can be clean and tidy, the widget does not need to be added at a new location, and more information can be provided for the user.

It should be understood that an order in which the widgets are sorted in the graphical user interface 3003-2 is an example. In some embodiments, the music widget 314-2 is displayed on a left side of the time weather widget 304-2 as a higher-priority widget. In some embodiments, the electronic device may arrange a high-priority widget on a right side. In some embodiments, the manner in which the music widget 314-2 and the time weather widget 304-2 are arranged may be up and down (not shown in the figure).

Optionally, the electronic device 100 detects that the ongoing task exists in the music application, and the electronic device 100 displays only the music widget 314-2 in the area that is on the home screen and in which the time weather widget 304-1 has been displayed, as shown in FIG. 3FB-1 and FIG. 3FB-2. The music widget 314-2 may have a smaller size than the time weather widget 304-1. In some embodiments, the electronic device 100 may display another widget (for example, a common service widget, and the common service widget may include a scan control, a ride code control, or a payment code control, and the user may quickly enter an application interface by tapping the scan control, the ride code control, or the payment code control) while displaying the music widget 314-2 on the home screen, for example, as shown in FIG. 3FD-1 and FIG. 3FD-2. It should be understood that a location layout of the content displayed by the music widget 314-2 is an example.

Optionally, the electronic device 100 detects that the ongoing task exists in the music application, and the electronic device 100 replaces a displayed music widget 314-1 in a same area that is on a graphical user interface 3003 and in which the time weather widget 304-1 has been displayed. The music widget 314-1 has a same size as the time weather widget 304-1. For example, the electronic device 100 displays a GUI shown in FIG. 3FC-1 and FIG. 3FC-2. Content displayed by the music widget 314-1 may include the widget name "Music", the song name "TV", the singer "Tom Lee", and the operation control. In some embodiments, the content displayed by the music widget 314-1 may further include content such as the lyrics and the album name. In some embodiments, the music widget 314-1 may display more or same content than or as the music widget 314-2 in FIG. 3FA-1 and FIG. 3FA-2 or FIG. 3FB-1 and FIG. 3FB-2. It should be understood that a location layout of the content displayed by the music widget 314-2 is an example.

Figures 1, 3G:
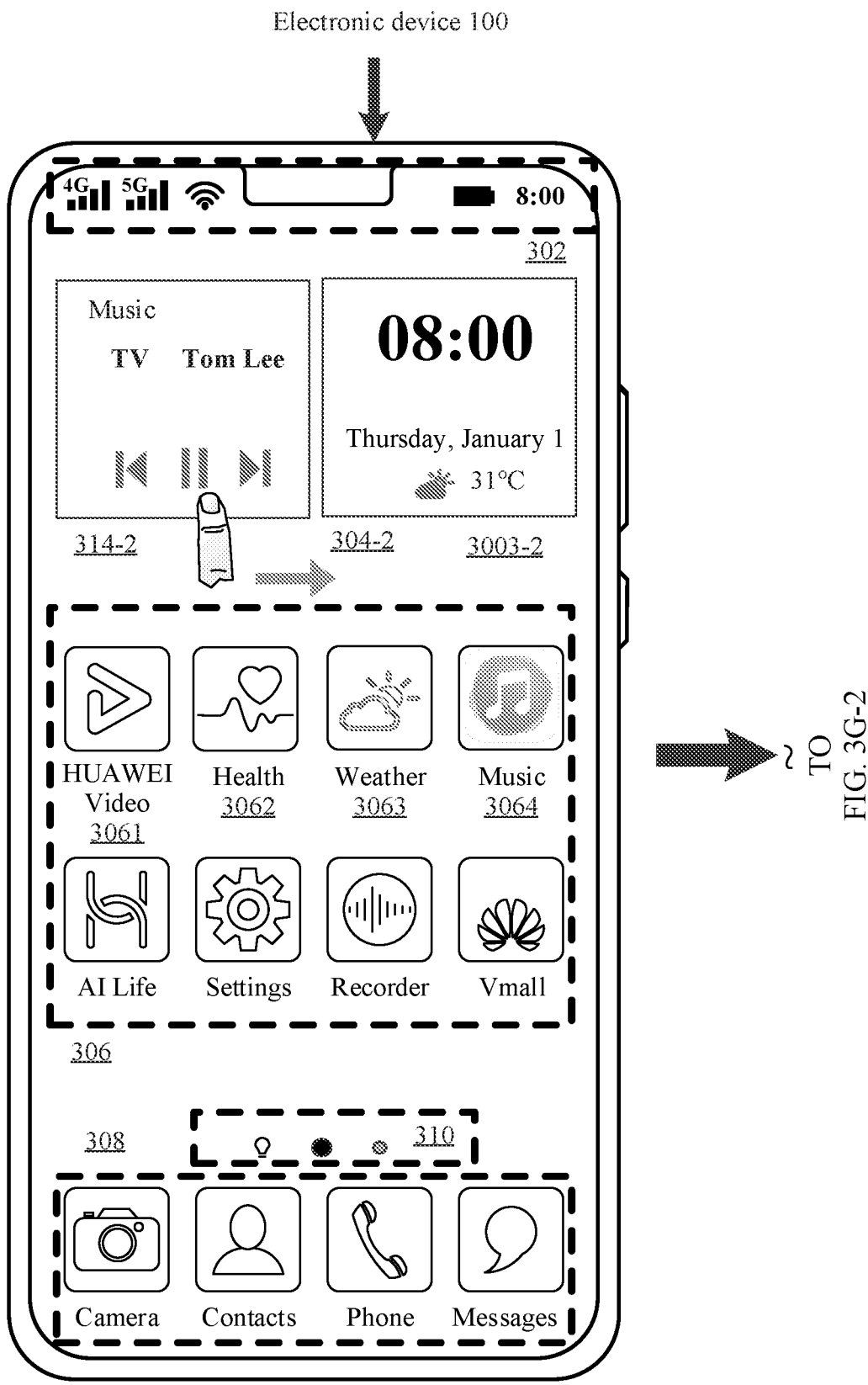
Figures 2, 3G:
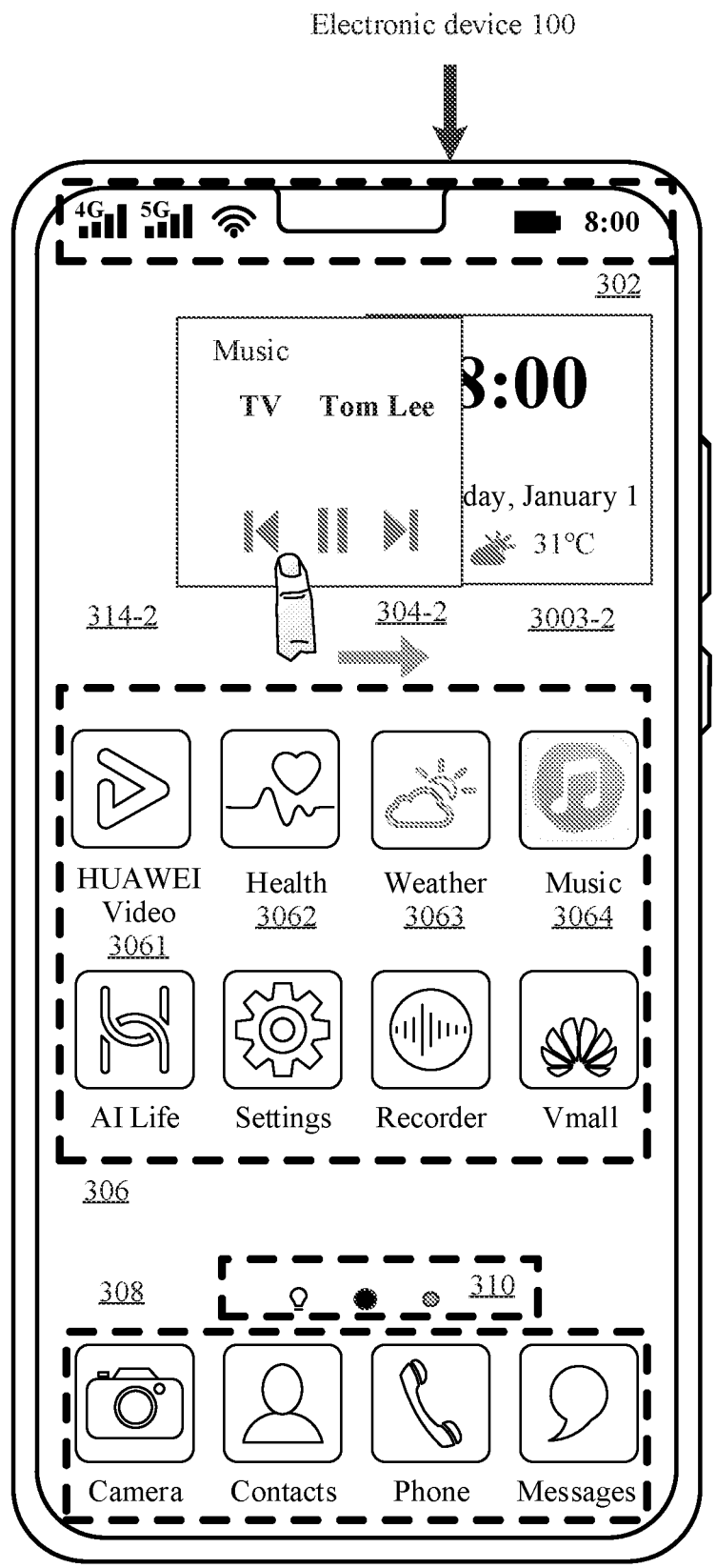
Figures 3, 3G:
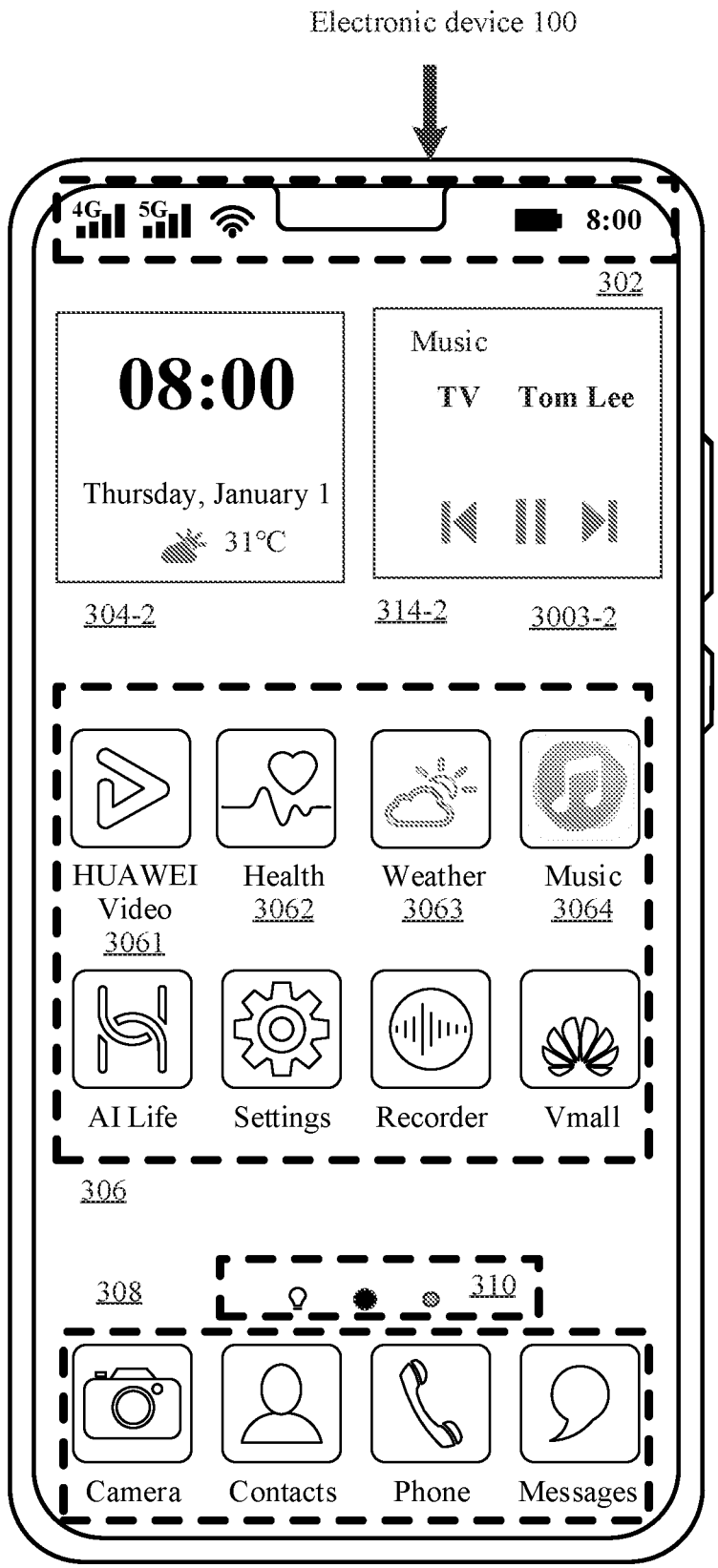

When detecting that the ongoing task (ongoing task) exists in the media application, the electronic device 100 can automatically display the media widget on the home screen of the device, and display the widget in the area that is on the graphical interface and in which the time weather widget has been displayed. This implements automatic addition of the widget, and the location of the time weather widget can also be reused. There are many places in which time is displayed and viewed on the electronic device, and although the device displays the weather time widget on the home screen, the user does not use the weather time widget in most cases. Therefore, by using the technical solutions in this embodiment, the location of the weather time widget may be reused for displaying the widget of the application that includes the ongoing task. Screen space of the electronic device is limited. The location of the time weather widget is reused, so that the home screen can be clean and tidy, the widget does not need to be added at a new location, and information that is required by the user and has a higher priority can be provided for the user. In some embodiments, the electronic device 100 may detect the input predefined gesture, and change an order of widgets displayed on the home screen. It should be understood that, the widgets may include all widgets described in embodiments of this application. For example, the widgets may include a cross-device widget described in the embodiments of FIG. 4A to FIG. 4F-1 and FIG. 4F-2, the schedule widget described in the embodiments of FIG. 5A to FIG. 5EC-1 and FIG. 5EC-2, and the instant messaging application widget described in the embodiments of FIG. 6A-1 and FIG. 6A-2 to FIG. 6G. For example, as shown in FIG. 3G-1 to FIG. 3G-3, the electronic device 100 adjusts a display order of the time weather widget and the music widget after detecting a gesture operation of pressing the music widget and dragging the music widget to the right performed by the finger of the user. In some embodiments, the order is related to a priority. A change of the arrangement order of the widgets means a change of the priority of the widgets.

In some embodiments, the electronic device 100 may detect the input predefined gesture, and adjust sizes of widgets displayed on the home screen and/or content displayed by the widgets. It should be understood that, the widgets may include all widgets described in embodiments of this application. For example, the widgets may include the cross-device widget described in the embodiments of FIG. 4A to FIG. 4F-1 and FIG. 4F-2, the schedule widget described in the embodiments of FIG. 5A to FIG. 5EC-1 and FIG. 5EC-2, and the instant messaging application widget described in the embodiments of FIG. 6A-1 and FIG. 6A-2 to FIG. 6G. In some embodiments, the electronic device 100 may detect the input predefined gesture, and change a layout of the content displayed by the widgets.

Figure 3H:
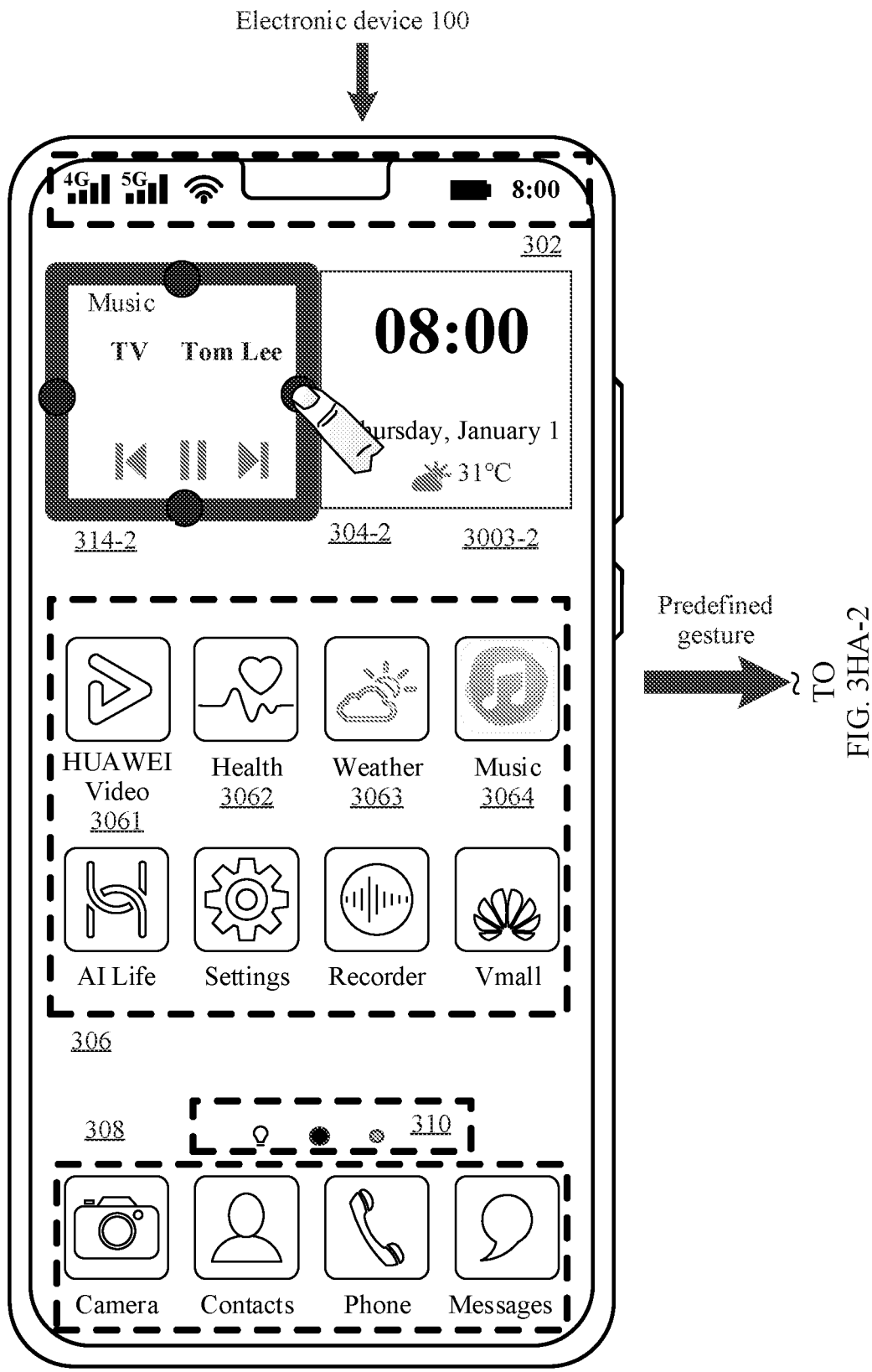
Figure 3H:
Figure 3H:
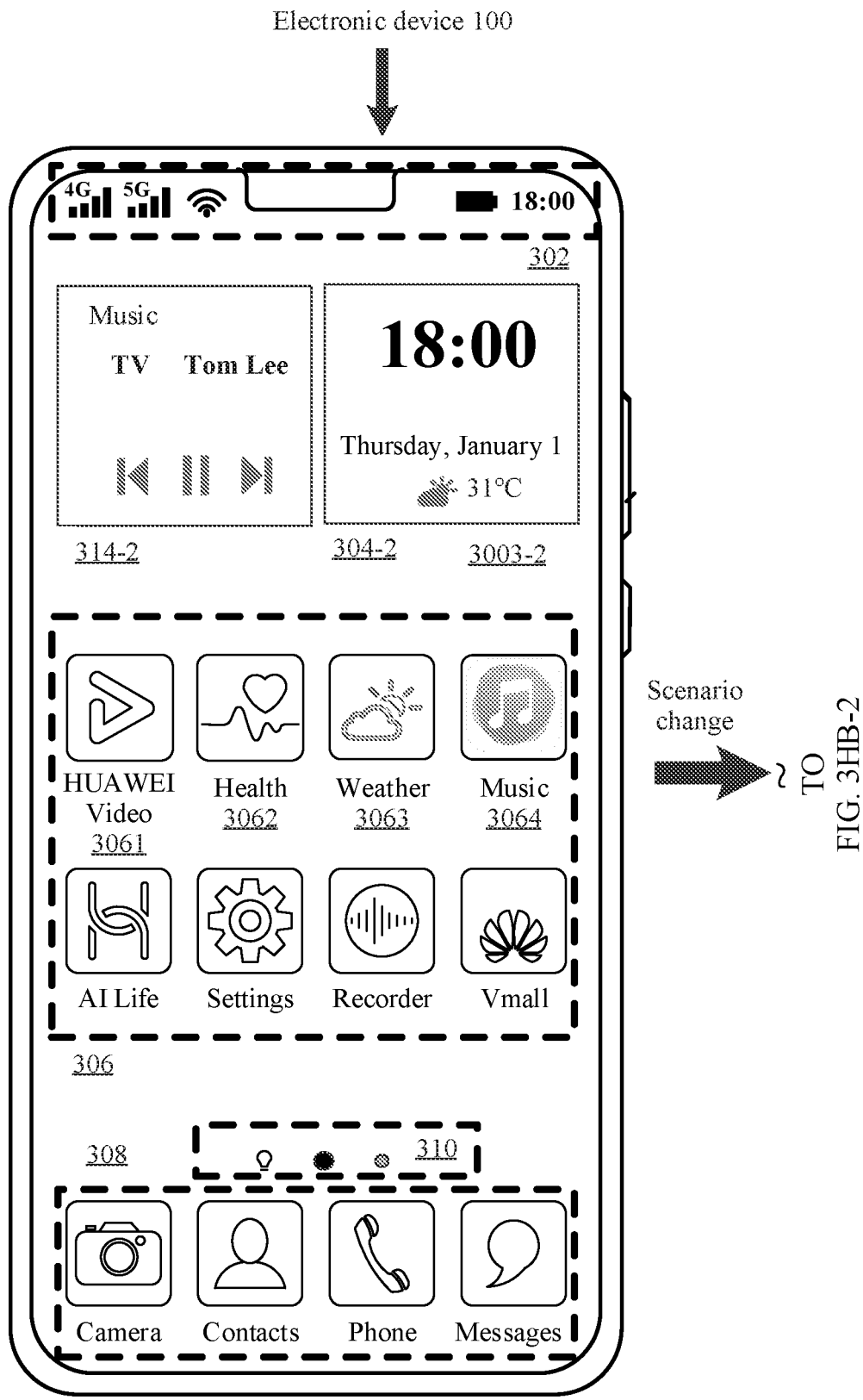
Figure 3H:
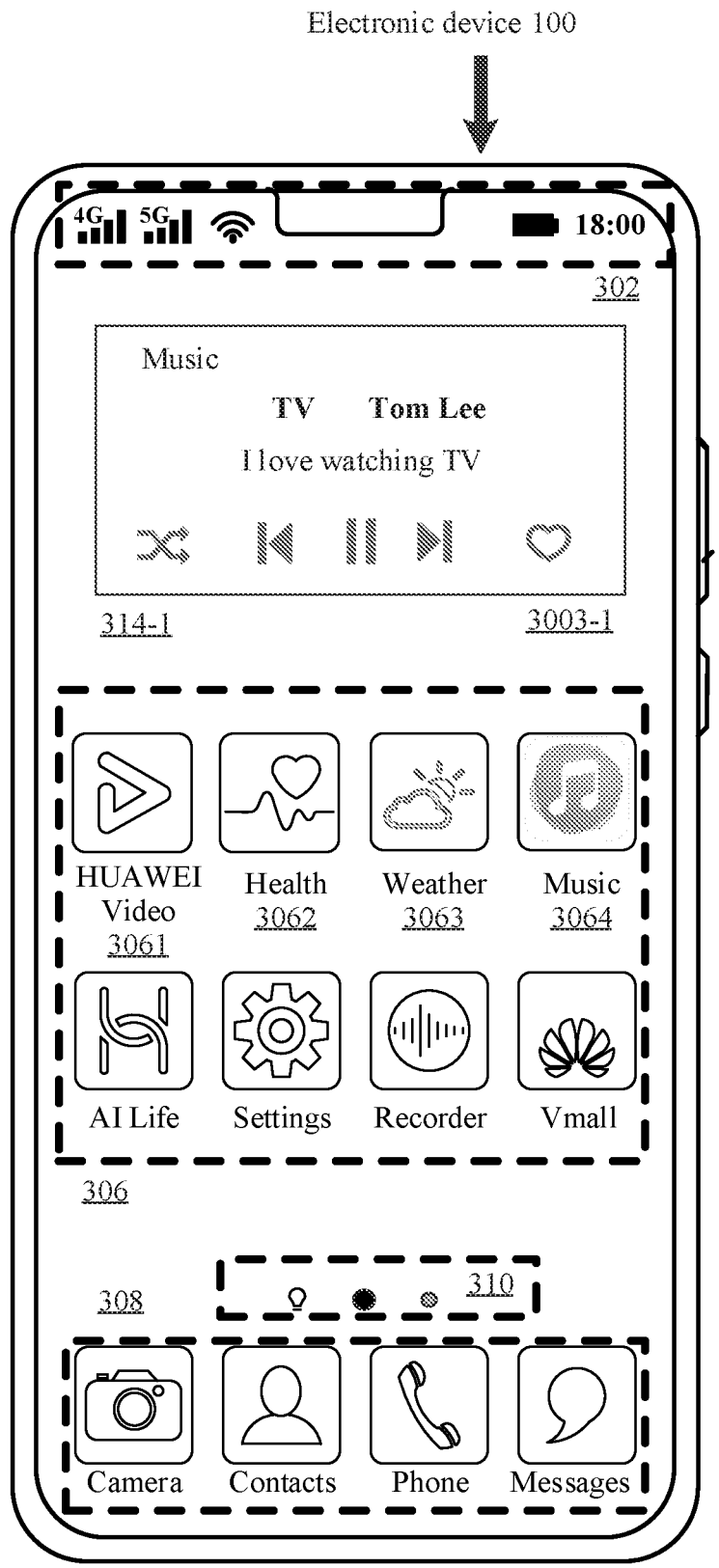

For example, as shown in FIG. 3HA-1 and FIG. 3HA-2, the electronic device 100 detects that the finger of the user touches and holds an edge of the music widget 314-2, and the music widget 314-2 enters an editable state. After the electronic device 100 detects a gesture operation of touching and holding a right edge of the widget and dragging the widget to the right performed by the user, the electronic device 100 switches to display a graphical user interface 3003-1. Compared with the music widget 314-2 in the graphical user interface 3003-2, the graphical user interface 3003-1 does not display the widget 3003-2, and display only the music widget. In addition, the displayed music widget 314-1 is enlarged in size. In some embodiments, a width of the music widget 314-1 displayed on the graphical user interface 3003-1 is a maximum width of the widget that can be displayed by the electronic device 100 on the home screen. In some embodiments, the widget with the size enlarged may display more content. For example, compared with the music widget 314-2, the content displayed by the widget 314-1 with the size enlarged may further include a part of the lyrics. In some embodiments, compared with the music widget 314-2, a layout of the content (including but not limited to the widget name, the song name, the singer, and the operation control) displayed by the music widget 314-1 can be different. It should be understood that, after detecting the input predefined gesture (for example, a gesture operation of touching and holding the right edge of the widget and dragging the widget to the left), the electronic device 100 may also reduce the size of the widget. For example, in FIG. 3HA-1 and FIG. 3HA-2, after detecting the input predefined gesture (for example, a gesture operation of touching and holding a right edge of the widget 314-1 and dragging the widget to the left), the electronic device 100 reduces the size of the 314-1 widget, for example, the widget 314-1 with the size reduced may look like the widget 314-2.

After detecting the predefined gesture of the user, the electronic device 100 adjusts the size of the widget displayed on the home screen, so that limited space of the screen can be efficiently used, the user can view different widgets and interact with different widgets, and interaction efficiency is improved.

In some embodiments, the electronic device 100 may further detect a scenario change, to adjust the size of the media widget displayed on the home screen and/or the content displayed by the media widget, and/or the layout of the content displayed by the media widget.

In some embodiments, the media widget may have a time tag and/or a geographical location tag. The time tag and/or the geographical location tag may be manually added by the user, or may be generated by the electronic device 100 based on a usage habit of the user for the media application. For example, the user often listens to music before going to bed at 22:00 p.m., and the electronic device 100 collects statistics on time and frequency of using the music application by the user, to add the time tag to the music application. The time tag is 22:00 p.m. For example, if the user often listens to music at home, the electronic device collects statistics on a geographical location and the frequency of using the music application by the user, to add the geographical location tag to the music application. The geographical location tag is home.

When the electronic device 100 detects that a difference between system time of the electronic device and the time tag "22:00" is less than a preset value of a time threshold, and/or when the electronic device 100 detects that a distance difference between a geographical location of the device and the geographical location tag "home" is less than a preset value of a distance threshold, the electronic device 100 adjusts the size of the music widget on the home screen and/or the content displayed by the music widget. In some embodiments, the electronic device 100 may enlarge the size of the music widget. In some embodiments, the content displayed by the music widget with the size enlarged may be increased. For example, as shown in FIG. 3HB-1 and FIG. 3HB-2, the electronic device 100 displays the music widget 314-2 on the home screen, and the electronic device 100 detects a change of the time and/or geographical location, and switches to display the GUI 3003-1. Compared with the widget 314-2 displayed on the GUI 3003-2, content added to be displayed on the music widget 314-1 displayed on the GUI 3003-1 may include a word "I love watching TV", the operation control (for example, a shuffle or favorites button), and the like.

In some embodiments, the electronic device 100 may further detect brightness of ambient light by using an ambient light sensor to determine the scenario change, so as to automatically adjust the size of the media widget and/or the content displayed by the media widget, and/or the layout of the content displayed by the media widget. For example, when the user enters a dimly lit environment from a brightly lit place, if the widget is still a small-sized widget, the user may not be able to see text presented by the widget. Therefore, to meet a user requirement, the size of the widget can be automatically adjusted for large size display, and a displayed font is enlarged. Optionally, the displayed control may also be enlarged. The electronic device 100 may detect the scenario change, to adjust the size of the media widget and/or the content displayed by the media widget, and/or the layout of the content displayed by the media widget, so as to provide the user with more information, facilitate interaction with the user, and improve user experience.

In some embodiments, the electronic device 100 detects the scenario change (for example, the electronic device 100 detects that the user determines that the scenario changes by detecting that a time difference between the system time of the electronic device 100 and scenario time is greater than the preset value of the time threshold, and/or a distance difference between the geographical location of the electronic device 100 and a scenario geographical location is greater than the preset value of the distance threshold, to determine that the scenario changes), and may adjust the size of the media widget and/or the content displayed by the media widget, and/or the layout of the content displayed by the media widget. After detecting a change of the scenario of the user again, the electronic device 100 may restore the media widget to a display manner before status adjustment. The status adjustment includes adjusting the size of the media widget and/or the content displayed by the media widget, and/or the layout of the content displayed by the media widget.

In some embodiments, the music widget 314-1 is displayed on the home screen of the electronic device 100, the width of the music widget 314-1 is approximately equal to a width of the screen, and lyrics of a song being played are displayed on the music widget 314-1. When the electronic device 100 switches to display another page on the home screen, or enters another application interface, the electronic device 100 displays the music widget 314-1 in a floating widget state, and the widget is in a transparent state, and displays only lyrics, as shown in FIG. 3J-1 and FIG. 3J-2. Optionally, after the electronic device 100 detects the predefined gesture (for example, single-tap) on the widget, the widget is displayed in a semi-transparent state, and the widget displays the operation control.

In some embodiments, after the electronic device 100 detects the predefined gesture (for example, activating a pausing control on the widget, sliding the widget, or activating a delete control on the widget) entered by the user, the electronic device 100 stops displaying the media widget on the home screen, and displays the application widget 304-1.

Figures 1, 3I:
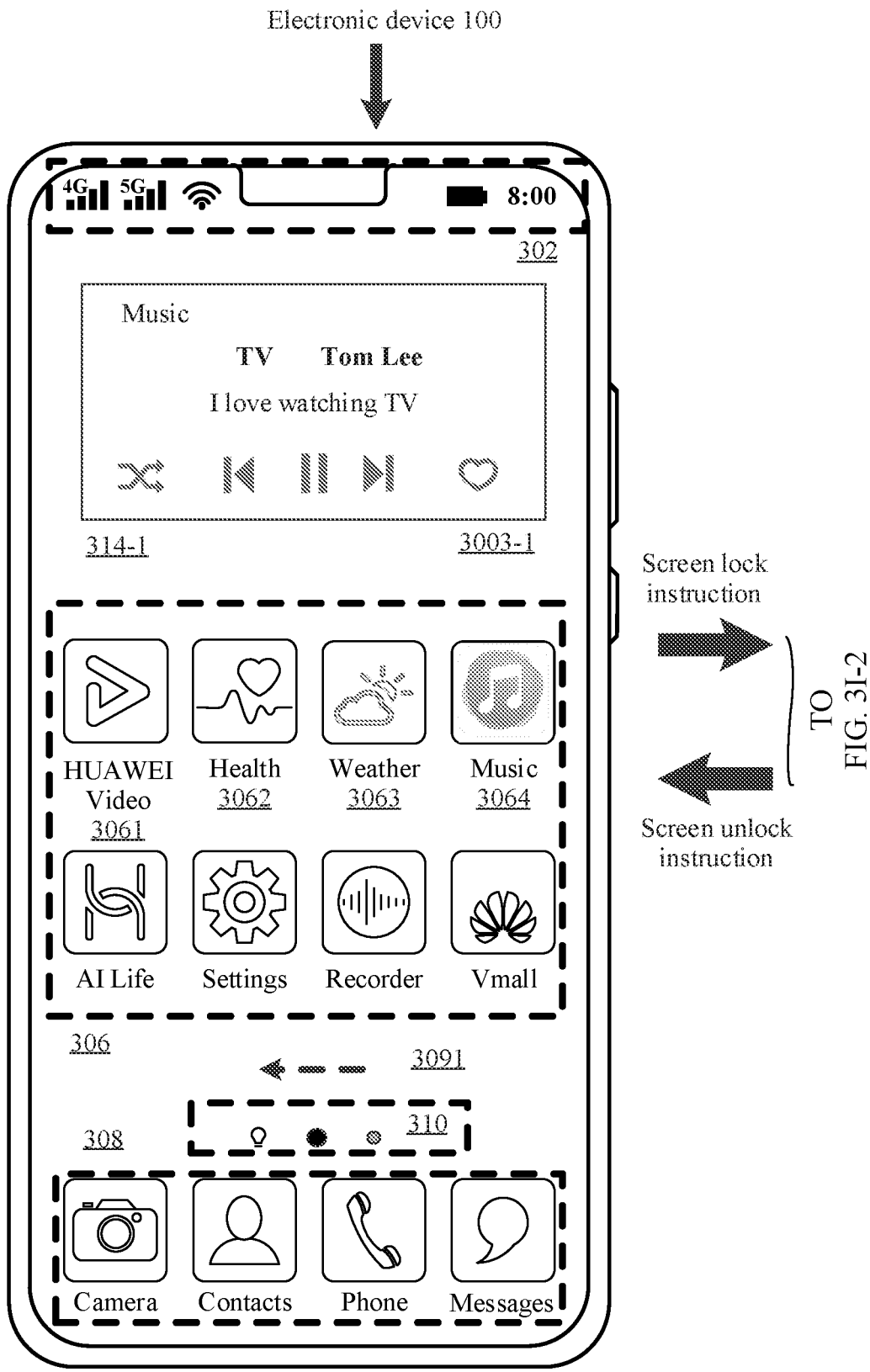
Figures 2, 3I:
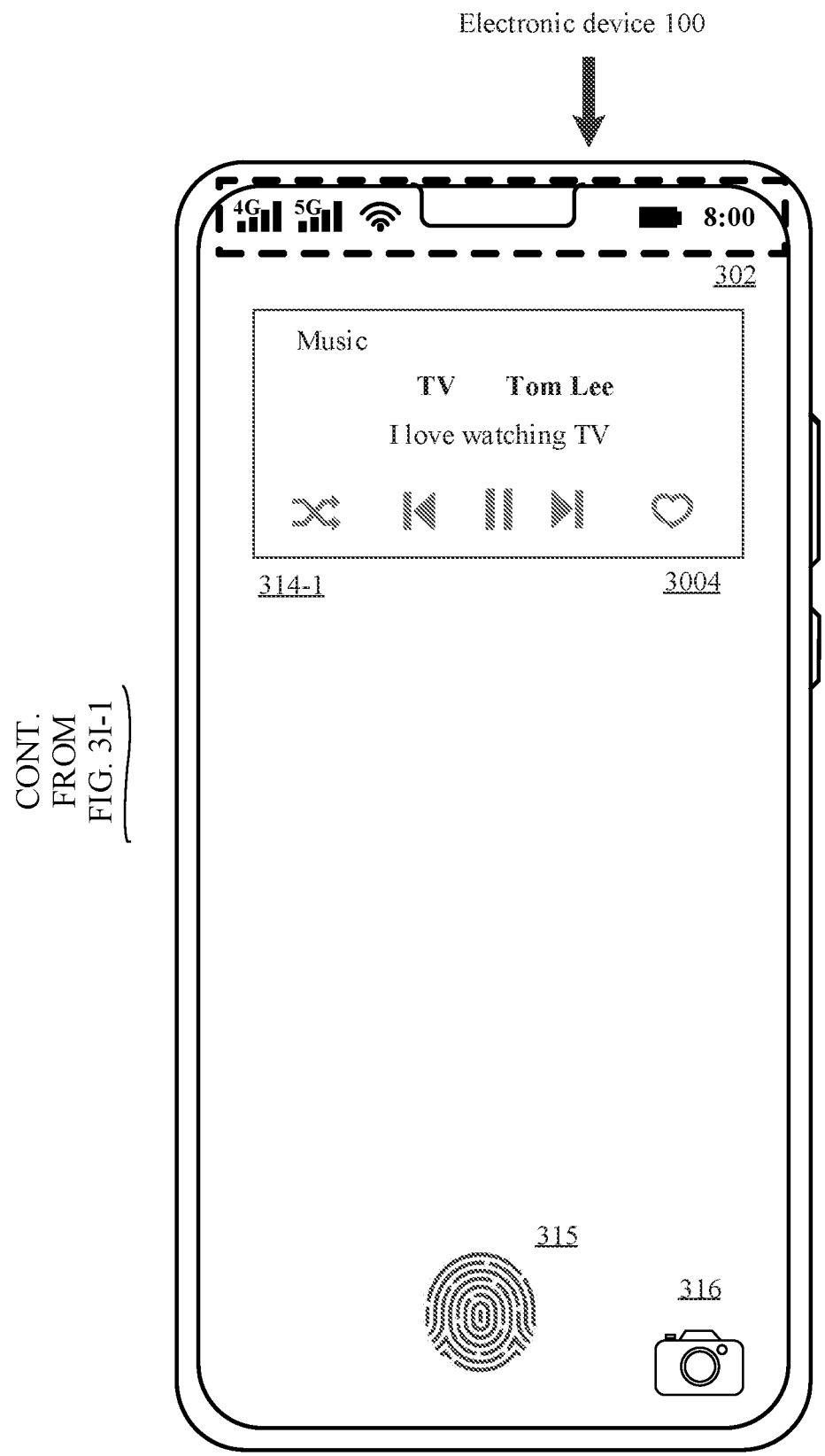
Figures 1, 3J:
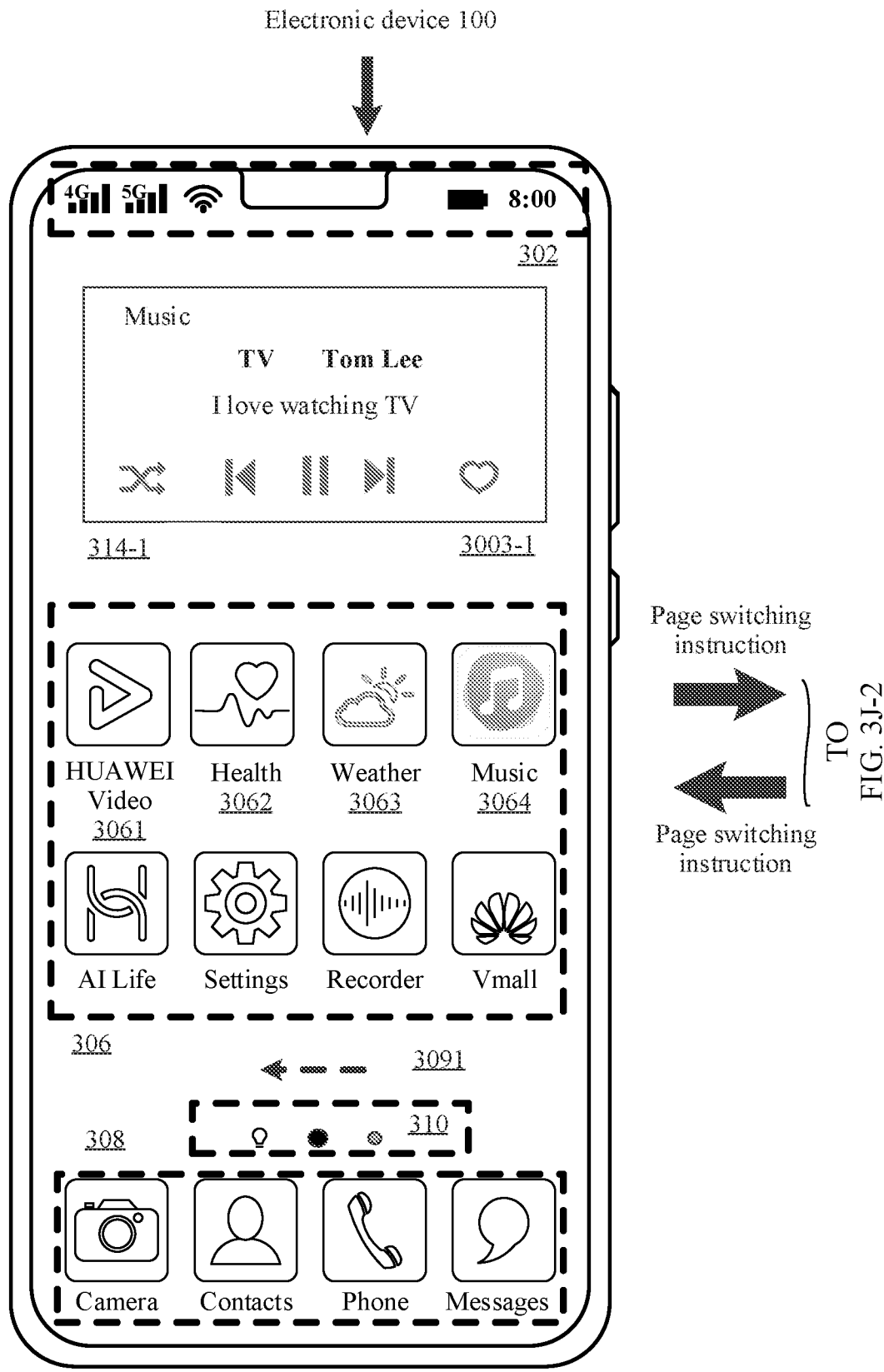
Figures 2, 3J:
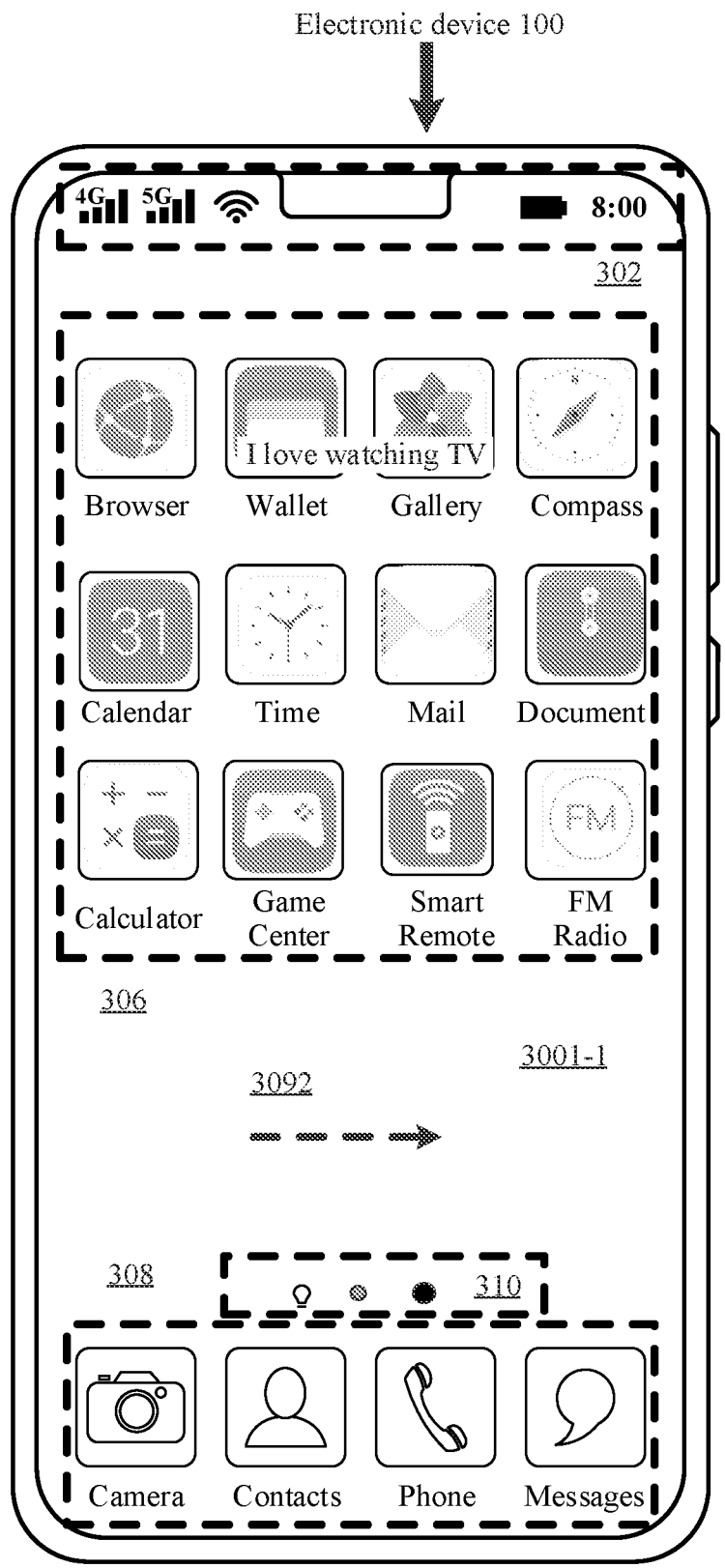
Figures 1, 3K:
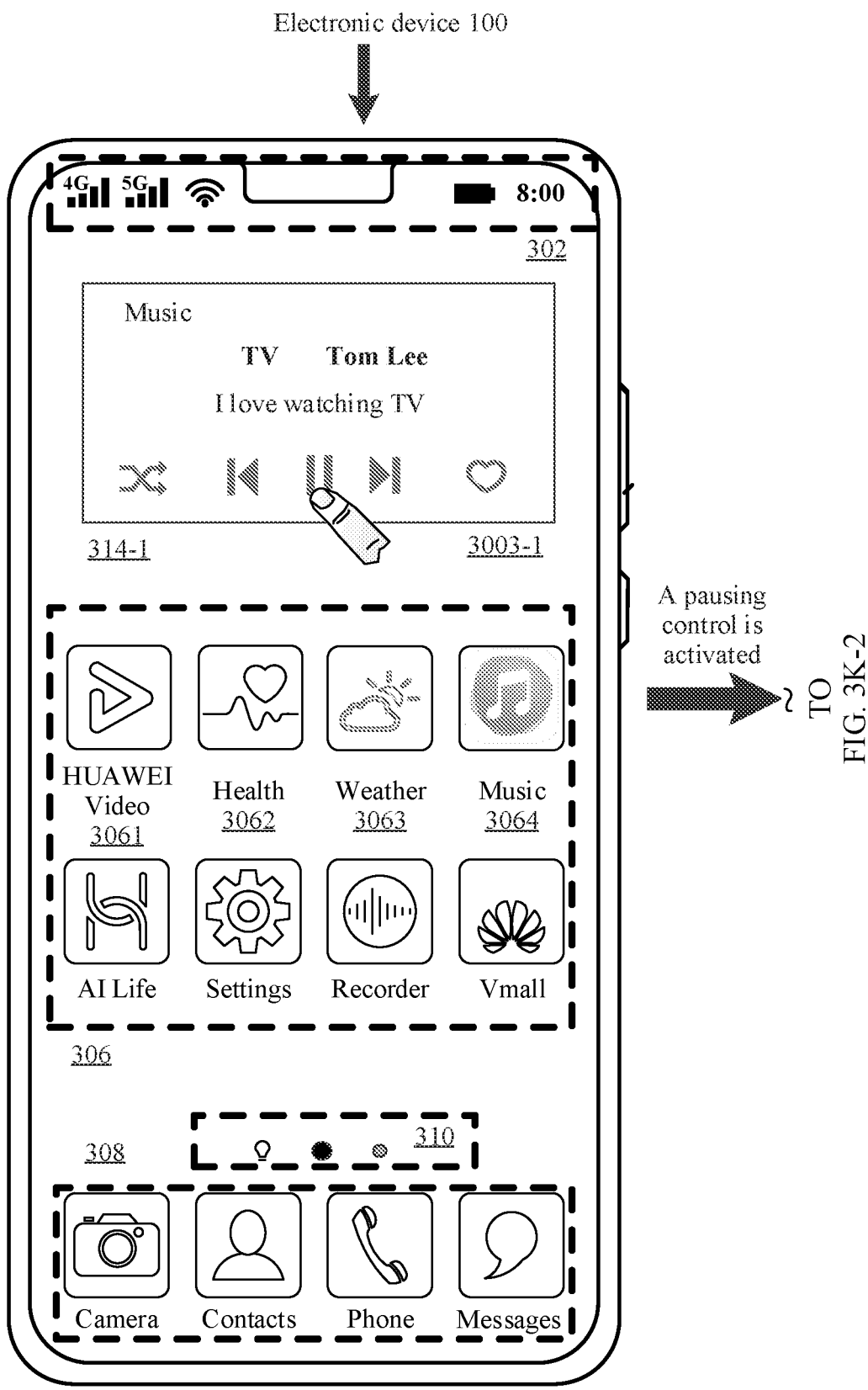
Figures 2, 3K:
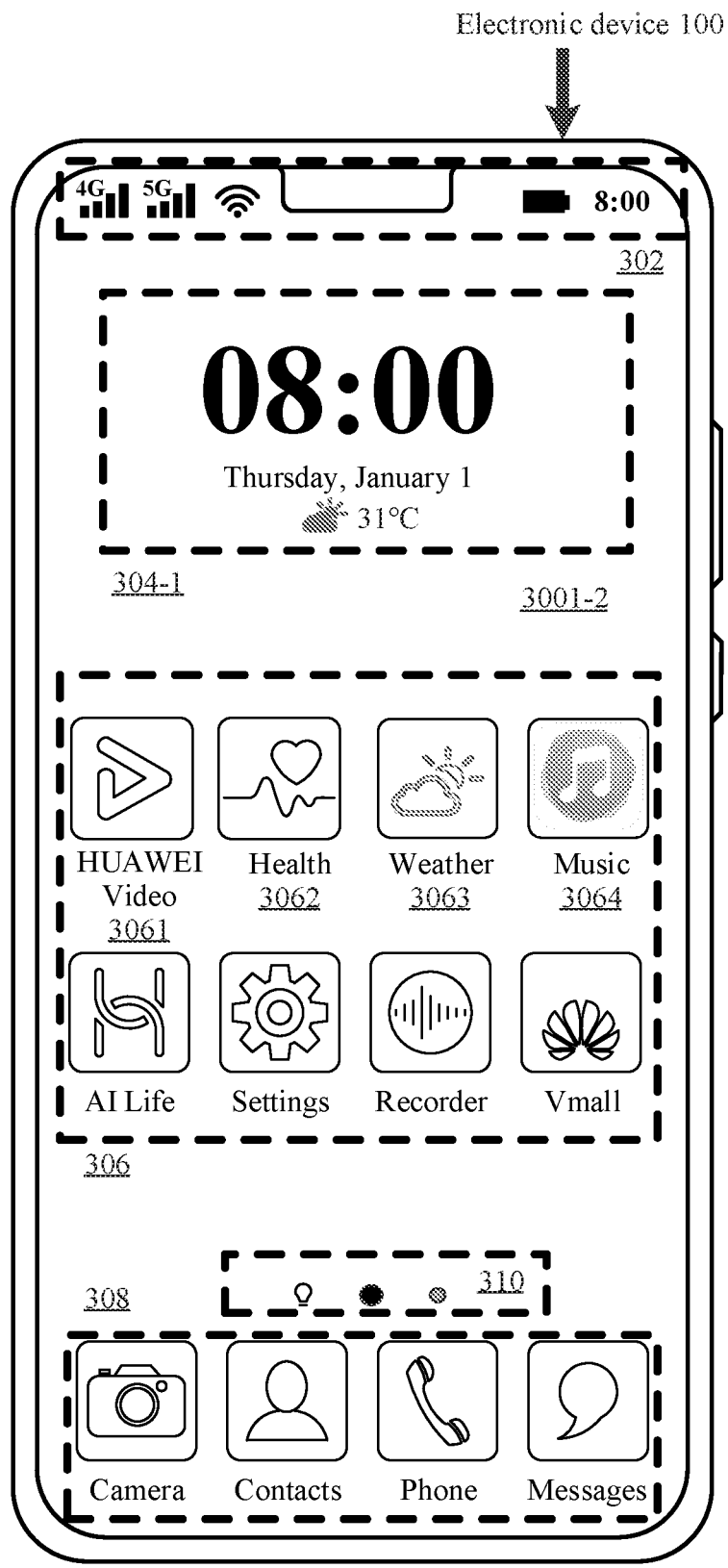

For example, as shown in FIG. 3K-1 and FIG. 3K-2, the music widget 314-1 is displayed on the home screen of the electronic device 100. After the electronic device 100 detects that the user taps the pausing button on the music widget, the electronic device 100 switches to display the GUI 3002-1, and the electronic device 100 stops displaying the music widget. A widget displayed on the home screen of the electronic device 100 is the time weather widget 304-1. The electronic device 100 detects that the user performs the predefined operation (for example, tapping the pausing control, tapping the delete control, or a slide gesture) on the media widget, and the electronic device 100 stops displaying the media widget on the home screen, and displays another widget in limited screen space, to facilitate interaction between the user and the another widget.

Figures 1, 3L:
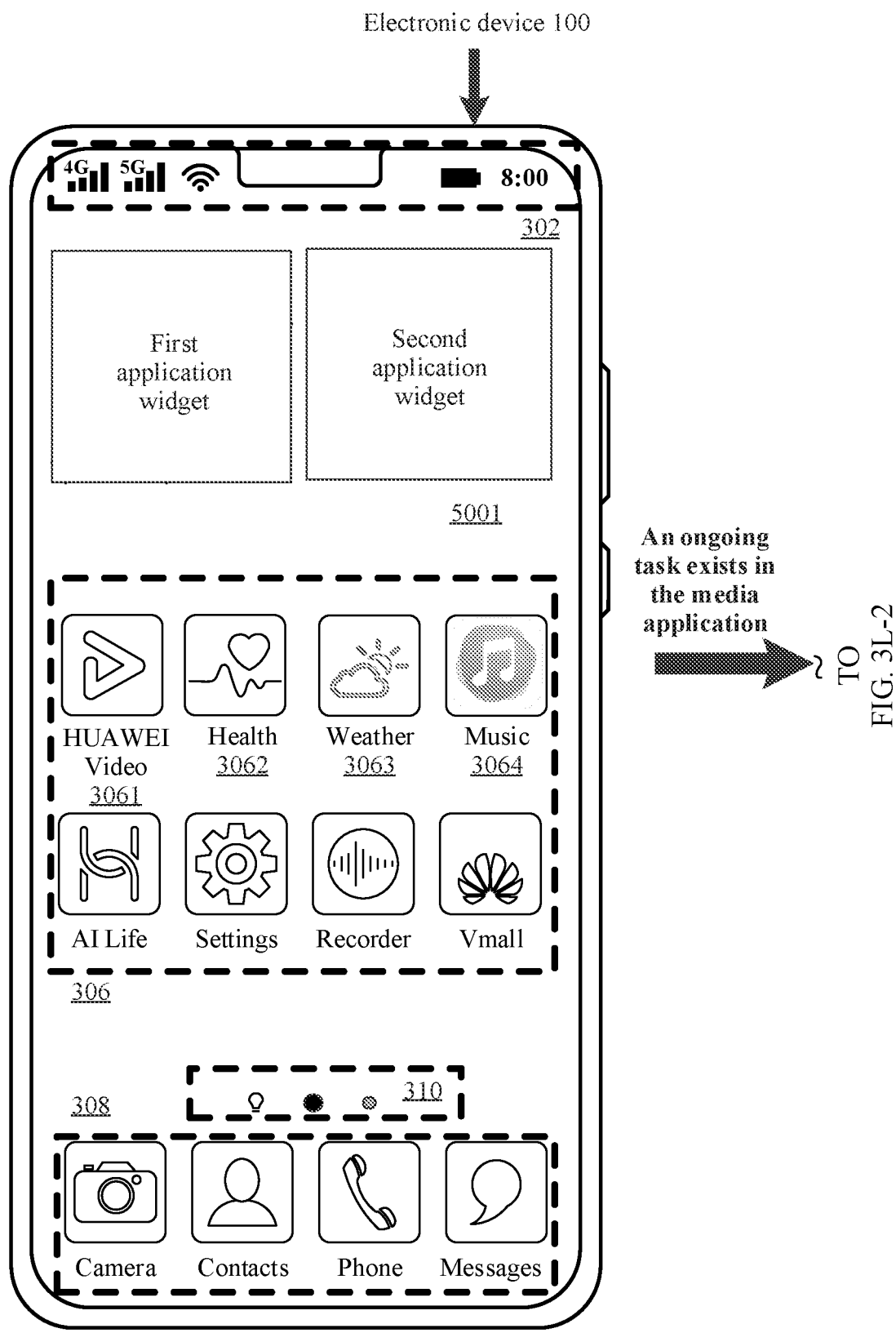
Figures 2, 3L:
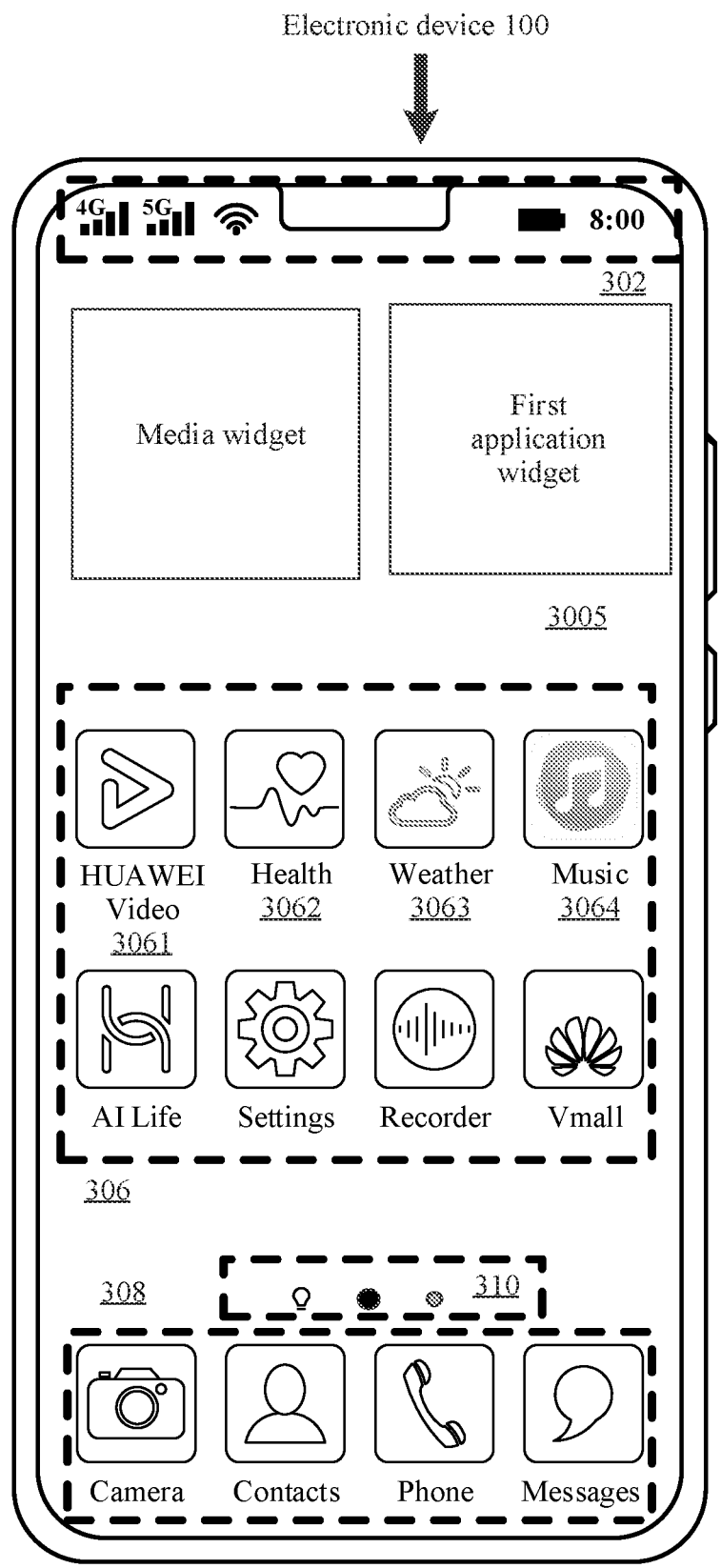

In some embodiments, at least two application widgets are displayed on the home screen of the electronic device 100. For example, as shown in FIG. 3L-1 and FIG. 3L-2, a GUI 5001 includes a first application widget and a second application widget. It should be understood that, in some embodiments, the first application widget may alternatively be one of the following widgets: a time weather widget, a slide widget, an instant messaging application widget, or a schedule widget. The slide widget may be obtained according to the technical solution recorded in the embodiments of FIG. 4A to FIG. 4F-1 and FIG. 4F-2, a messages widget may be obtained according to the technical solution recorded in the embodiments of FIG. 6A-1 and FIG. 6A-2 to FIG. 6G, and the schedule widget may be obtained according to the technical solution recorded in FIG. 5A to FIG. 5EC-1 and FIG. 5EC-2. Content of the first application widget may be cited for description of the second application widget. Details are not described herein.

Optionally, the electronic device 100 may detect that the ongoing task (ongoing task) exists in the media application (for example, the music application or the video application) in the electronic device 100, and display the media widget on and the first application widget on the home screen. For example, the electronic device may display a widget with a high priority on the left. A newly generated media widget has a highest priority, and the media widget is arranged on the leftmost. The second application widget is no longer displayed because of a lowest priority, as shown in FIG. 3L-1 and FIG. 3L-2.

Figures 1, 3M:
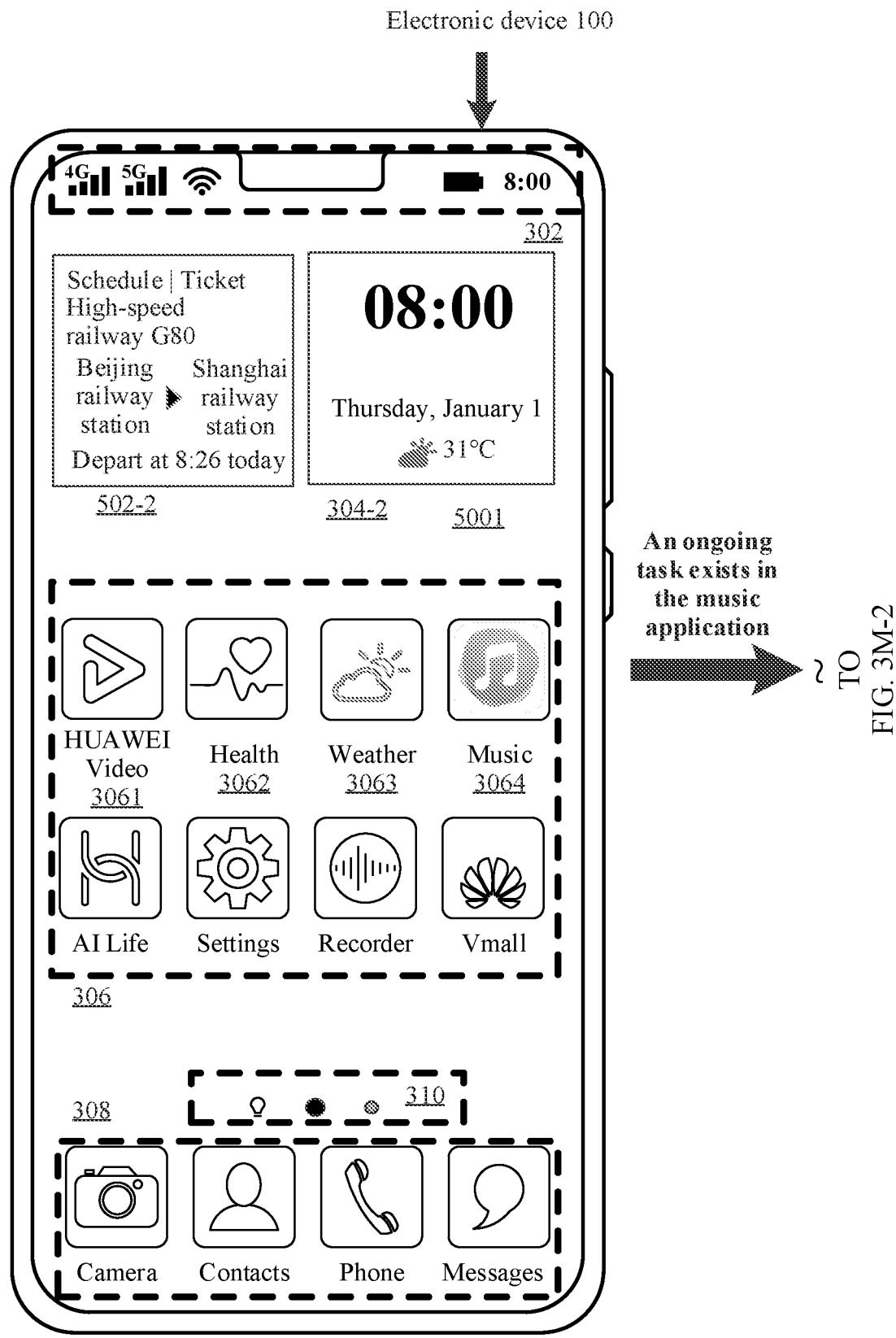
Figures 2, 3M:
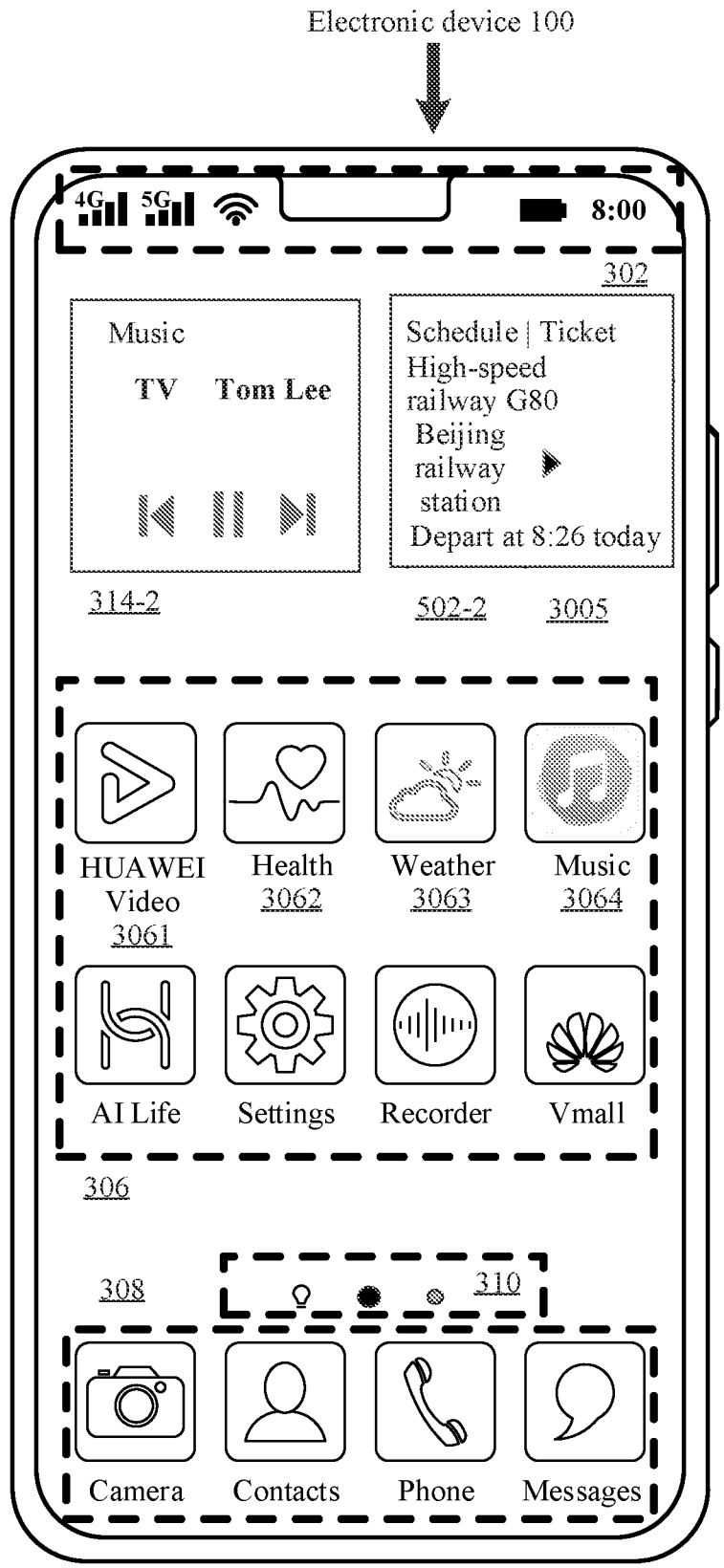

For example, as shown in FIG. 3M-1 and FIG. 3M-2, a schedule widget 502-2 and the time weather widget 304-2 are displayed on the home screen of the electronic device 100. The electronic device 100 detects that the ongoing task exists in the music application, and displays the music widget 314-2 and the schedule widget 502-2 on the home screen, and the music widget 314-2 is arranged on a left side of the schedule widget 502-2.

Optionally, the electronic device 100 may detect that the ongoing task (ongoing task) exists in the media application (for example, the music application or the video application) in the electronic device 100, and display the media widget on and the second application widget on the home screen.

The foregoing embodiment describes the technical solution for displaying the widget on the home screen. In some embodiments, the electronic device 100 may further display the widget on a lock screen interface by using the technical solution recorded in the foregoing embodiment. It should be understood that, the widgets include all the widgets described in embodiments of this application. For example, the widgets may include the cross-device widget described in the embodiments of FIG. 4A to FIG. 4F-1 and FIG. 4F-2, the schedule widget described in the embodiments of FIG. 5A to FIG. 5EC-1 and FIG. 5EC-2, and the instant messaging application widget described in the embodiments of FIG. 6A-1 and FIG. 6A-2 to FIG. 6G.

For example, as shown in FIG. 3I-1 and FIG. 3I-2, the electronic device 100 displays the GUI 3003-1, and after detecting a screen lock instruction entered by the user, the electronic device 100 switches to display a lock screen interface GUI 3004. The lock screen interface GUI 3004 displays the music widget 314-1 in the same area in which the time weather widget 314-0 has been displayed. After detecting a screen unlock instruction entered by the user, the electronic device 100 may switch to display the lock screen interface GUI 3003-1. In some embodiments, when the widget displayed on the lock screen interface 3004 does not include time information, the electronic device 100 may display the time information in the task bar 302.

The widget displayed on the lock screen interface enables the user to perform interaction with the widget without unlocking, thereby improving user experience.

In some embodiments, the electronic device 100 may detect that the ongoing task (ongoing task) exists in the media application (for example, the music application or the video application) in the electronic device 100, and display the media widget on the lock screen page. The display manner of the media widget on the home screen may be cited for the display manner of the media widget and the mode in which the media widget interacts with the user (for example, after the user taps the pausing control, the display of the music widget is stopped, and the display of the time weather widget is switched) on the lock screen page and beneficial effect. Details are not described herein.

FIG. 4A to FIG. 4F-1 and FIG. 4F-2 show a group of example graphical user interfaces for generating an application widget across devices.

For an ongoing task in an application on another electronic device, a user "leaves" the another electronic device midway, and an electronic device 100 displays an application widget related to the application.

It should be understood that the application in the another electronic device may include an office application, and the office application may include a word processing application (for example, Microsoft Office Word, Microsoft Office Powerpoint, Microsoft Office Excel, and PDF Reader), an image processing application, an online conference application, a browser applications, and an email application.

In some embodiments, the electronic device 100 displays an application widget 304-1 on a home screen.

Figure 5A:
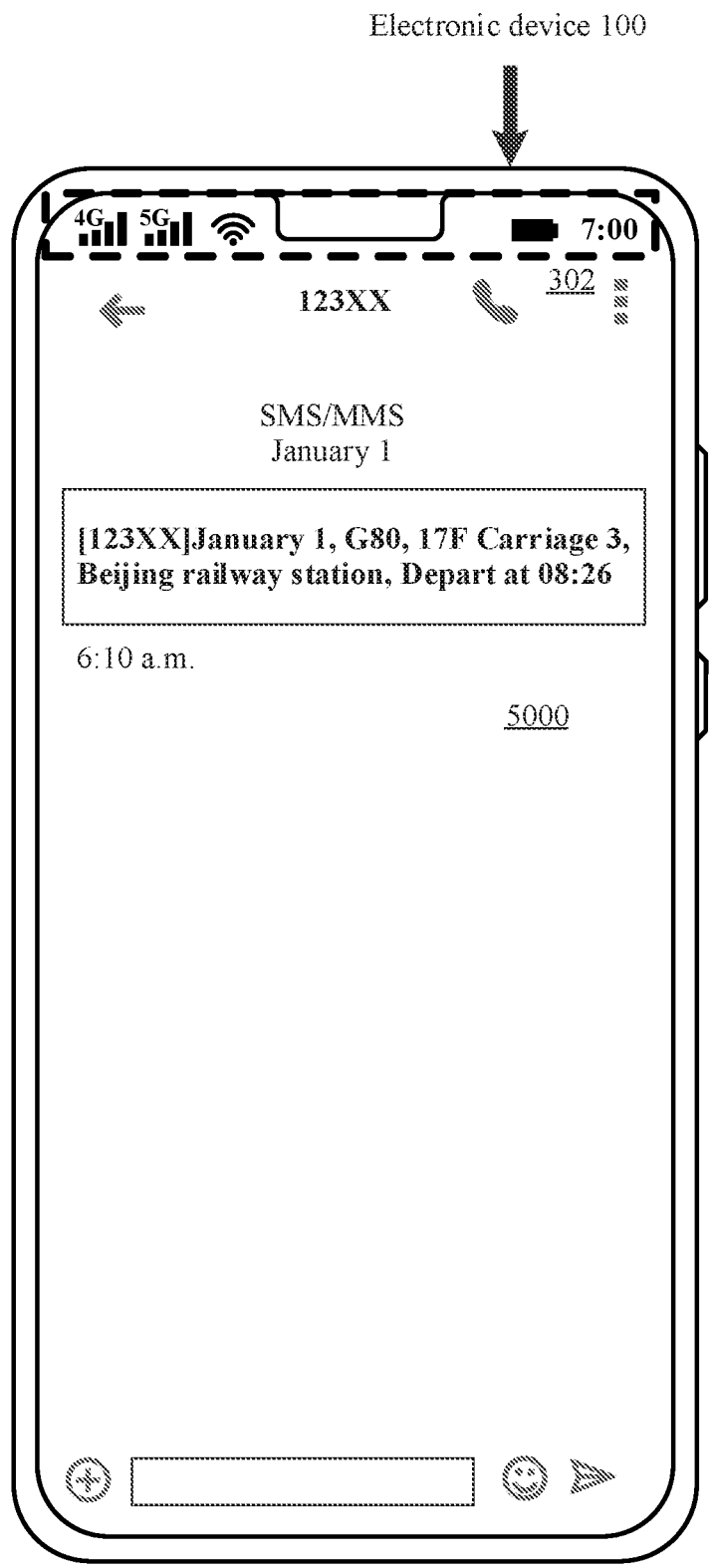
FIG. 5A to FIG. 5EC-1 and FIG. 5EC-2 are a schematic diagram of another group of graphical user interfaces according to an embodiment of this application.
Figure 5B:
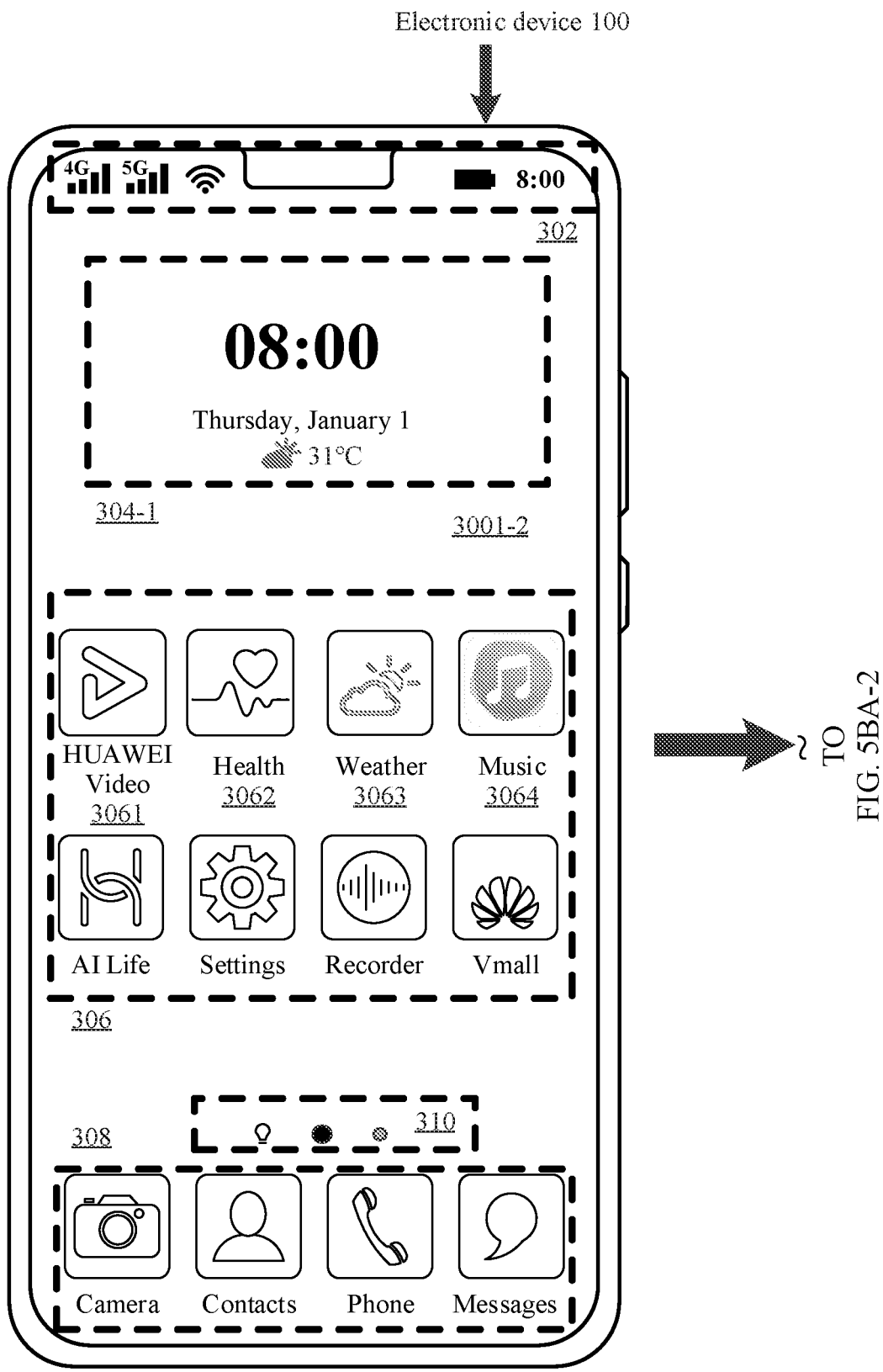
Figure 5B:
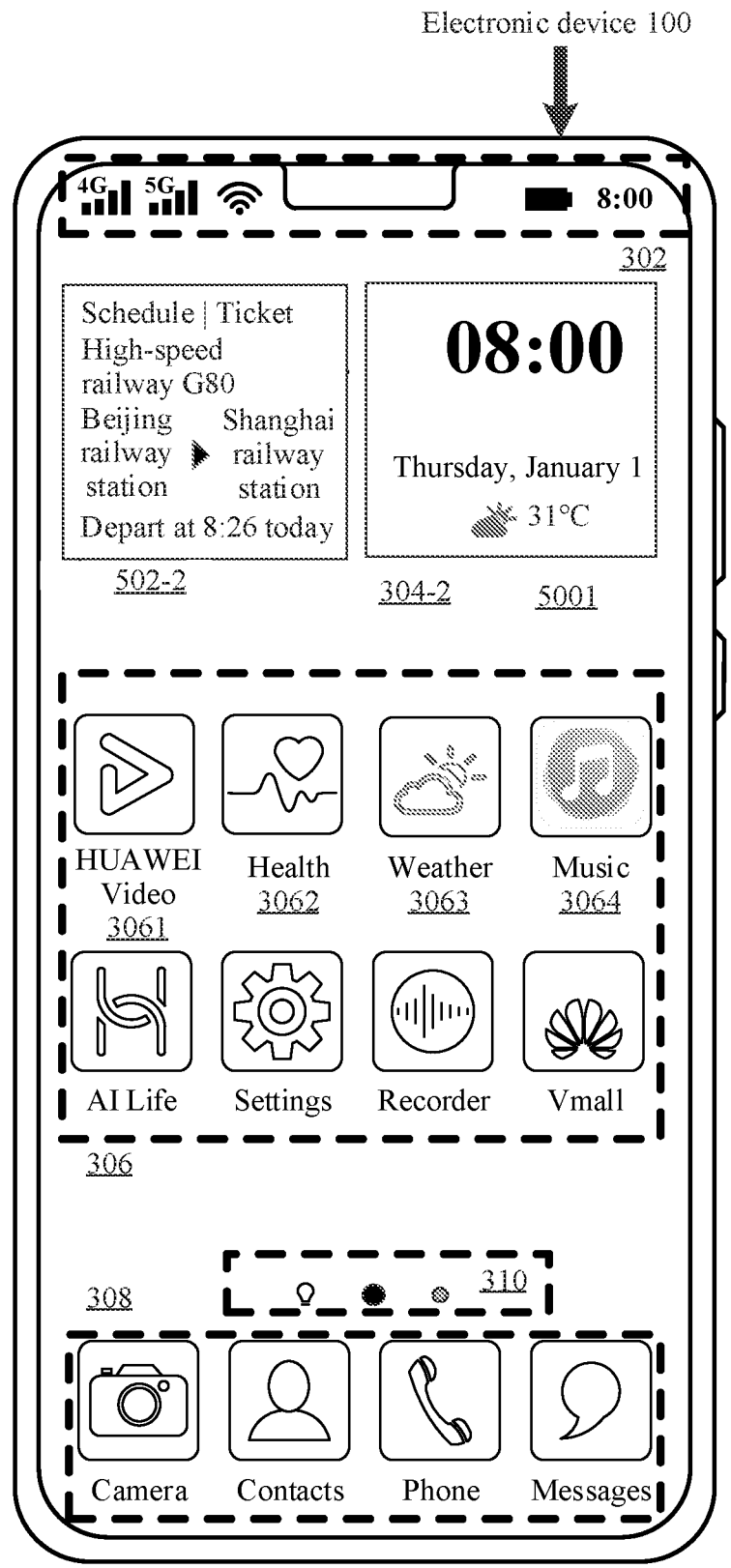
Figure 5B:
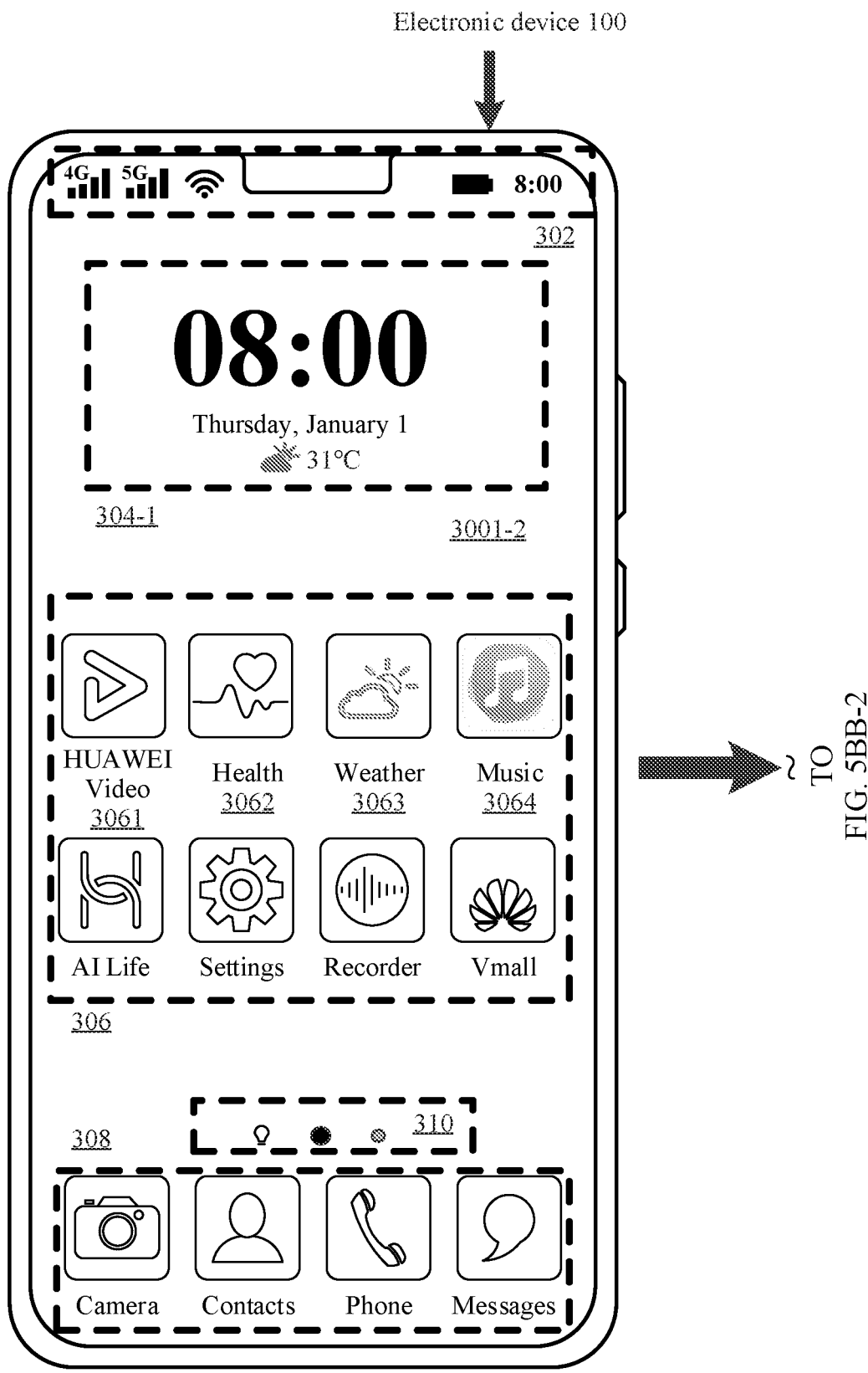
Figure 5B:
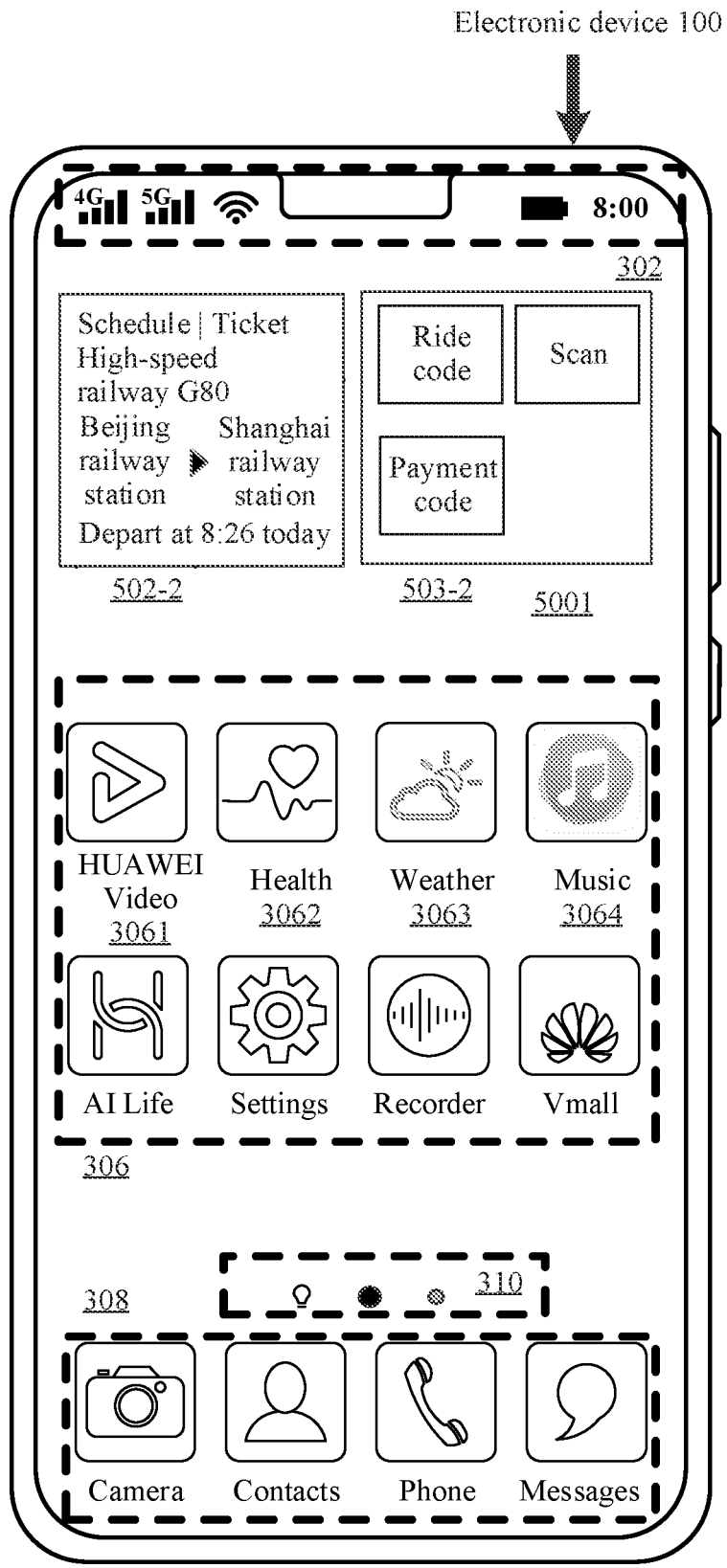
Figure 5B:
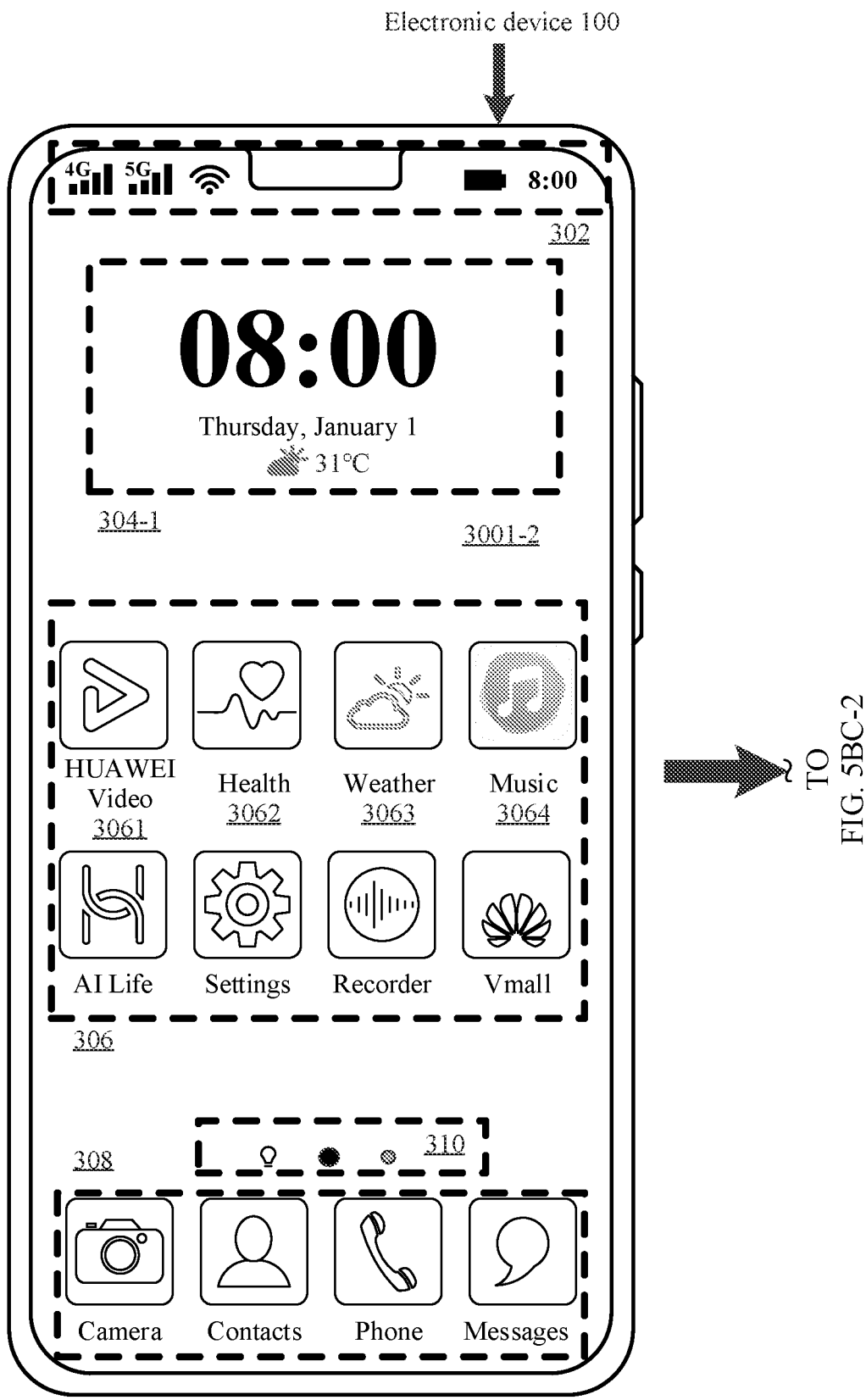
Figure 5B:
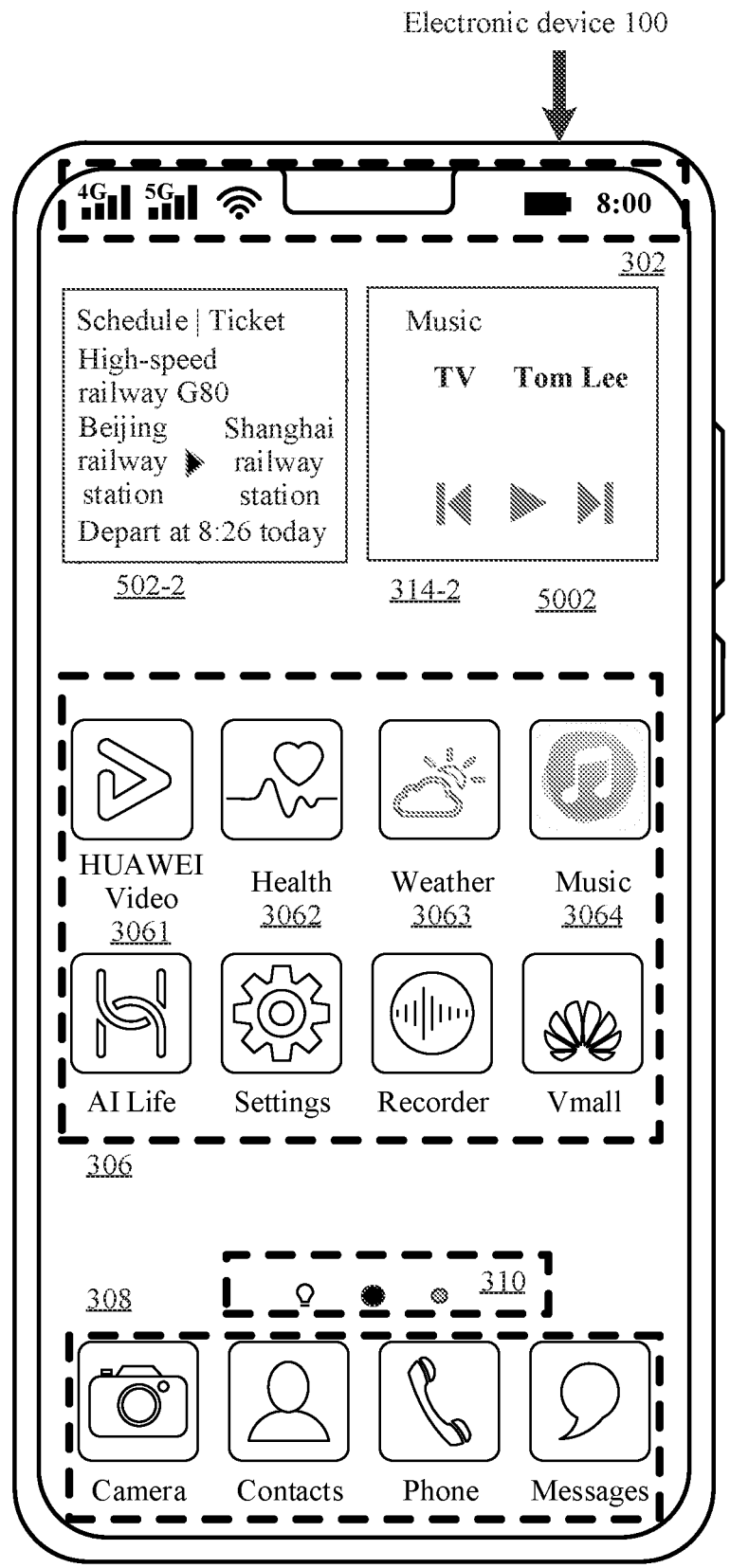
Figures 1, 5C:
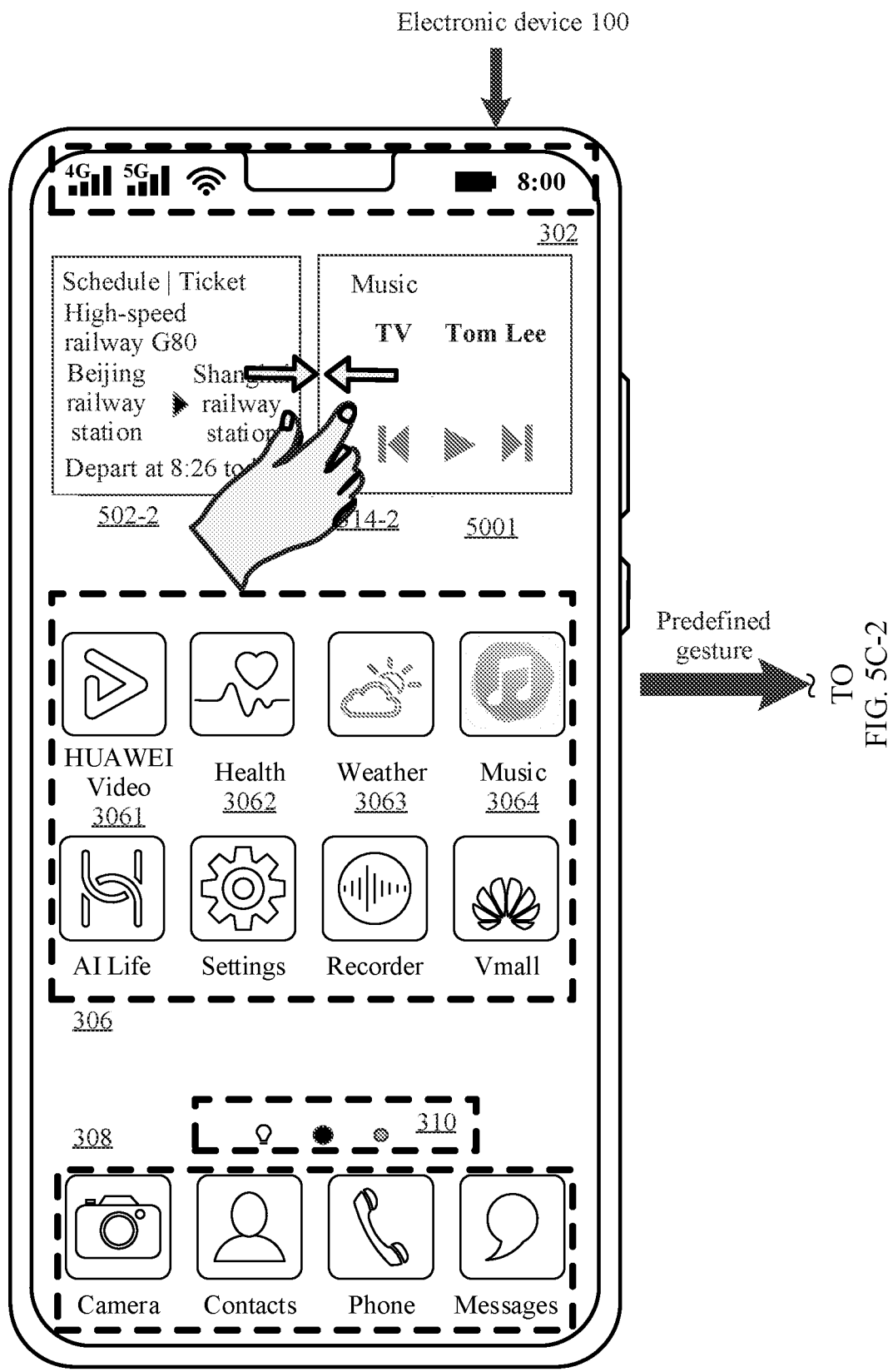
Figures 2, 5C:
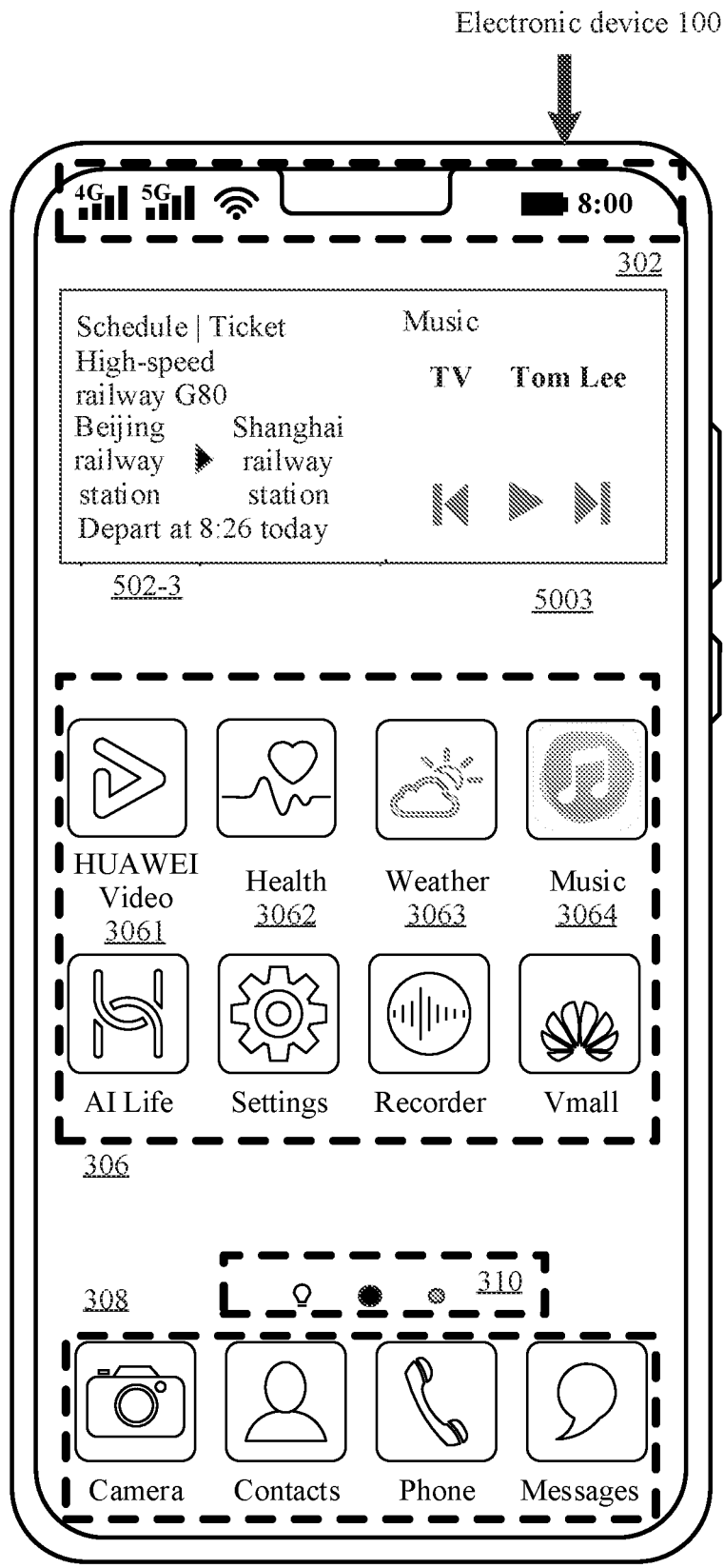
Figure 5D:
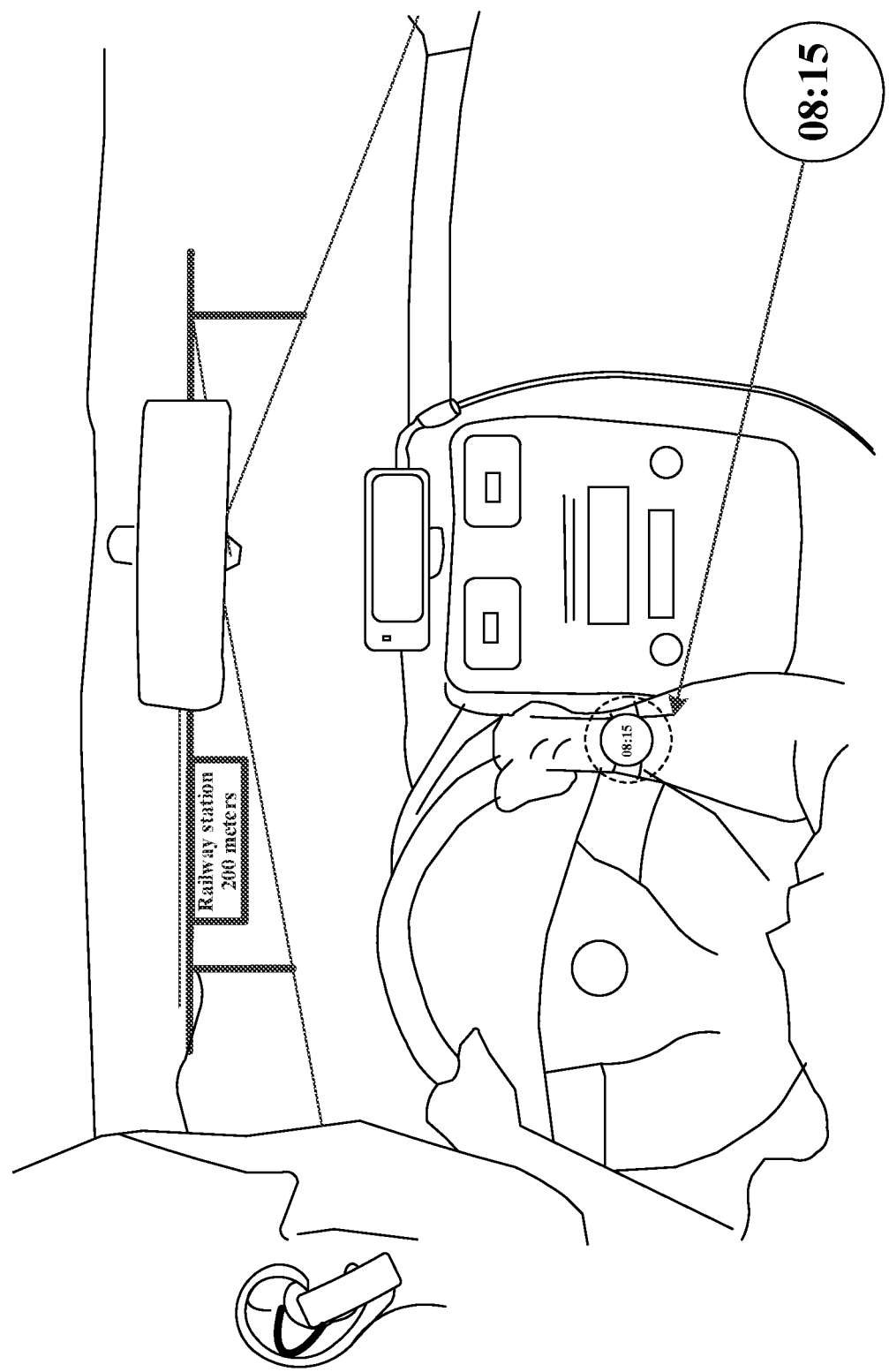
Figure 5E:
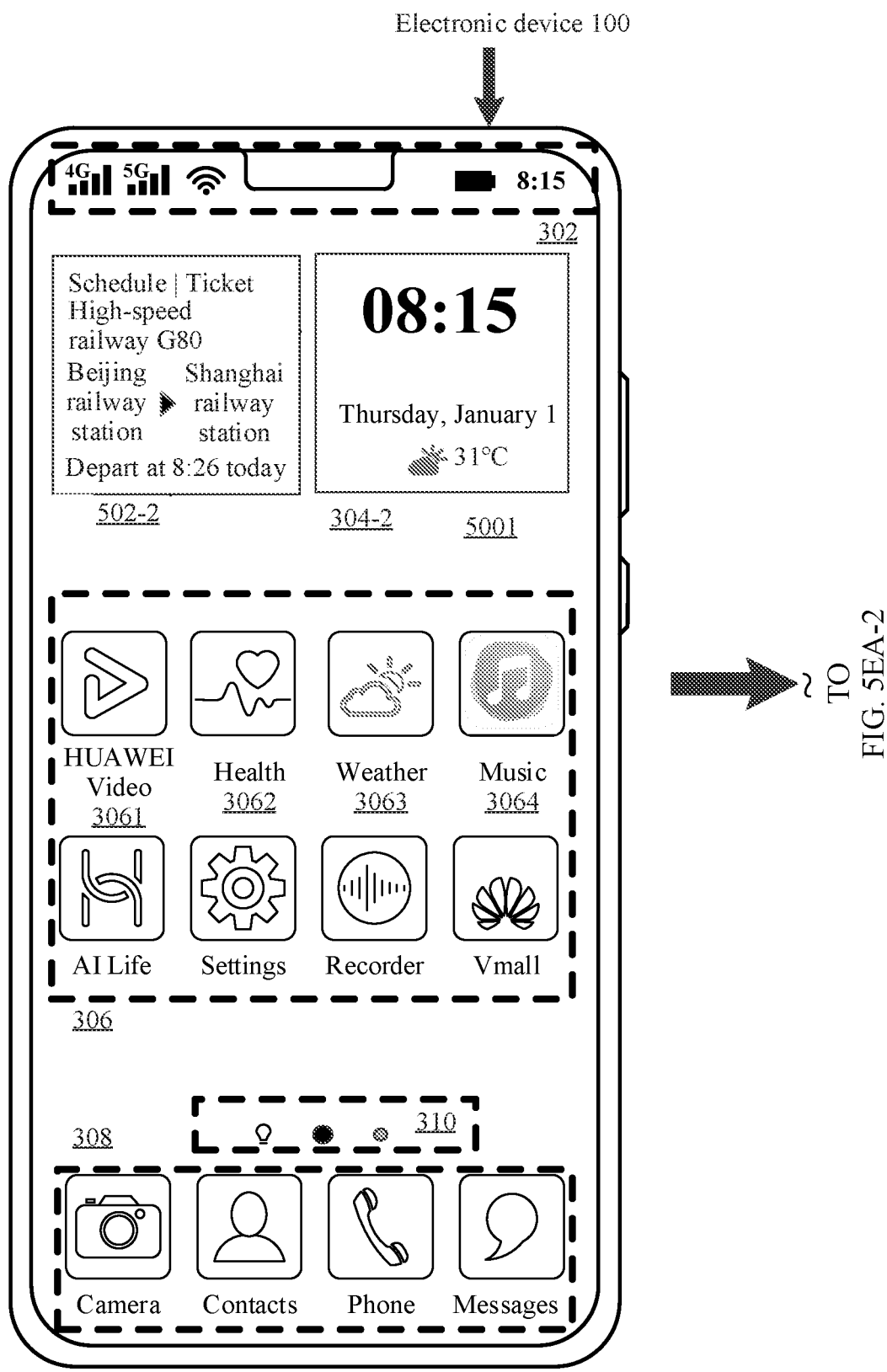
Figure 5E:
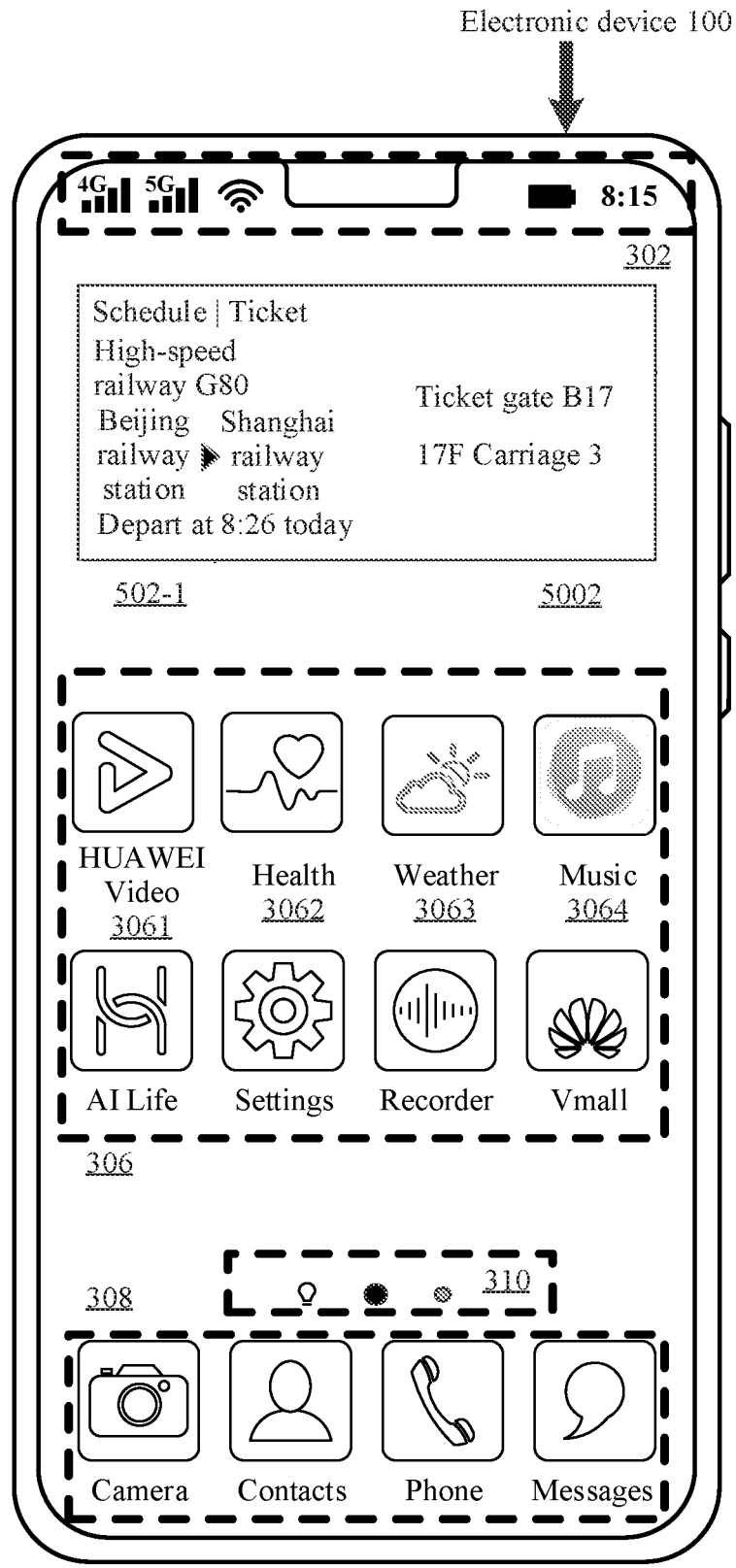
Figure 5E:
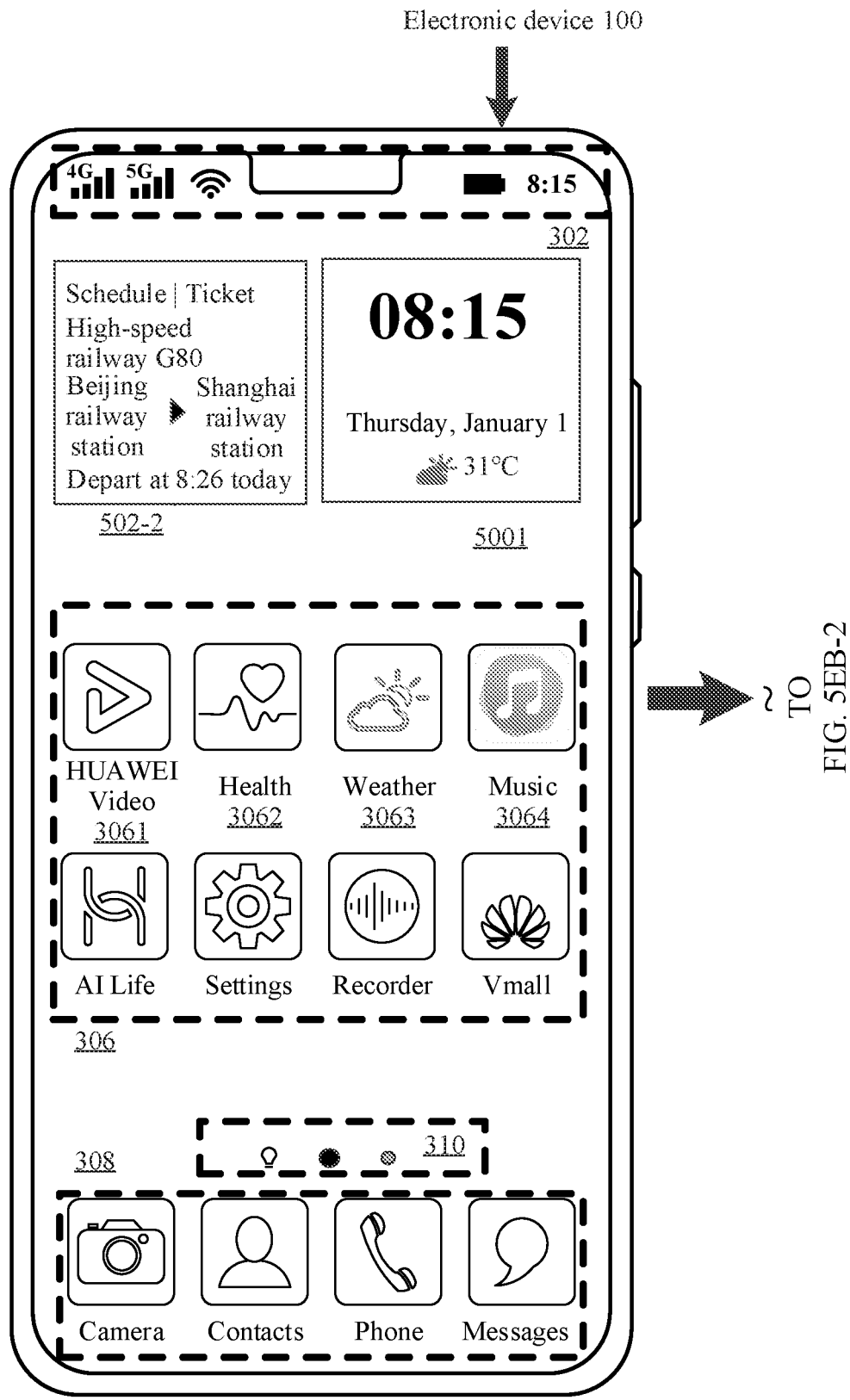
Figure 5E:
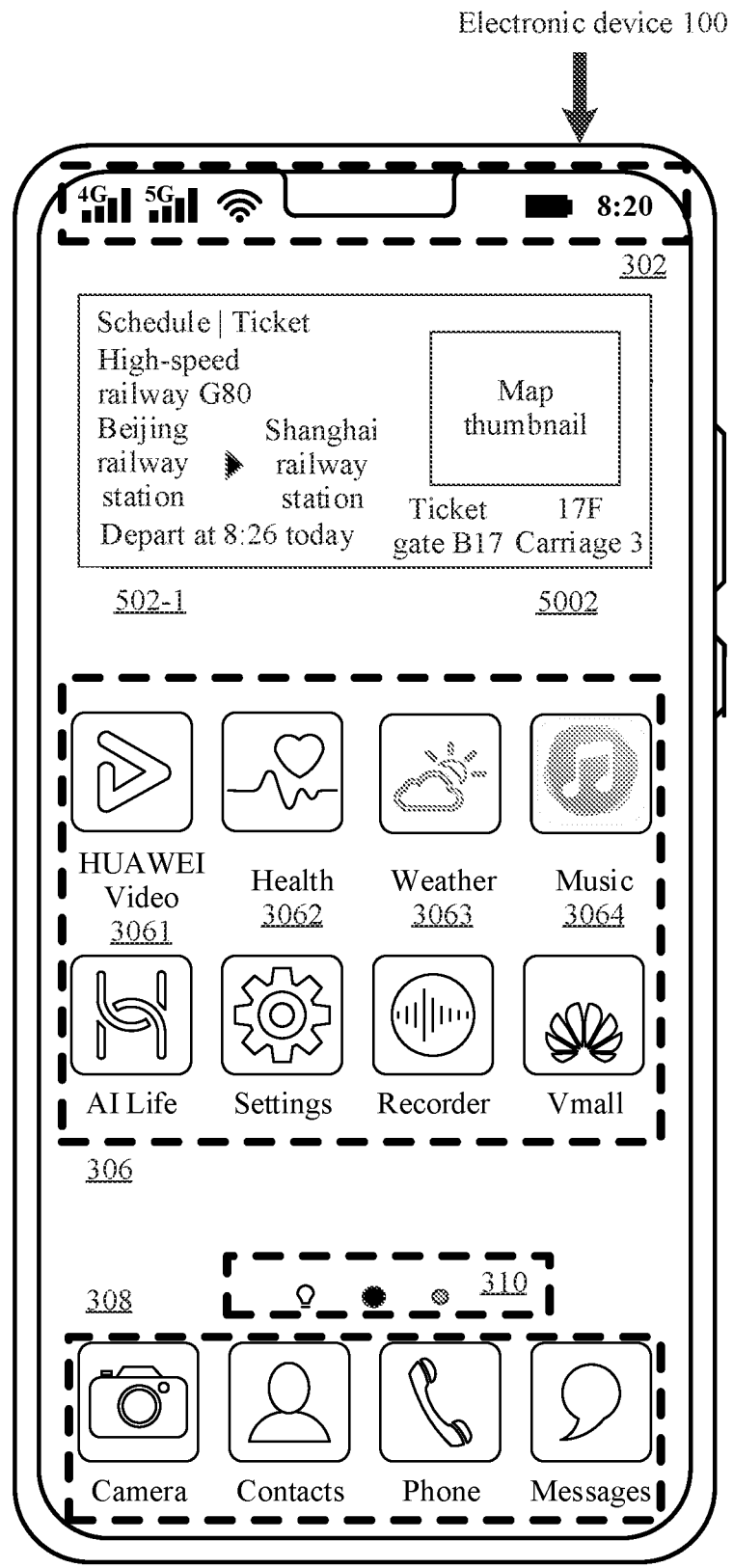
Figure 5E:
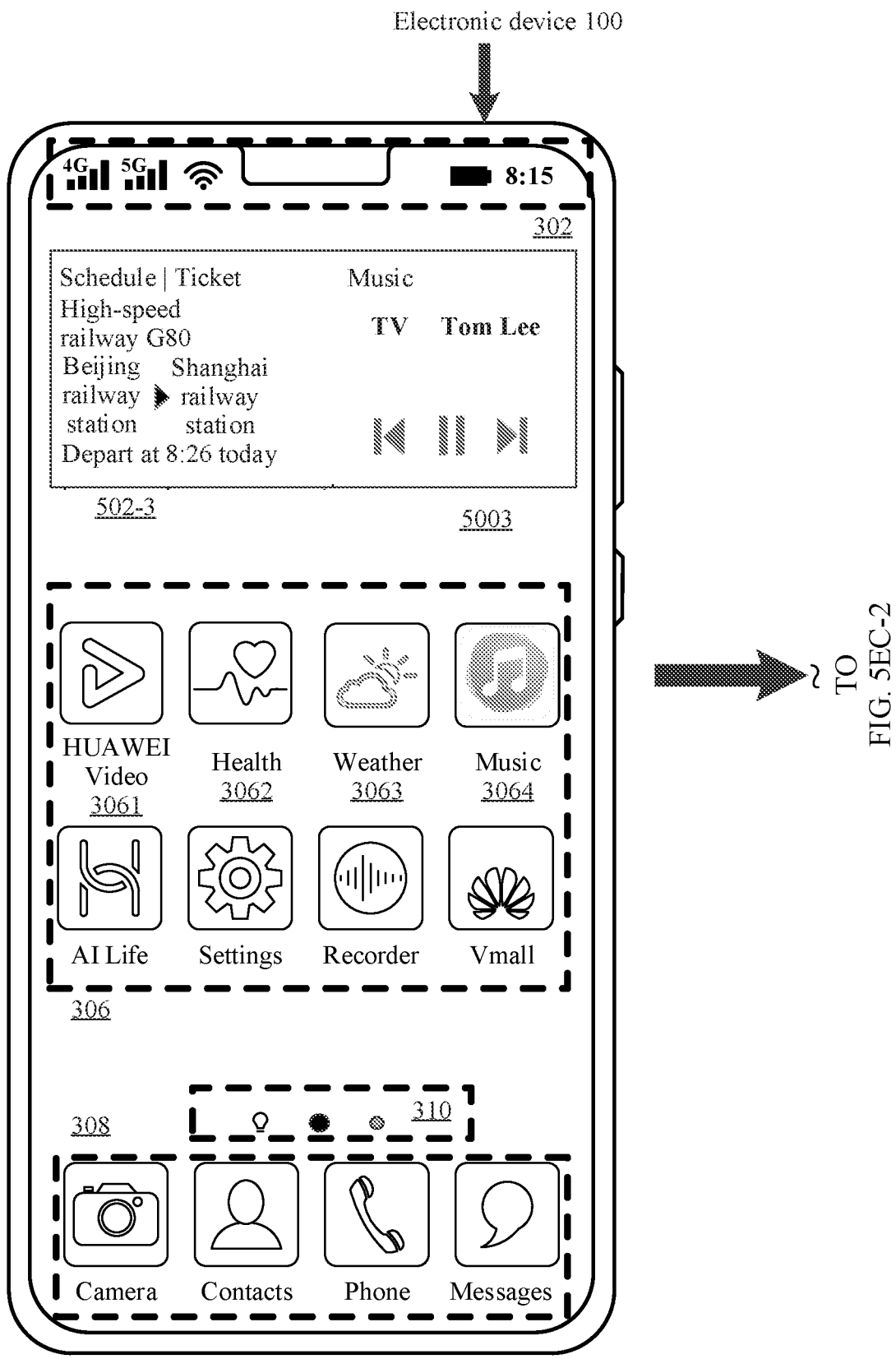
Figure 5E:
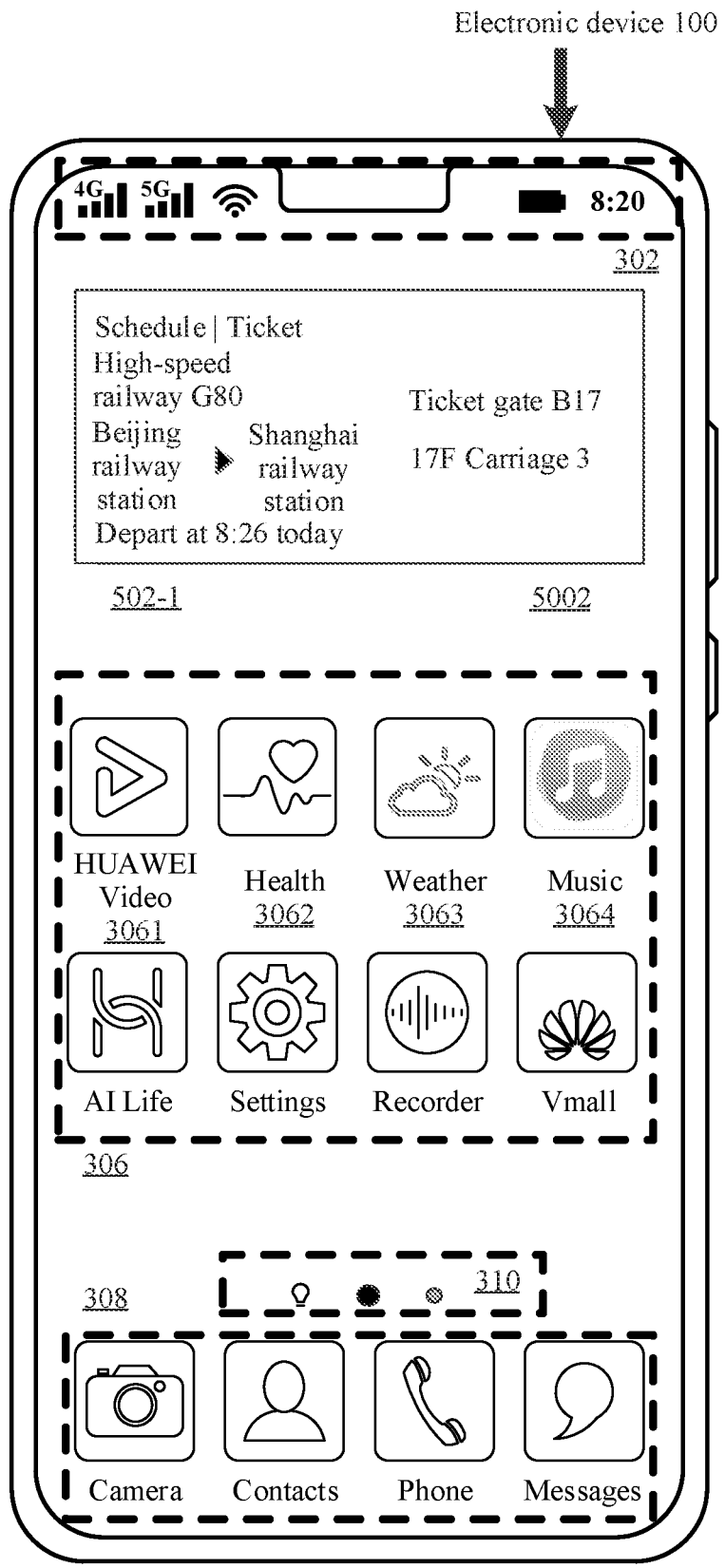

It should be understood that, the application widget 304-1 may alternatively be the media widget described in the embodiments of FIG. 3A to FIG. 3M-1 and FIG. 3M-2, the schedule widget described in the embodiments of FIG. 5A to FIG. 5EC-1 and FIG. 5EC-2, or the instant messaging application widget described in the embodiments of FIG. 6A-1 and FIG. 6A-2 to FIG. 6G.

The electronic device 100 may receive "the ongoing task" existing in the application in the another electronic device, and display the application widget of the application on the home screen. In some embodiments, the application widget of the application may be displayed in a same area that is on the home screen and in which the application widget 304-1 has been displayed. In some embodiments, the same area may be on a home page of the home screen.

The following uses an example in which an electronic device 102 is used as the another electronic device, and the ongoing task exists in a slide application in the electronic device 102 for description.

It should be understood that, in some embodiments, the electronic device 102 may be an electronic device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA).

Figure 4A:
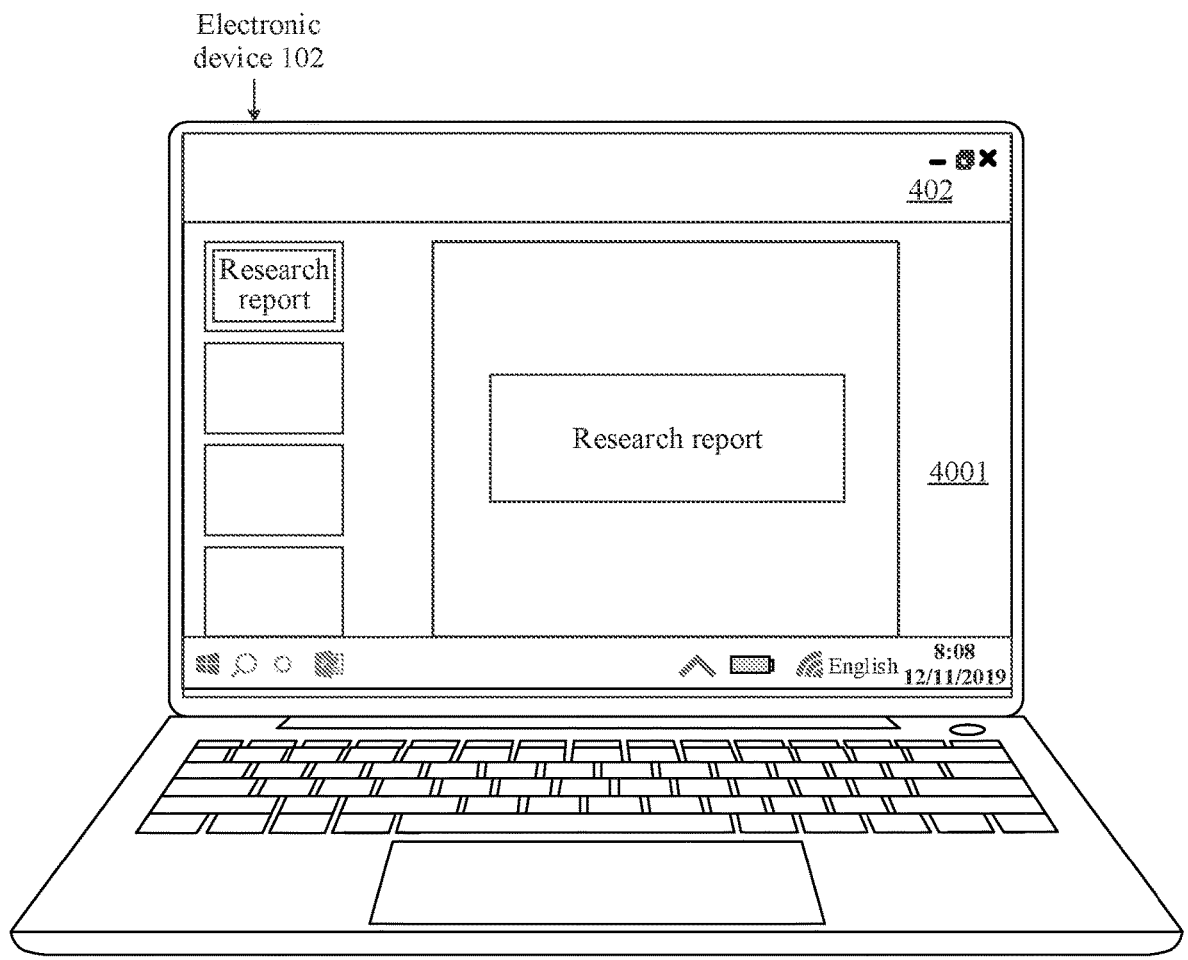
Figure 4B:
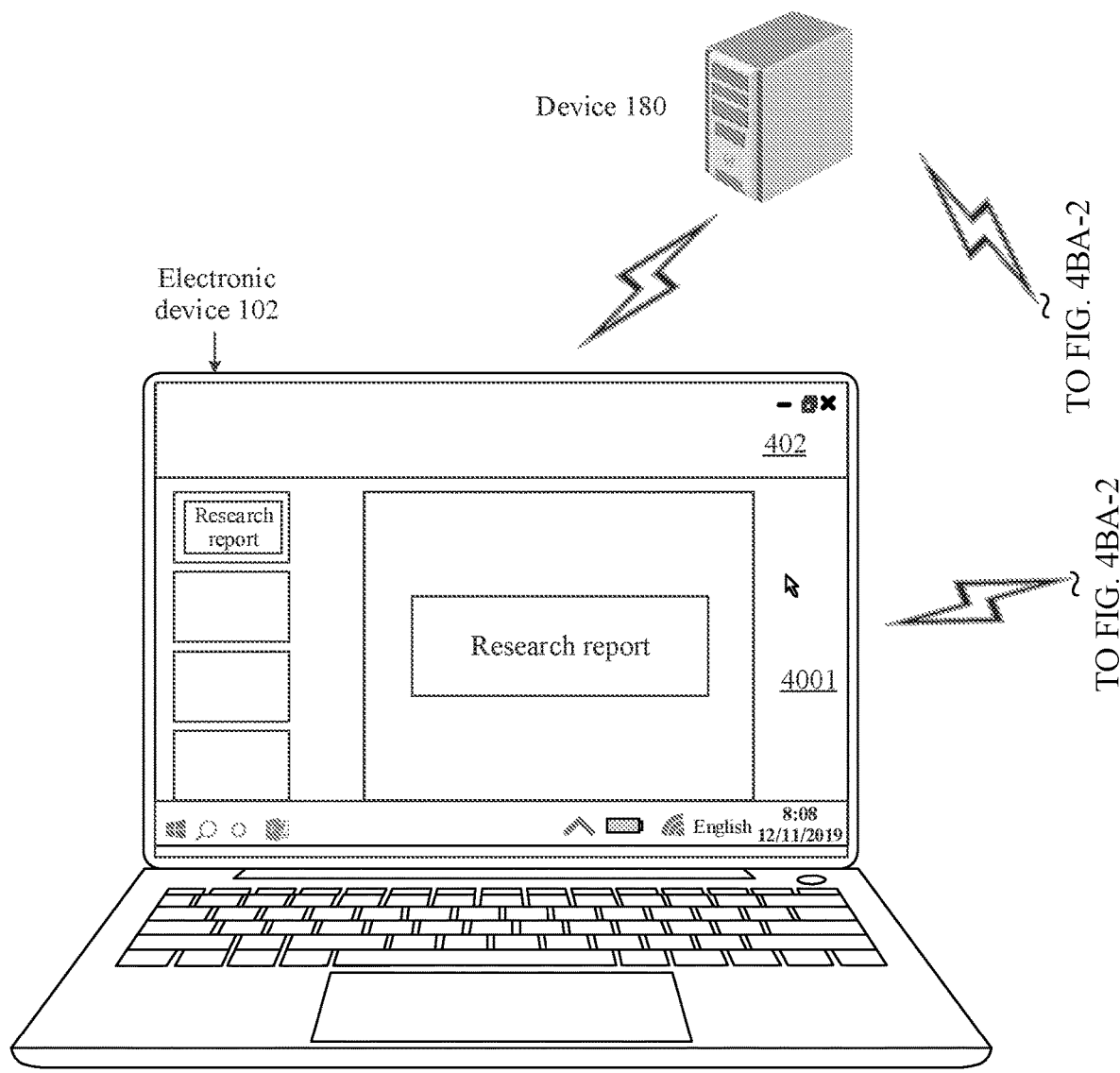
Figure 4B:
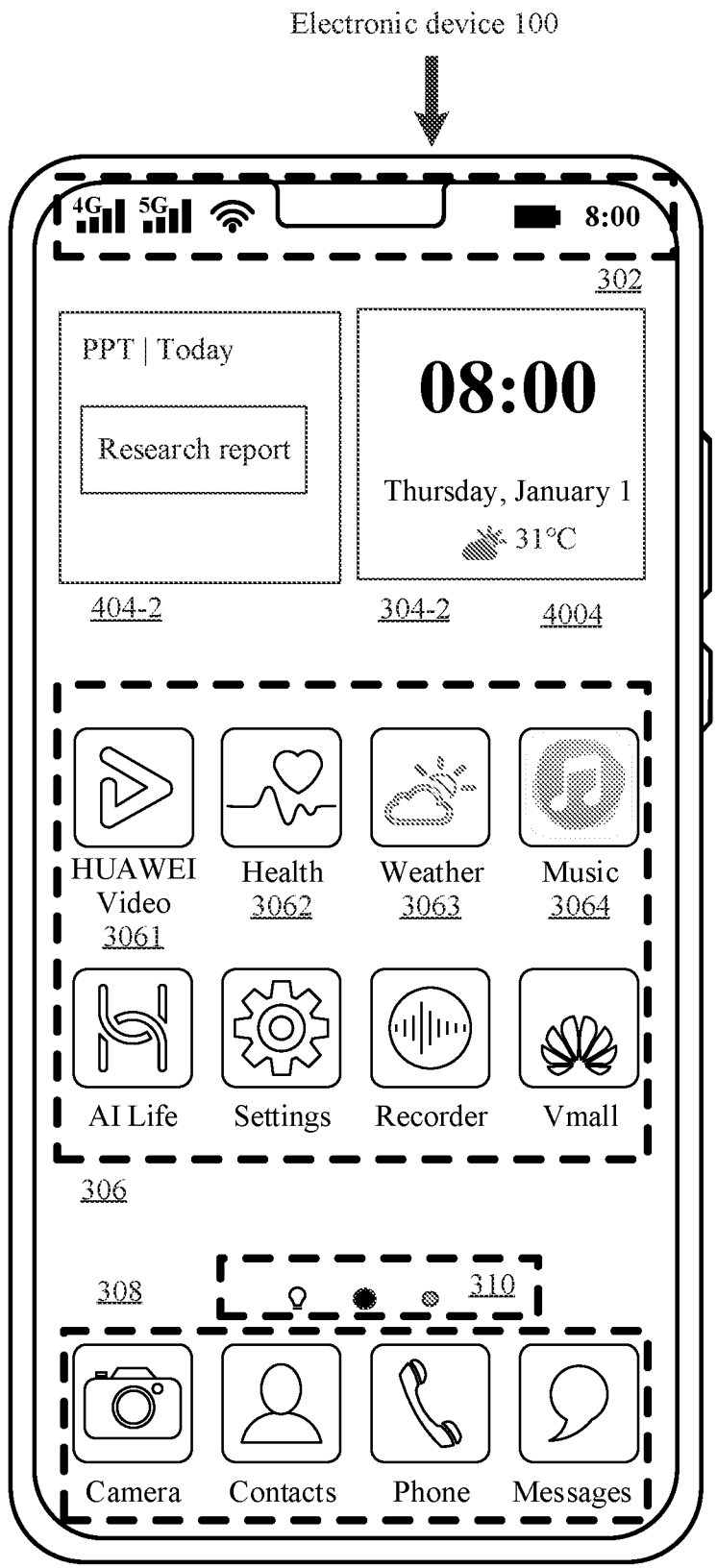
Figure 4B:
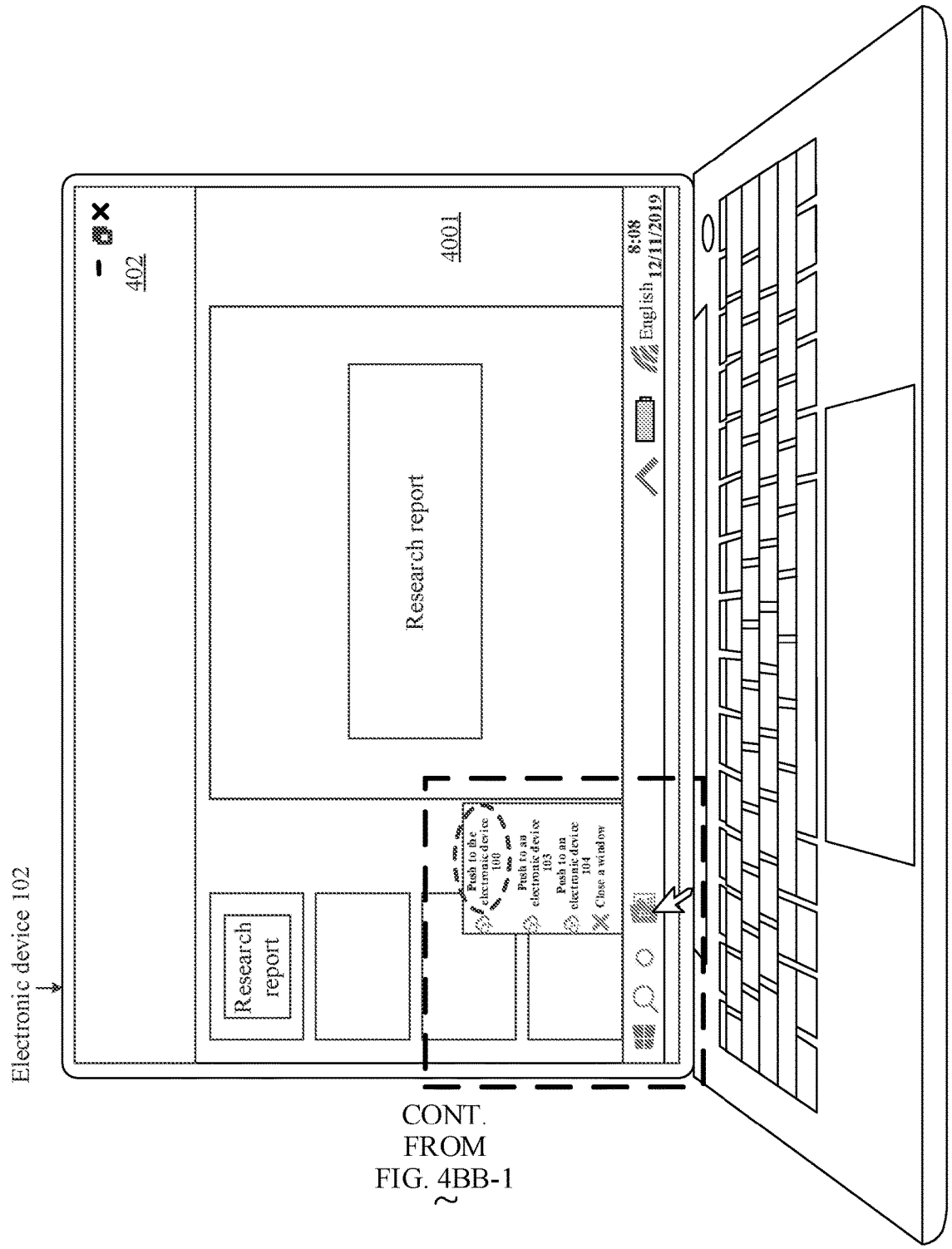

In some embodiments, when detecting that the ongoing task exists in the slide application, and detecting that the user "leaves" the electronic device 102, the electronic device 102 may upload the "ongoing task" to a cloud server device 180, as shown in FIG. 4BA-1 and FIG. 4BA-2. The electronic device 102 may upload the ongoing task to the cloud server device 180 by using a cellular network or a wireless local area network (WLAN).

The manner in which the electronic device 102 detects and determines that the user "leaves" the electronic device 102 may be that a sensor of the electronic device 102 detects that the user is away from the electronic device 102, may be that the electronic device 102 detects that time in which the user does not operate the electronic device 102 is greater than a preset time value, or the like. In some embodiments, that the electronic device 102 detects and determines that the user leaves the device 102 may alternatively be that the user minimizes a window of the application displayed by the electronic device 102. As shown in FIG. 4A, after the user taps a minimize button 402 in a GUI 4001, the user returns to a home screen of the electronic device 102, and the electronic device 102 also determines that the user "leaves" the electronic device 102. In some embodiments, the electronic device 102 may further determine that the user "leaves" the electronic device 102 when a screen of the electronic device 100 is locked. A specific determining manner is not limited in this embodiment.

In some embodiments, the electronic device 102 may alternatively upload the task to the cloud server by detecting a predefined input operation of the user on the electronic device 102. For example, in FIG. 4BB-1 and FIG. 4BB-2, a slide that is being edited by the user is displayed on the electronic device 102, and the ongoing task in the slide application is "Research report". After the electronic device 102 detects that the user taps a PowerPoint icon on a slide application interface, the electronic device 102 displays a window. The window may include options such as "Push to the electronic device 100", "Push to an electronic device 103", "Push to an electronic device 104", and "Close the window". It should be understood that, in some embodiments, the GUI 4001 may display a control or an icon of "Push to an electronic device", and after detecting that the control or the icon is activated, the electronic device 102 may display the options such as "Push to the electronic device 100", "Push to an electronic device 103", and "Push to an electronic device 104". The electronic device 102 detects that the user taps the option "Push to the electronic device 100", and the electronic device 102 may upload the slide task "Research report" to the cloud server by using the cellular network or the wireless local area network (WLAN). For example, a newly processed task in the slide application is "Research report", and the electronic device 102 may transmit the task "Research report" to the cloud server device 180.

After the electronic device 100 detects that an account logged on to the electronic device 100 and an account logged on to the electronic device 102 by the user are a same account, the cloud server device 180 pushes the ongoing task to the electronic device 100, and an application widget 404-2 related to the application is displayed on the home screen of the electronic device 100, as shown in FIG. 4BA-1 and FIG. 4BA-2.

In some embodiments, the electronic device 102 displays an application interface (for example, an email application interface or a browser application interface) of an application. After the electronic device 100 completes pairing with the electronic device 102, the electronic device 102 pushes the ongoing task to the electronic device 100 (for example, pairing through Bluetooth or transmitting data through a Wi-Fi direct connection). The application widget is displayed on the home screen of the electronic device 100, as shown in FIG. 4BA-1 and FIG. 4BA-2.

In some embodiments, the cloud server device 180 or the electronic device 102 pushes the task to the electronic device 100. The task file may be very large, and a current network connection of the electronic device 100 is weak. Therefore, before receiving the ongoing task, the electronic device 100 may ask the user whether to agree to receive the task. After detecting the predefined operation (for example, tapping a control "Yes") entered by the user, the electronic device 100 receives the ongoing task, and displays, on the home screen, the application widget related to the ongoing task.

The electronic device 100 displays the application widget 304-1 on the home screen, the electronic device 100 receives the ongoing task from the server or the electronic device 102, and the electronic device 100 displays the application widget of the application on the home screen. The content in FIG. 3FA-1 and FIG. 3FA-2 to FIG. 3FC-1 and FIG. 3FC-2 may be cited for the method for displaying the widget. Details are not described herein.

The electronic device 100 may receive the ongoing task in the application in the another electronic device, and display the application widget of the application on the home screen. The user can interact with the application between different electronic devices, thereby improving user experience.

The widget 304-1 in the embodiments of FIG. 4A to FIG. 4BB-1 and FIG. 4BB-2 is a time weather widget. It should be understood that the widget 304-1 may alternatively be any widget described in embodiments. For example, the widget 304-1 may be the widget described in the embodiments of FIG. 3A to FIG. 3M-1 and FIG. 3M-2.

Figures 1, 4C:
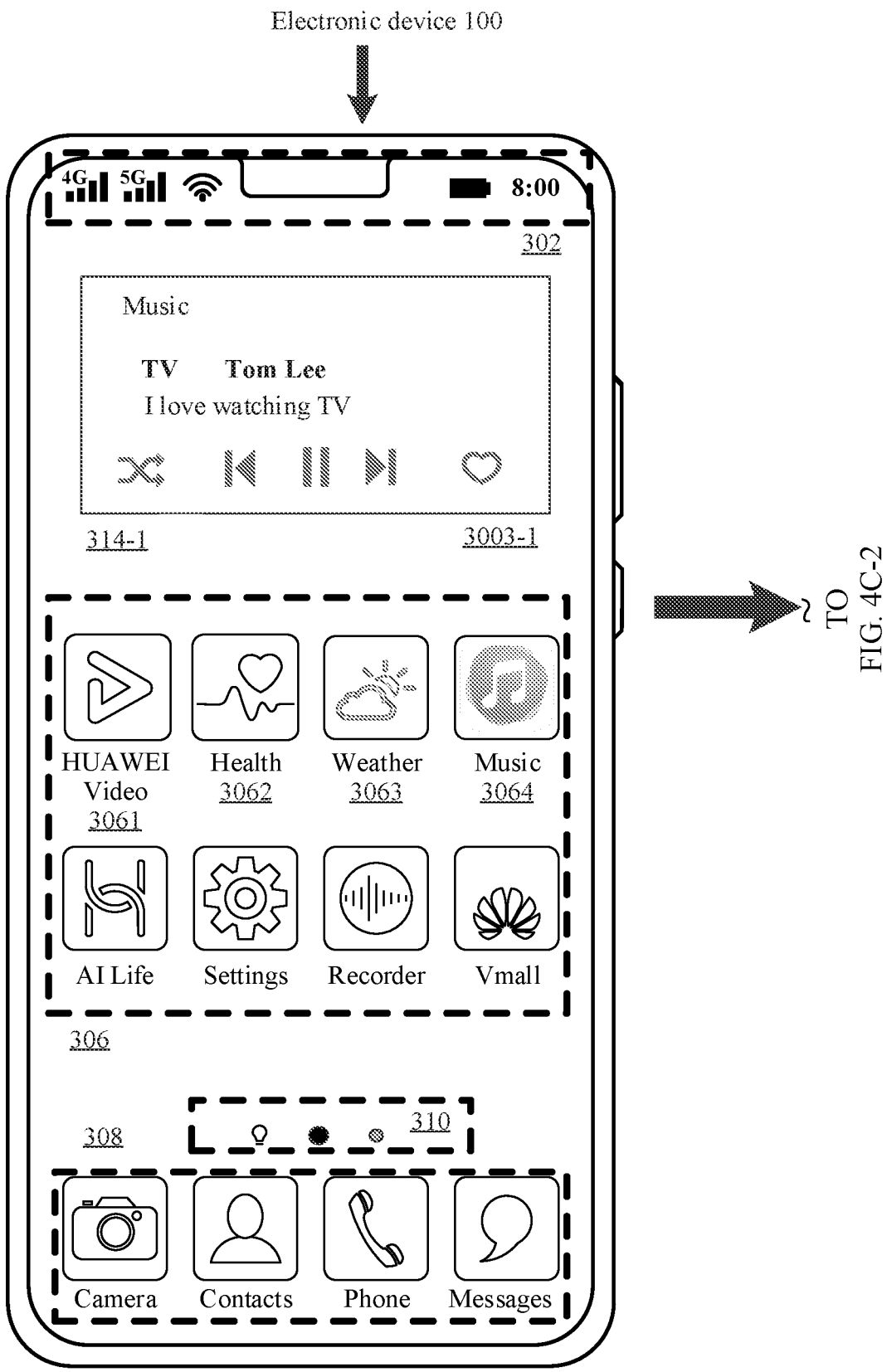
Figures 2, 4C:
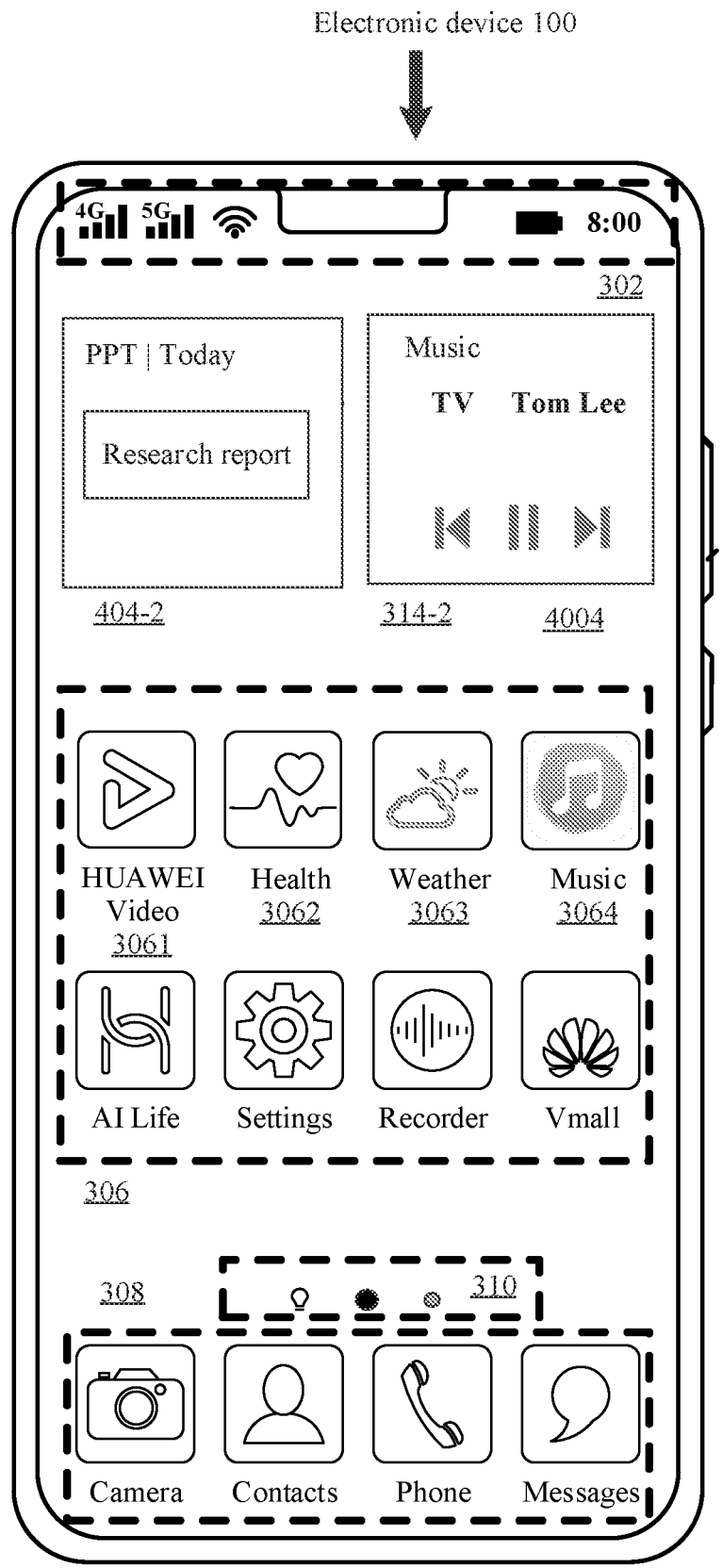

For example, as shown in FIG. 4C-1 and FIG. 4C-2, the application widget 304-1 displayed on the home screen of the electronic device 100 is a music widget. The electronic device 100 receives the ongoing task from the server or the electronic device 102, and the electronic device 100 simultaneously displays the PPT application widget 404-2 and a music widget 314-2 with a size reduced.

In some embodiments, when the electronic device detects that a task exists in the office application, and the task of the office application is not completed, the user returns to the home screen, and the electronic device may display the application widget of the application on the home screen. The content in FIG. 3FA-1 and FIG. 3FA-2 to FIG. 3FC-1 and FIG. 3FC-2 may be cited for the method for displaying the widget. Details are not described herein. For example, the user edits a document on the PPT (Powerpoint) application on the electronic device 100, and after the user taps a home button to return to the home screen, the electronic device 100 displays the PPT application widget on the home screen.

The electronic device 100 may receive the ongoing task existing in the application in the another electronic device, display the application widget of the application on the home screen, and display the widget in the area that is on the home screen and in which the time weather widget is displayed. This implements automatic addition of the widget, and the location of the time weather widget can also be reused. Screen space of the electronic device is limited. The location of the time weather widget is reused, so that the home page of the home screen can be clean and tidy, the widget does not need to be added at a new location, and information that is required by the user can be provided for the user.

In some embodiments, at least two application widgets are displayed on the home screen of the electronic device 100. For example, a first application widget and a second application widget may be included. It should be understood that, in some embodiments, the first application widget may alternatively be one of the following widgets: a time weather widget, a music widget, an instant messaging application widget, or a schedule widget. The music widget may be obtained according to the technical solution recorded in the embodiments of FIG. 3A to FIG. 3M-1 and FIG. 3M-2, the messages widget may be obtained according to the technical solution recorded in the embodiments of FIG. 6A-1 and FIG. 6A-2 to FIG. 6G, and the schedule widget may be obtained according to the technical solution recorded in FIG. 5A to FIG. 5EC-1 and FIG. 5EC-2. Content of the first application widget may be cited for description of the second application widget. Details are not described herein.

The electronic device 100 may receive the ongoing task existing in the application in the another electronic device, and display the application widget of the application on the home screen. Optionally, content of the embodiments of FIG. 3L-1 and FIG. 3L-2 to FIG. 3M-1 and FIG. 3M-2 may be cited for the manner in which the electronic device 100 displays the application widget of the application.

Figures 1, 4D:
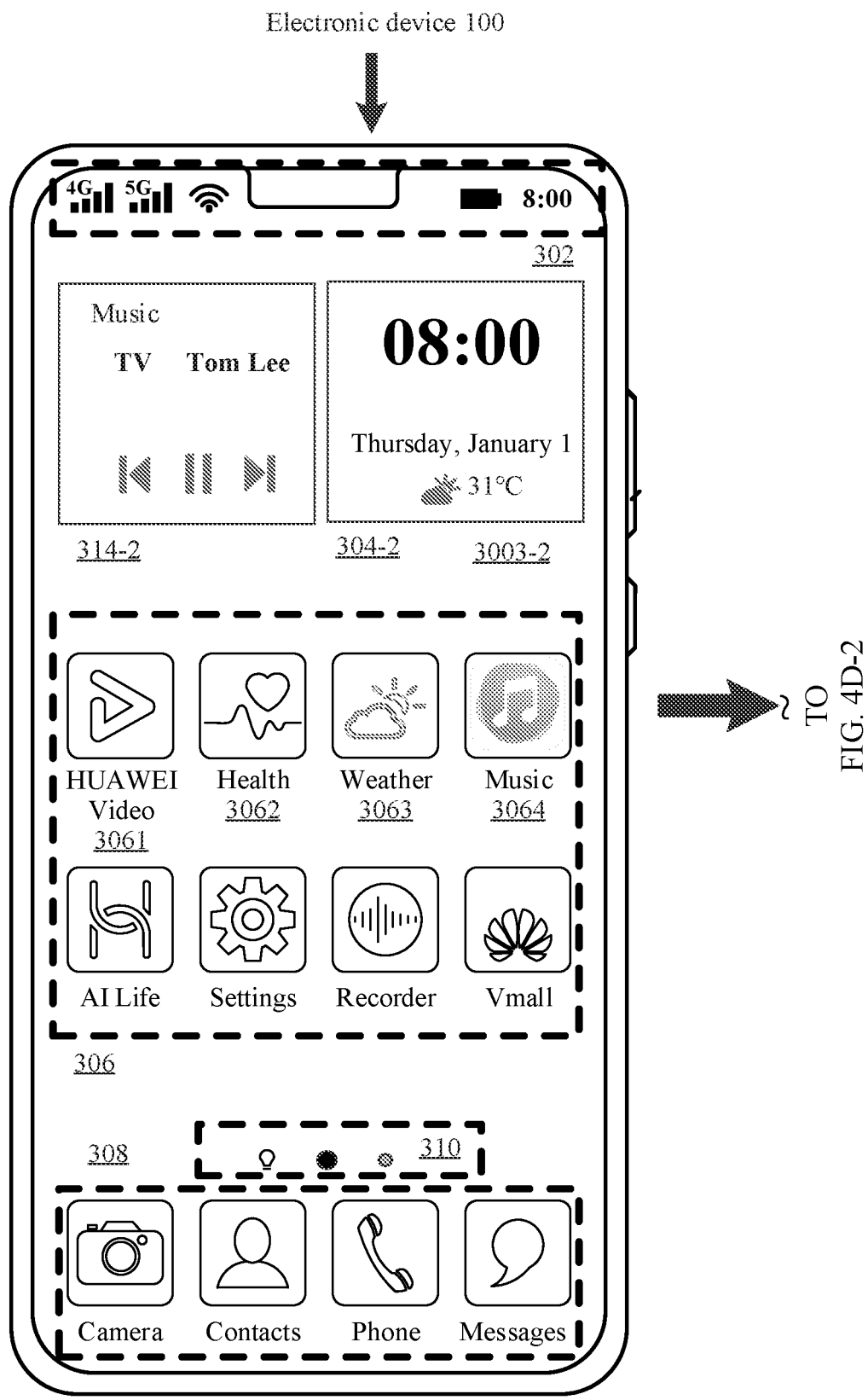
Figures 2, 4D:
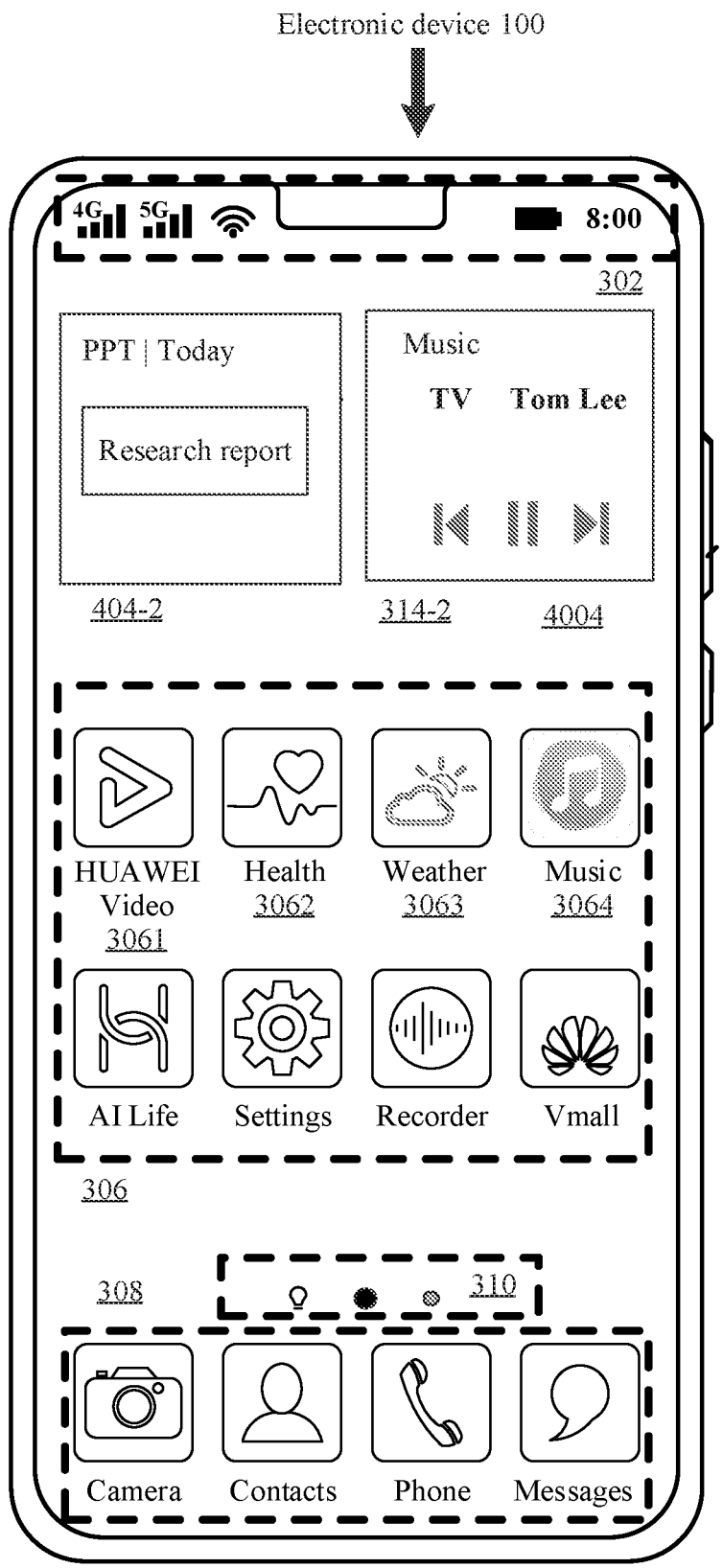

For example, as shown in FIG. 4D-1 and FIG. 4D-2, the music widget 314-2 (which may be referred to as the first application widget) and a time weather widget 304-2 (which may be referred to as the second application widget) are displayed on the home screen of the electronic device 100. The electronic device 100 receives the ongoing task in the slide application in the another electronic device, and the electronic device 100 displays the slide widget 404-2 and the music widget 314-2 (which may be referred to as the first application widget) on the home screen. In addition, the slide widget 404-2 is arranged on the left of the music widget 314-2.

Figures 1, 4E:
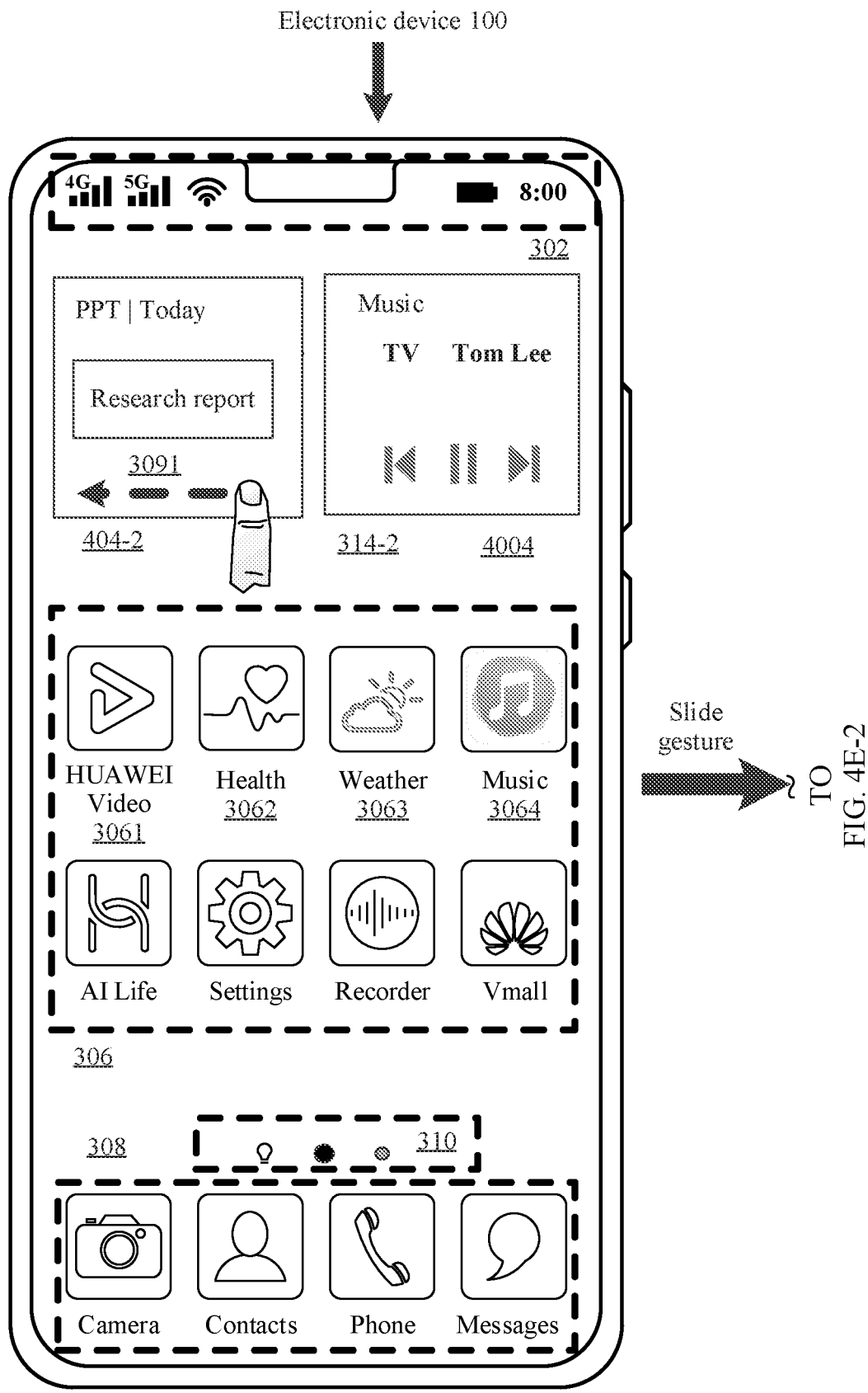
Figures 2, 4E:
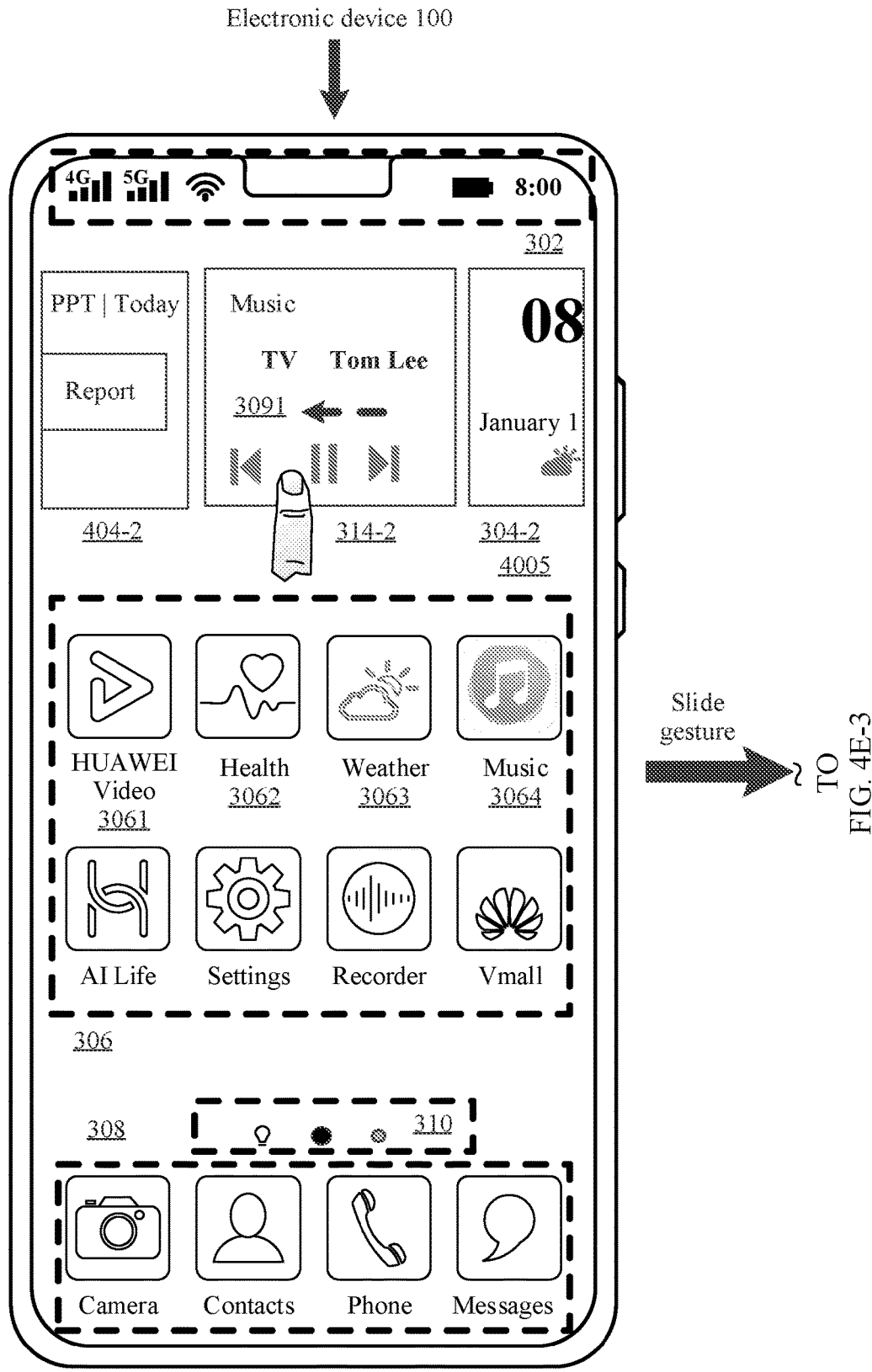
Figures 3, 4E:
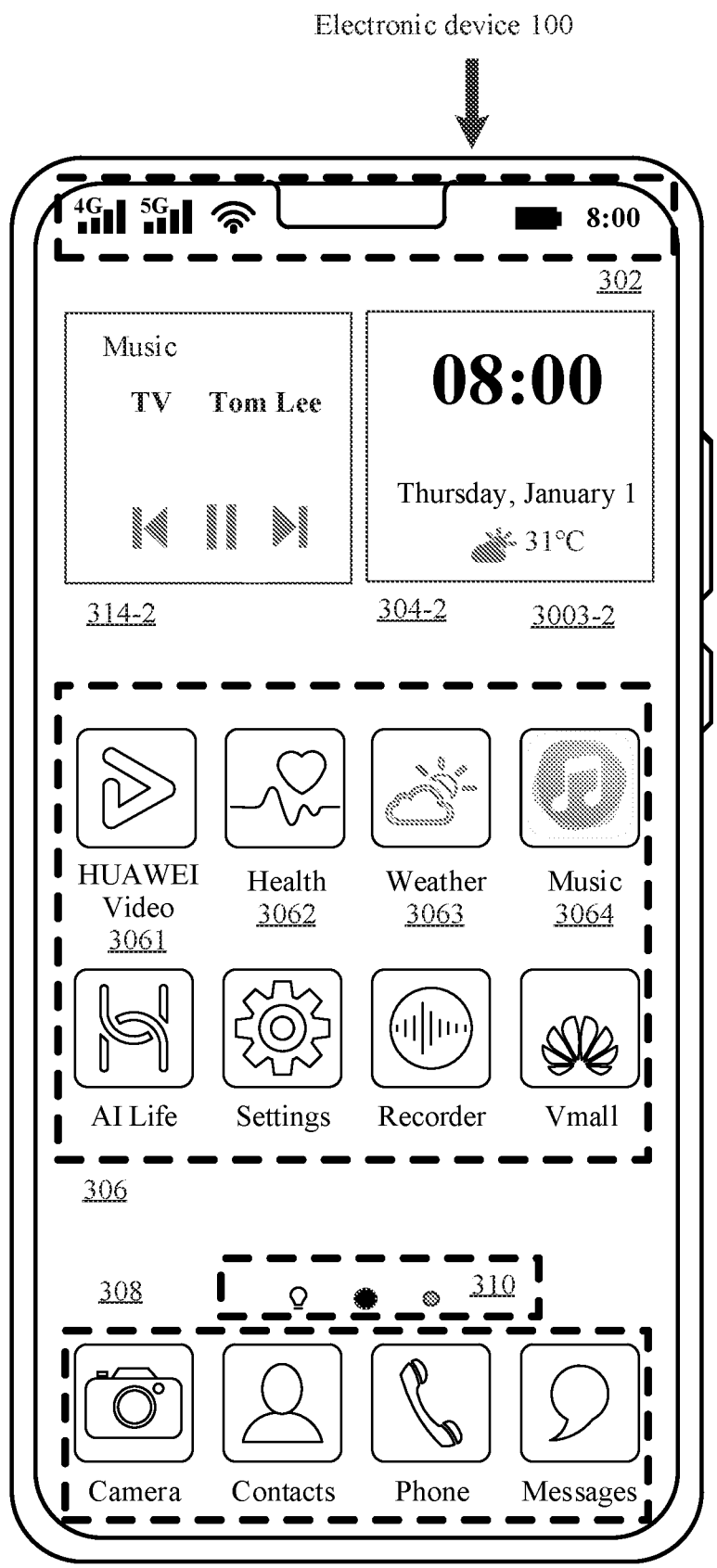

In some embodiments, the electronic device 100 may detect the input predefined gesture (for example, sliding left and right or sliding up and down), to display different widgets. For example, as shown in FIG. 4E-1 to FIG. 4E-3, the electronic device 100 displays the slide widget 404-2 and the music widget 314-2. The electronic device 100 detects that a finger of the user slides left on the widget (for example, the slide widget 404-2), and switches to display a GUI 4005. The GUI 4005 displays a part of the slide widget 404-2, the music widget 314-2, and a part of time weather widget 304-2. The electronic device 100 detects that the finger of the user continues to slide left on the widget (for example, the music widget 314-2), and switches to display a GUI 3003-2. The electronic device 100 displays the music widget 314-2 and the time weather widget 304-2 on the home screen. It should be understood that the time weather widget 304-2 may be newly pushed by a system, or may be always running on the background but not displayed.

Figures 1, 4F:
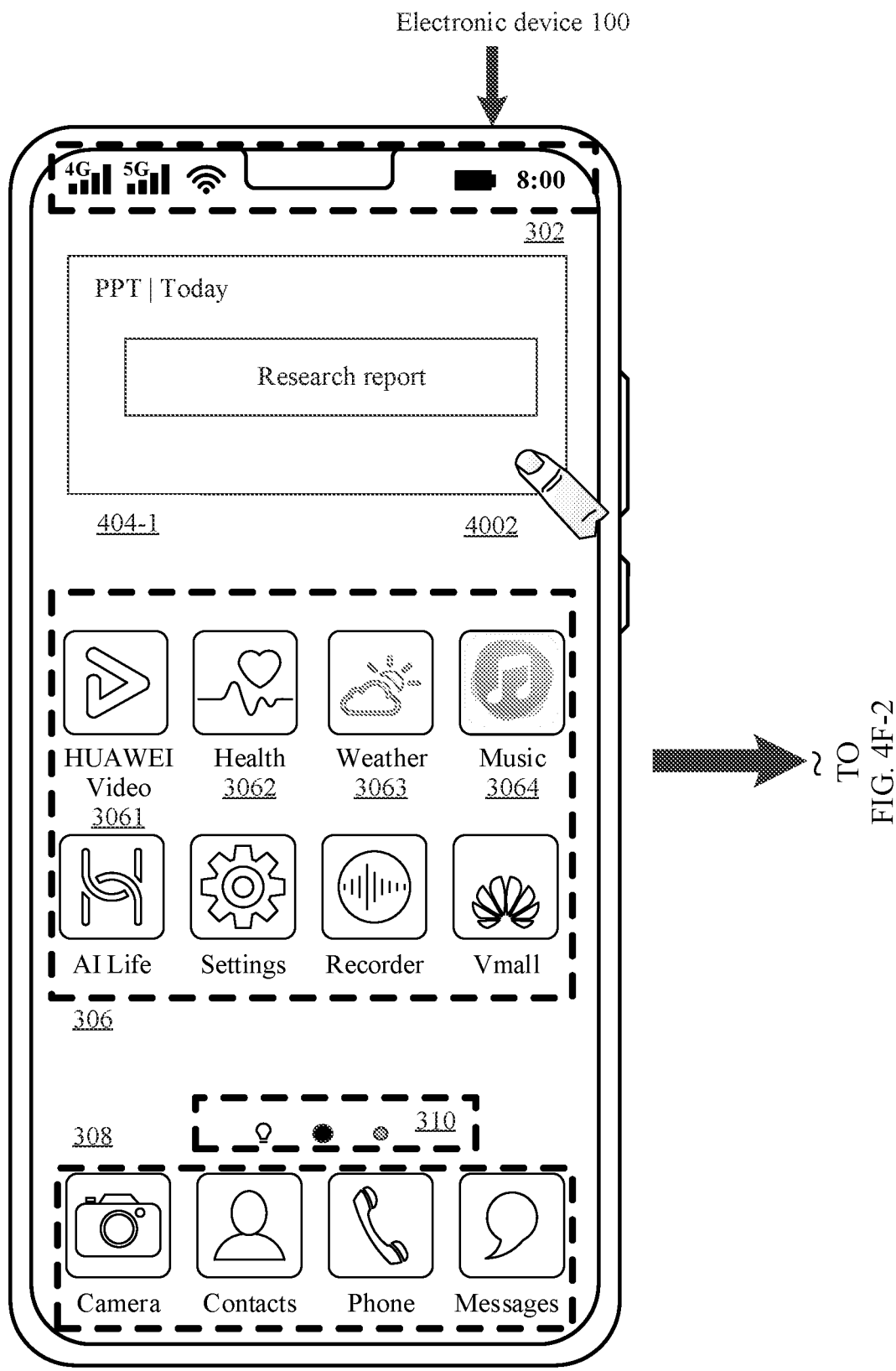
Figures 2, 4F:
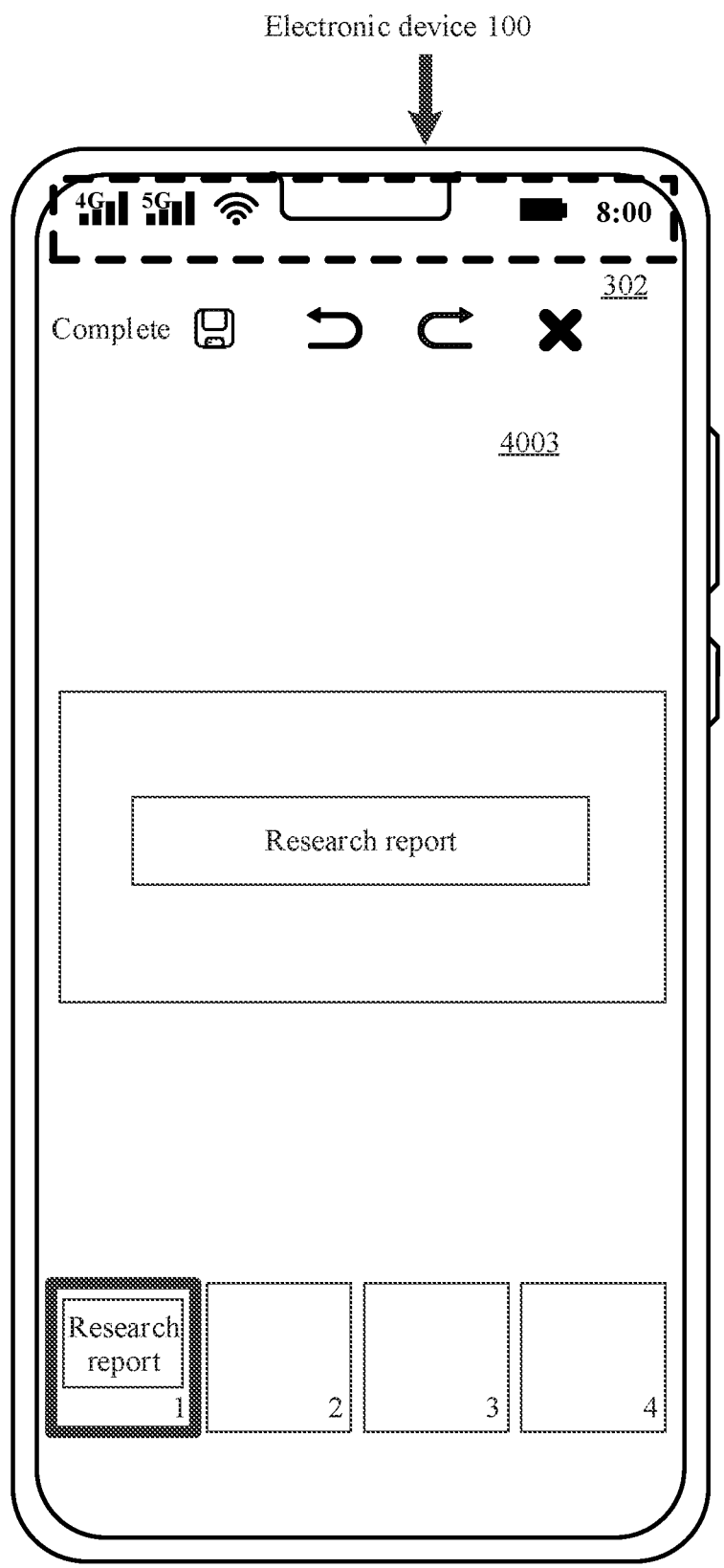

In some embodiments, as shown in FIG. 4F-1 and FIG. 4F-2, the electronic device 100 displays a slide application widget 404-1. After the electronic device 100 detects the input predefined gesture (for example, the finger taps the slide widget), the electronic device 100 switches to display an application interface GUI 4003 of the application related to the application widget. In some embodiments, after the electronic device 100 detects that an action area of the input predefined gesture (for example, the finger taps the slide widget) is different, the application interface GUI 4003 that the electronic device 100 switches to display may be different.

In some embodiments, the electronic device 100 may detect the input predefined gesture, and change an order of widgets displayed on the home screen. The content in FIG. 3G-1 to FIG. 3G-3 may be cited for content of changing the order of the widgets displayed on the home screen. Details are not described herein.

Figures 1, 4G:
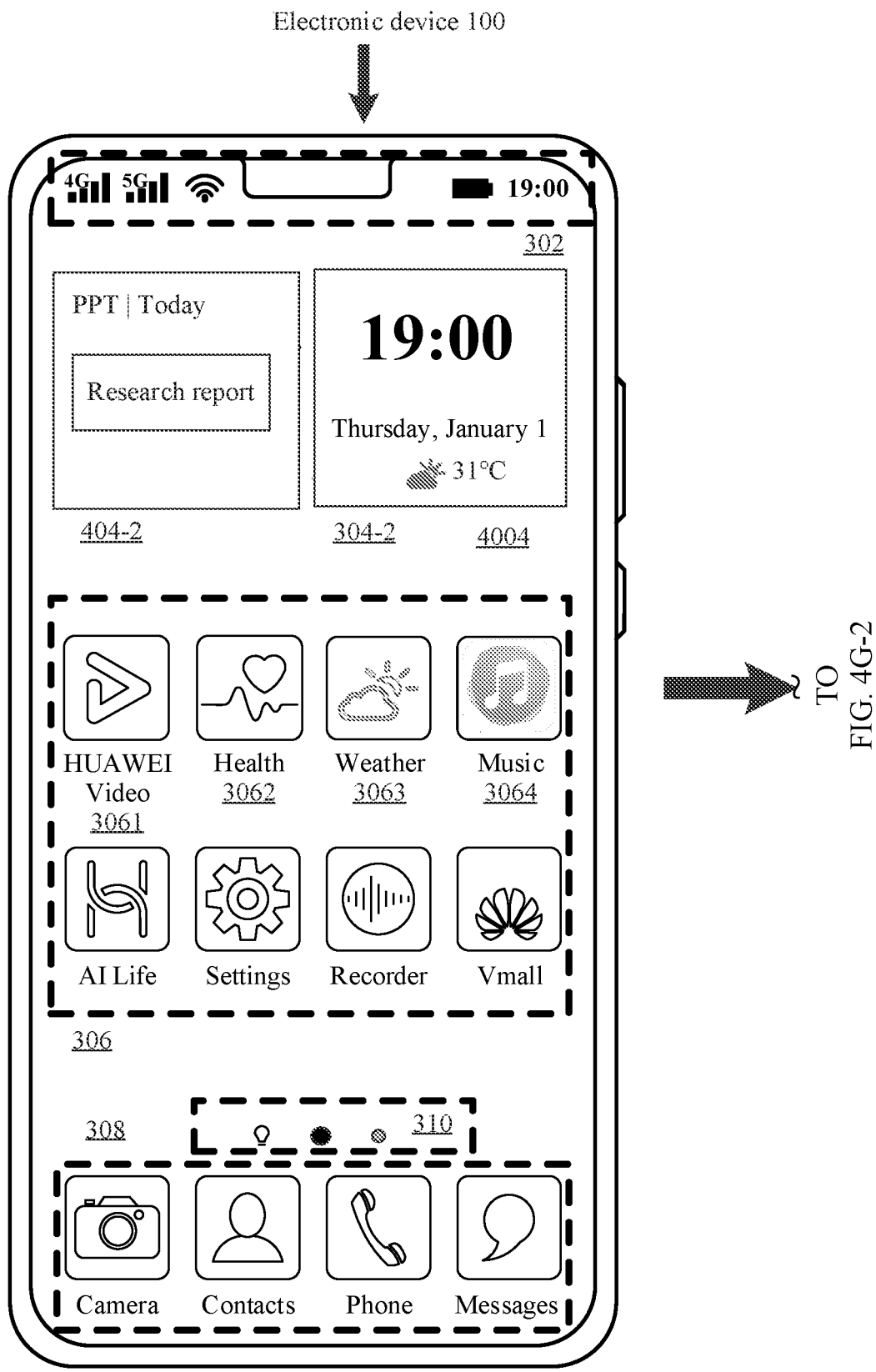
Figures 2, 4G:
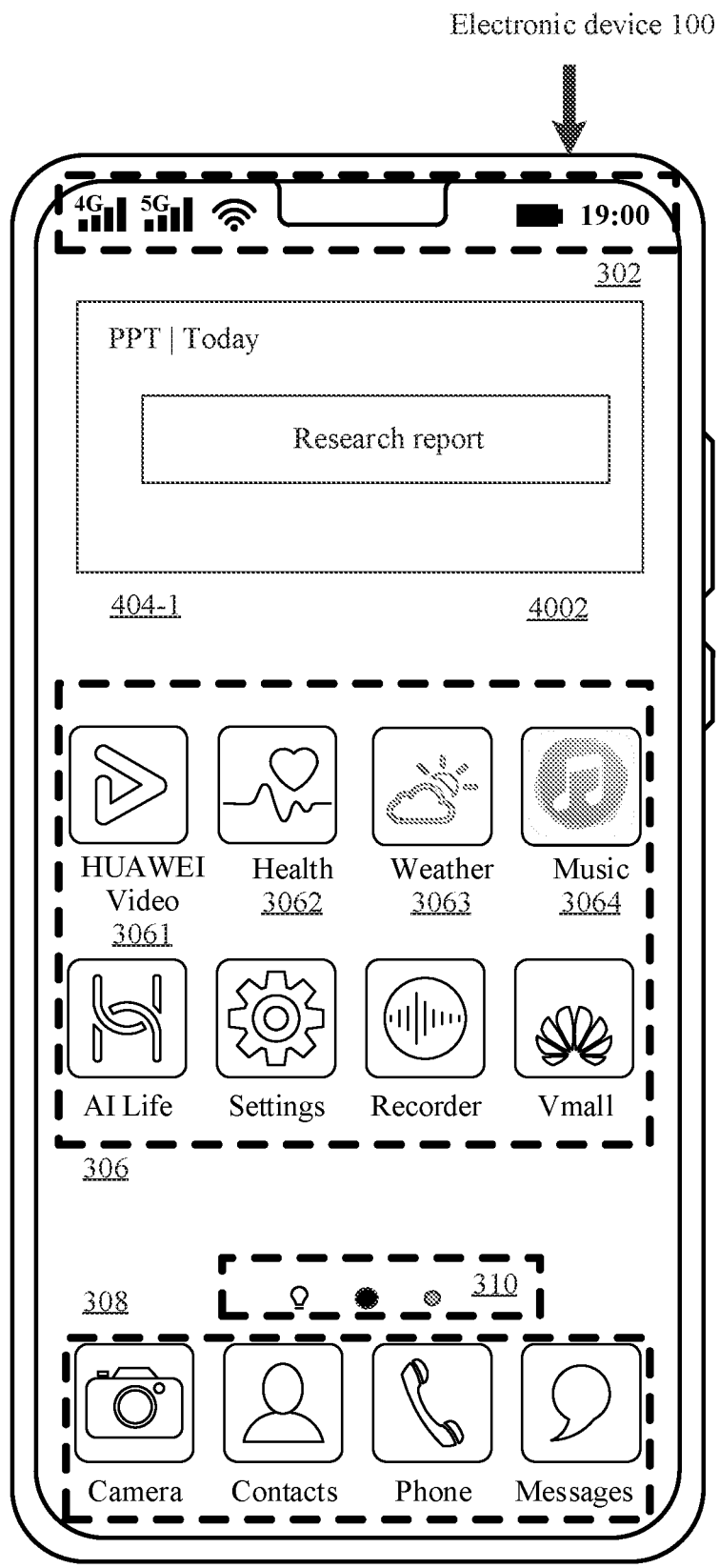

In some embodiments, the electronic device 100 receives the ongoing task in the office application in the another electronic device, and the electronic device 100 displays an office application widget on the home screen. The electronic device 100 may further detect a scenario change, to adjust a size of the office application widget and/or content displayed by the office application widget, and/or a layout of the content displayed by the office application widget, as shown in FIG. 4G-1 and FIG. 4G-2.

For example, the office application widget may have scenario time and/or a scenario geographical location. The scenario time and/or the scenario geographical location may be manually added by the user, or may be generated by the electronic device 100 based on a usage habit of the user for the office application. For example, if the user often processes an unfinished office task at home and the time is at 20:00 p.m., or the user often turns on the electronic device to process the unfinished office task at commute time on a subway after work at 17:00 p.m., the electronic device may determine, after statistics collection, that the scenario time of the slide widget is at 20:00 p.m. and/or 17:00 p.m., and the scenario geographical location of the application widget is home or a specific subway station.

When the electronic device 100 detects that a difference between system time of the electronic device and the scenario time is less than a preset value of a time threshold, and/or when the electronic device 100 detects that a distance difference between a geographical location of the device and the scenario geographical location is less than a preset value of a distance threshold, the electronic device 100 adjusts the size of the office application widget on the home screen and/or the content of the office application widget, and/or the layout of the content displayed by the office application widget.

In some embodiments, the electronic device 100 may further detect brightness of ambient light by using an ambient light sensor to determine the scenario change, so as to automatically adjust the size of the application widget and/or the content displayed by the application widget, and/or the layout of the content displayed by the application widget.

The electronic device 100 detects the scenario change, to adjust the size of the office application widget and/or the content displayed by the office application widget, and/or the layout of the content displayed by the office application widget. For beneficial effect thereof, the related content in the embodiments of FIG. 3A to FIG. 3M-1 and FIG. 3M-2 may be cited.

FIG. 5A to FIG. 5EC-1 and FIG. 5EC-2 show a group of example graphical user interfaces in which an electronic device 100 generates a widget by identifying schedule content and detecting, based on system time and/or a geographical location of the electronic device 100, that an ongoing task exists in a schedule of the electronic device 100.

In some embodiments, the electronic device 100 displays, on a home screen, the application widget 304-1 shown in FIG. 3A.

It should be understood that, the application widget 304-1 may alternatively be the media widget described in the embodiments of FIG. 3A to FIG. 3M-1 and FIG. 3M-2, the application widget described in the embodiments of FIG. 4A to FIG. 4F-1 and FIG. 4F-2, or the instant messaging application widget described in the embodiments of FIG. 6A-1 and FIG. 6A-2 to FIG. 6G.

The electronic device 100 may generate a schedule widget for display on the home screen by identifying the schedule content and detecting, based on the system time and/or the geographical location of the electronic device 100, that the ongoing task exists in the schedule of the electronic device 100. In some embodiments, the schedule widget may be displayed in a same area that is on the home screen page and in which the application widget 304-1 has been displayed. In some embodiments, the home screen page may be on a home page of the home screen.

It should be understood that the schedule content may be manually added by a user, or may be that the electronic device 100 automatically identifies schedule content in a schedule application (for example, applications such as Messages, Email, Memo, or Reminders), and adds the schedule content to a schedule (for example, a schedule in a calendar application) of the user.

For example, the electronic device 100 may automatically identify that content (including but not limited to a departure station, an arrival station, departure time, arrival time, passenger information, a ticket gate, and the like) about a ticket itinerary exists in the messages application. It should be understood that the electronic device 100 may identify, by using an SMS message template, which SMS message is an SMS message related to the itinerary, and add the content of the ticket itinerary to the schedule.

For example, the electronic device 100 may detect that express delivery content (including but not limited to express company information, a geographical location of an express delivery pick-up locker, a pick-up code, pick-up time, and the like) exists in the messages application, and the electronic device 100 may add the express delivery content to the schedule.

FIG. 5A shows an example graphical user interface 5000 of the messages application of the electronic device 100. SMS message content includes travel information of a ticket, and the SMS message content includes a departure date, a train number, a seat number, a departure station, and departure time. It should be understood that the SMS message content may include more information, for example, information such as an arrival station, arrival time, and a passenger name. In some embodiments, the SMS message content may alternatively be movie information (for example, movie release time and a geographical location of a cinema), or shopping mall information (for example, a location of the mall and time when the user expects to go shopping). The electronic device 100 may identify the schedule content, to determine that a difference between the system time of the electronic device 100 and time in the schedule content is less than a time threshold, and/or a distance between the geographical location of the electronic device 100 and a geographical location in the schedule content is less than a distance threshold, so as to determine that the ongoing task exists in the schedule content.

For example, the electronic device 100 may detect current geographical location information of the electronic device 100 in one or more positioning manners such as GPS positioning, Wi-Fi positioning, and base station positioning, and then calculate geographical location information of a departure location of the itinerary and the current geographical location information of the user. If the electronic device 100 detects that a distance between the current geographical location of the user and a geographical location of the departure station in the travel schedule content is less than (or less than or equal to) a preset value D1 of the distance threshold, the electronic device 100 determines that the ticket itinerary in the schedule application is the ongoing task, and displays the schedule widget on the home page of the home screen. In some embodiments, the electronic device 100 may further detect that a difference between the system time of the electronic device 100 and the departure time of the ticket itinerary in the schedule content is less than a preset value T1 of the time threshold, and the electronic device 100 determines that the ticket itinerary in the schedule application is the ongoing task, and displays, on the home page of the home screen, the schedule widget related to the schedule application.

For example, the electronic device 100 identifies the ticket itinerary in the schedule content. The electronic device 100 detects that the difference between the system time of the electronic device 100 and the departure time in the schedule content is less than or equal to the time threshold, and the electronic device 100 displays, on the home screen, the schedule widget related to the schedule content.

As shown in FIG. 5BA-1 and FIG. 5BA-2, if the electronic device 100 detects that the ticket itinerary information exists in the schedule content of the electronic device 100, the electronic device 100 identifies the ticket itinerary information (for example, the passenger, the departure station, the arrival station, the departure time, and the arrival time) in the schedule, and determines that a difference between system time of 08:00 a.m. of the electronic device 100 and departure time of 08:26 a.m. of the train is less than the time threshold, and/or a distance between a current geographical location of the electronic device 100 and a geographical location of a departure station Beijing of the train in the schedule content is less than the distance threshold. In this case, it is determined that the ticket itinerary of the schedule content is the ongoing task, and the electronic device 100 displays a schedule widget 502-2 and a time weather widget 304-2 on the home page of the home screen.

The related descriptions in FIG. 3FA-1 and FIG. 3FA-2 to FIG. 3FC-1 and FIG. 3FC-2 may be cited for the manner in which the electronic device 100 displays the application widget 304-1 on the home screen, and generates the schedule widget for display on the home screen by identifying the schedule content and detecting, based on the system time and/or the geographical location of the electronic device 100, that the ongoing task exists in the schedule of the electronic device 100.

In some embodiments, the electronic device 100 may simultaneously display a plurality of schedule widgets (for example, a plurality of pieces of ticket itinerary information simultaneously exist in the schedule application). In some embodiments, the plurality of schedule widgets may be stacked for display.

In some embodiments, the electronic device 100 may switch to simultaneously display the schedule widget 502-2 and a common service widget 503-2 from displaying the widget 304-1 on the home screen, and the common service widget 503-2 may include controls such as a ride code, scan, or a payment code, as shown in FIG. 5BB-1 and FIG. 5BB-2. It should be understood that the common service widget is merely an example name, and does not indicate a limitation on the name of the common service widget. The user needs to take a subway or a bus on the way to the station. Therefore, to meet requirements of the user in different scenarios, different widgets are intelligently pushed to the user.

In some embodiments, the electronic device 100 may further display a music widget while displaying the schedule widget on the home screen. As shown in FIG. 5BC-1 and FIG. 5BC-2, the music widget may be automatically pushed by the electronic device 100 after collecting statistics on frequency of listening to music by the user at the station. Alternatively, the music widget may be automatically pushed by the electronic device after the user associates the music widget with the schedule widget. It should be understood that, in this case, the music widget is in a paused state, which is different from the music widget described in the embodiments of FIG. 3A to FIG. 3M-1 and FIG. 3M-2.

Because the user has the requirement for listening to music on the way to the railway station, the music widget is displayed while the schedule widget is displayed. When the user expects to listen to music, the user may tap a control on the music widget to play music.

The electronic device 100 displays another widget while displaying the schedule widget on the home screen, so that different information can be intelligently provided for the user based on an associated scenario, thereby improving user experience.

In some embodiments, the electronic device 100 may detect an input predefined gesture (for example, pinching, and two points of the pinching are respectively in contact with different widgets), and the electronic device 100 responds by combining two widgets into a composite widget.

For example, as shown in a GUI 5001 in FIG. 5C-1 and FIG. 5C-2, the electronic device 100 displays the schedule widget 502-2 and a music widget 314-2. When the electronic device detects the predefined gesture of the user, the electronic device 100 responds to display a GUI 5003 shown in FIG. 5C-1 and FIG. 5C-2, and the electronic device displays a composite widget 502-3. It should be understood that content displayed by the composite widget 502-3 may include the content displayed by the schedule widget 502-2 and the music widget 314. It should be further understood that the composite widget may display more or less content about the schedule widget than the schedule widget 502-2. It should be further understood that the composite widget 502-3 may display more or less content about the music widget than the music widget 314-2.

In some embodiments, the electronic device 100 detects the input predefined instruction (for example, the pinching gesture), and the electronic device 100 may combine three or a plurality of widgets into the composite widget. A quantity of widgets used for combination is not specifically limited in this embodiment of this application.

When the electronic device 100 detects that the ongoing task exists in an application related to any widget of the composite widget, the electronic device may display the composite widget on the home page of the home screen.

For example, the user pinches the music widget and the schedule widget into the composite widget. When the electronic device detects that the ongoing task exists in the music application, the electronic device 100 displays the composite widget on the home page of the home screen. Alternatively, when the electronic device 100 detects that the ongoing task exists in the schedule, the electronic device 100 displays the composite widget on the home page of the home screen.

After the user combines two widgets into one composite widget, the composite widget automatically appears when the user enters a same scenario next time, and the user does not need to manually switch the two separate widgets to a display 194 for display, thereby improving user experience (for example, the travel information of the ticket exists in the schedule of the user, the user expects to listen to music at the station, therefore, the user combines the music widget and the schedule widget into the composite widget at the station, and when the user enters the station scenario next time, the electronic device 100 automatically displays the composite widget, where the widget content includes the schedule widget content and the music widget content).

In some embodiments, the electronic device 100 may detect the input predefined gesture, and adjust a size of the widget and/or content displayed by the widget. The content in FIG. 3HA-1 and FIG. 3HA-2 may be cited for related descriptions of detecting the input predefined gesture and adjusting the size of the widget and the content displayed by the widget by the electronic device 100. Details are not described herein again.

In some embodiments, the electronic device 100 displays the schedule widget on the home screen. The electronic device 100 may detect a scenario change, and adjust the schedule widget. For example, the electronic device 100 may adjust a size of the schedule widget, and/or adjust content displayed by the schedule widget.

For example, when the electronic device 100 detects that a distance between a current geographical location of the electronic device 100 and a geographical location of a departure station in the schedule content is less than (or less than or equal to) a preset value D2 of the distance threshold, where D2 is less than D1, and/or when the electronic device 100 detects that a difference between system time of the device and departure time in the schedule content is less than a preset value T2 of the time threshold, where T2 is less than T1, the electronic device 100 adjusts the size of the schedule widget, and/or adjusts the content displayed by the schedule widget.

For example, as shown in FIG. 5D, the user is 200 meters away from the railway station, the electronic device of the user displays the schedule widget 502-2 (for example, the schedule widget 502-2 in FIG. 5BA-1 and FIG. 5BA-2), and a difference between system time of the electronic device 100 and departure time (for example, 8:26 a.m. shown in the schedule widget 502-2) is 11 minutes. When the electronic device 100 detects that the difference between the time of the electronic device 100 and the departure time is less than a preset value (for example, the preset value may be set to 11 minutes or a specific value less than or equal to 11 minutes), and/or the electronic device detects that the distance difference between the geographical location information of the electronic device 100 and the geographical location of the departure station is less than a preset value (for example, the preset value may be set to 200 meters or a specific value less than or equal to 200 meters), the electronic device switches to display the GUI 5001 on the home screen, as shown in FIGS. 5EA-1 and 5EA-2. The content displayed by the schedule widget 502-2 shown in the GUI 5001 includes a schedule theme "ticket", the train number "high-speed railway G80", the departure station "Beijing railway station", and the arrival station "Shanghai railway station", and the electronic device 100 switches to a GUI 5002. A widget displayed on the GUI 5002 is a schedule widget 502-1. A size of the schedule widget 502-1 is larger than that of the widget 502-2, and content displayed the schedule widget 502-1 may be increased compared with that of the widget 502-2. In some embodiments, the added information may include a passenger name, seat number information, ticket gate information, and the like. In some embodiments, the added content for display may further include a map thumbnail of a current location of the electronic device 100. The map thumbnail may display a nearby service of the current location of the electronic device 100, and the nearby service may include information such as food, parking, a checkroom, and a hotel, as shown in FIG. 5EB-1 and FIG. 5EB-2.

For example, a schedule widget is displayed on the home screen of the electronic device 100. The schedule widget includes express delivery information, and the express delivery information includes a name of an express delivery company, a location at which the express delivery is placed (or a location of an express delivery pick-up locker), and express delivery pick-up time. Message content that concerns the user is not much before the user arrives at the express delivery pick-up place. Therefore, the schedule widget does not display much content about the express delivery. When the user is about to arrive at the express delivery pick-up location, the user needs to know a pick-up code and need to obtain more information. When the electronic device 100 of the user detects that a distance difference between the geographical location of the electronic device 100 and the location of the express delivery pick-up locker is less than the distance threshold, the electronic device 100 enlarges the schedule widget to display more content, and the newly added content may include the express delivery pick-up code and the like.

In some embodiments, the composite widget is displayed on the home screen of the electronic device 100, and the composite widget is obtained by combining schedule widgets, for example, FIG. 5EC-1 and FIG. 5EC-2. When the electronic device 100 detects that the distance between the current geographical location of the electronic device 100 and the geographical location of the departure station of the itinerary is less than (or less than or equal to) the preset value D2 of the distance threshold, where D2 is less than D1, and/or when the electronic device 100 detects that the difference between the system time of the electronic device 100 and the departure time of the ticket itinerary is less than the preset value T2 of the time threshold, where T2 is less than T1, the electronic device 100 switches to display, on the home screen, the schedule widget with size and/or the content adjusted.

In some embodiments, when the electronic device 100 detects that the system time of the electronic device 100 of the user has passed a specific time point in the schedule content, the electronic device 100 stops displaying the schedule widget.

For example, the departure time in the ticket travel task in the schedule is 8:26 a.m. When the electronic device 100 detects that the system time of the electronic device 100 is greater than or equal to the departure time, the electronic device 100 stops displaying the schedule widget. In some embodiments, the specific time point in the schedule content further includes movie showing time, conference end time, and the like.

In some embodiments, at least two application widgets are displayed on the home screen of the electronic device 100. The electronic device may generate the schedule widget for display on the home screen by identifying the schedule content and detecting, based on the system time and/or the geographical location of the electronic device, whether the ongoing task exists in the schedule of the electronic device. The display manner of the media widget in FIG. 3L-1 and FIG. 3L-2 to FIG. 3M-1 and FIG. 3M-2 may be cited for the manner in which the schedule widget is displayed on the home screen.

In some embodiments, the electronic device may generate the schedule widget for display on a lock screen page by identifying the schedule content and detecting, based on the system time and/or the geographical location of the electronic device, whether the ongoing task exists in the schedule of the electronic device. The display manner of the schedule widget on the home screen may be cited for the display manner of displaying the schedule widget on the lock screen page and beneficial effect. Details are not described herein again.

In some embodiments, after the electronic device 100 of the user is connected to a vehicle-mounted device (for example, through Bluetooth), the vehicle-mounted device may display the schedule widget (including the schedule widget of the express delivery content and the schedule widget of the ticket travel task) shown in FIG. 5A to FIG. 5EC-1 and FIG. 5EC-2 displayed on the electronic device 100.

FIG. 6A-1 and FIG. 6A-2 to FIG. 6G show a group of example graphical user interfaces in which an electronic device 100 may display an instant messaging application widget on a home screen after detecting a predefined gesture of a user on an instant messaging application interface. In some embodiments, the electronic device 100 displays an application widget 304-1 on the home screen page, and the related content in FIG. 5A to FIG. 5EC-1 and FIG. 5EC-2 may be cited for the application widget 304-1.

It should be noted that, the application widget 304-1 may alternatively be the media widget described in the embodiments of FIG. 3A to FIG. 3M-1 and FIG. 3M-2, the schedule widget described in the embodiments of FIG. 5A to FIG. 5EC-1 and FIG. 5EC-2, or the application widget described in the embodiments of FIG. 4A to FIG. 4F-1 and FIG. 4F-2.

The electronic device 100 may display the instant messaging application widget on the home screen page after detecting a predefined input gesture of a user on the instant messaging application interface. The instant messaging application interface may include a chat window page (including a chat window with a single contact and a group chat window). In some embodiments, the instant messaging application widget may be displayed in a same area that is on the home screen and in which the application widget 304-1 has been displayed. In some embodiments, the home screen may be on a home page of the home screen.

The following uses a messages application as an example for schematic description.

It should be understood that the messages application in this embodiment of this application may alternatively be replaced with another instant messaging application (for example, WeChat, QQ, Meetime, WhatsApp, Messenger, Line, and iMessage).

Figures 1, 6A:
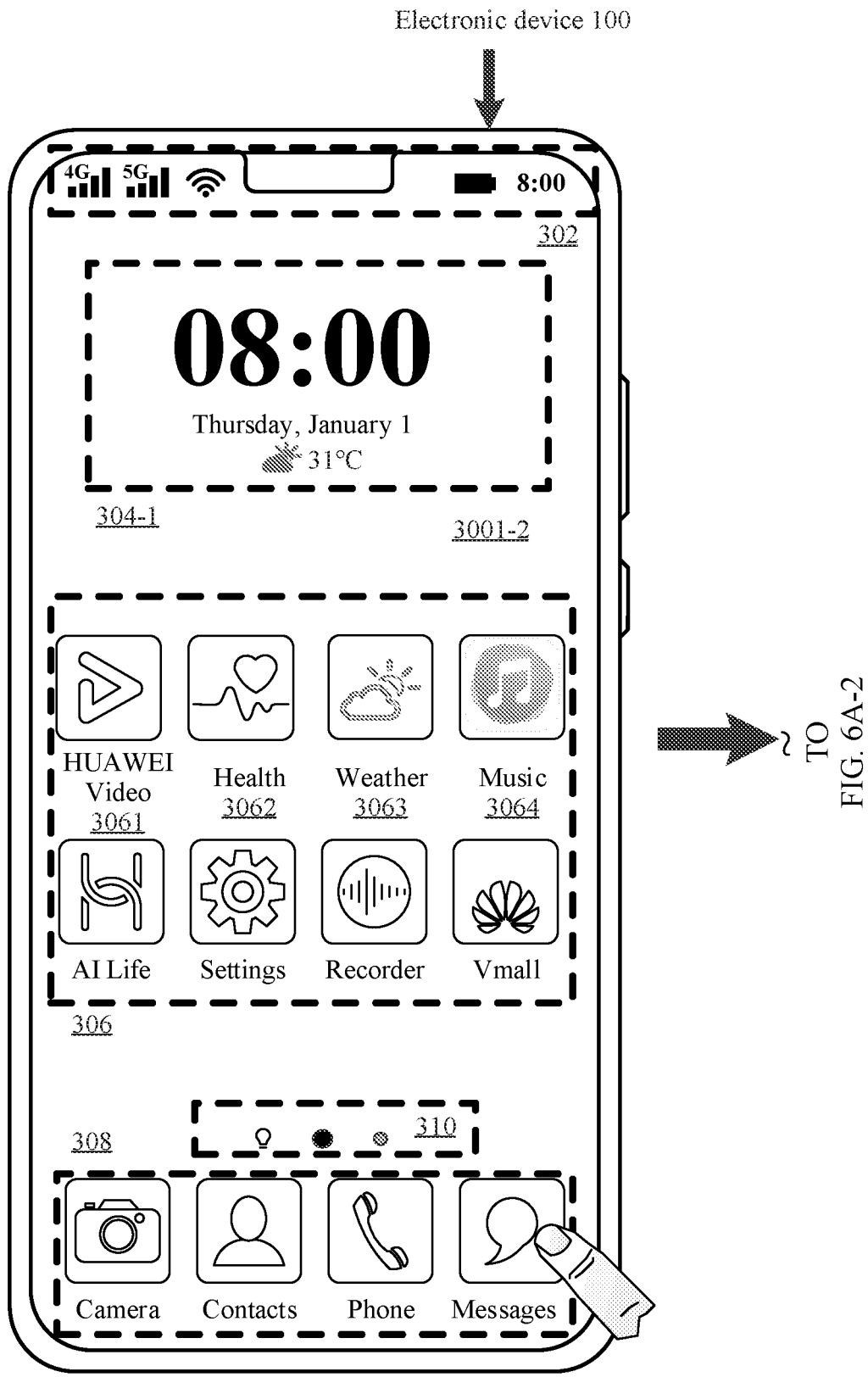
Figures 2, 6A:
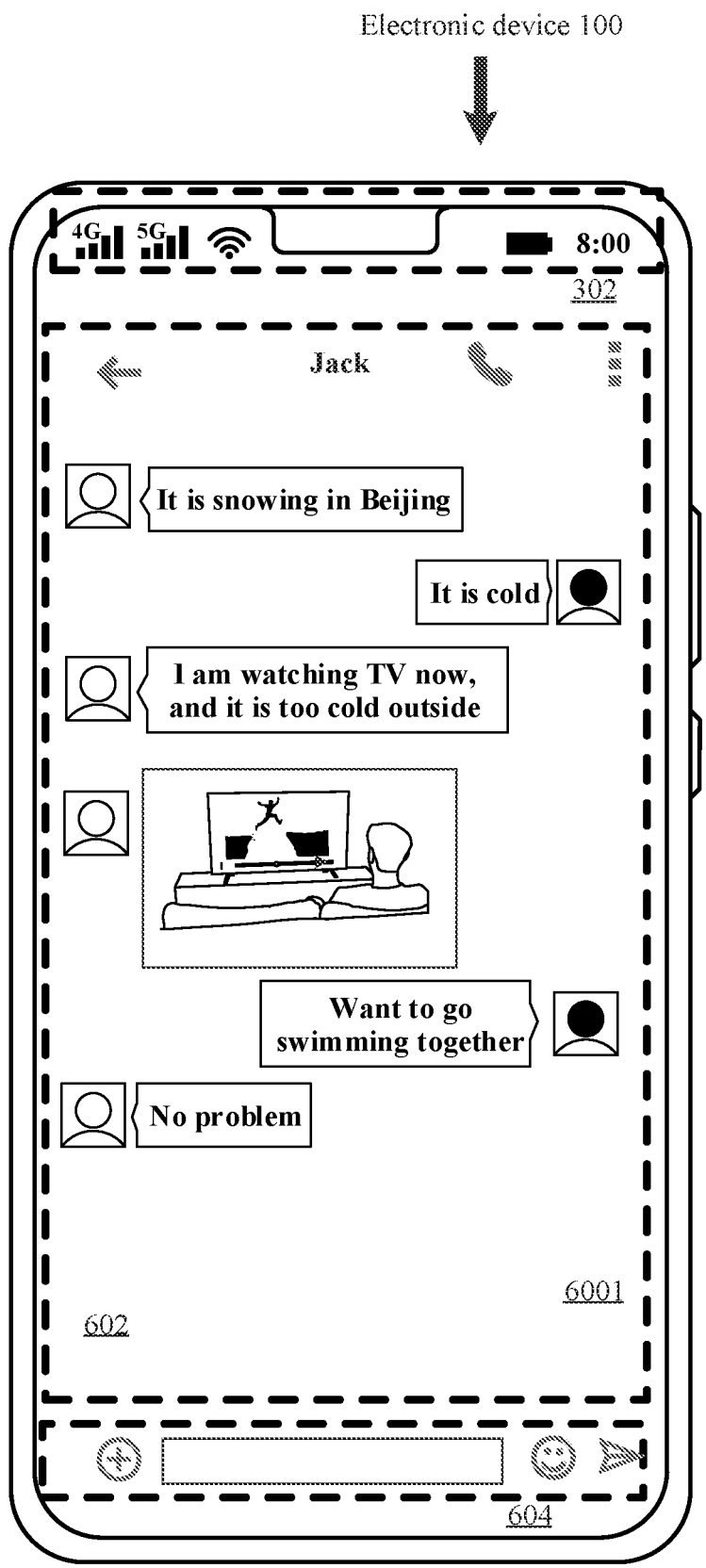

As shown in FIG. 6A-1 and FIG. 6A-2, the GUI 3001-2 shown in FIG. 3B is displayed on the electronic device 100, and the time weather widget 304-1 is displayed on the home screen. In some embodiments, after the electronic device 100 detects a messages application icon of the user, the electronic device 100 displays an application interface GUI 6001 of the messages application shown in FIG. 6A-1 and FIG. 6A-2. It should be understood that content displayed on the GUI 6001 may include a status bar 302, a message display window 602, a message reply window 604, and the like. It should be further understood that the message content 602 may include but is not limited to text, a picture, a video, an emoji (Emoji), and the like.

Optionally, after the electronic device 100 detects the input predefined gesture (for example, the user slides inward in a corner of the user interface 6001) on the application interface 6001, the electronic device 100 may respond by displaying a messages application widget on the home page of the home screen.

Figures 1, 6B:
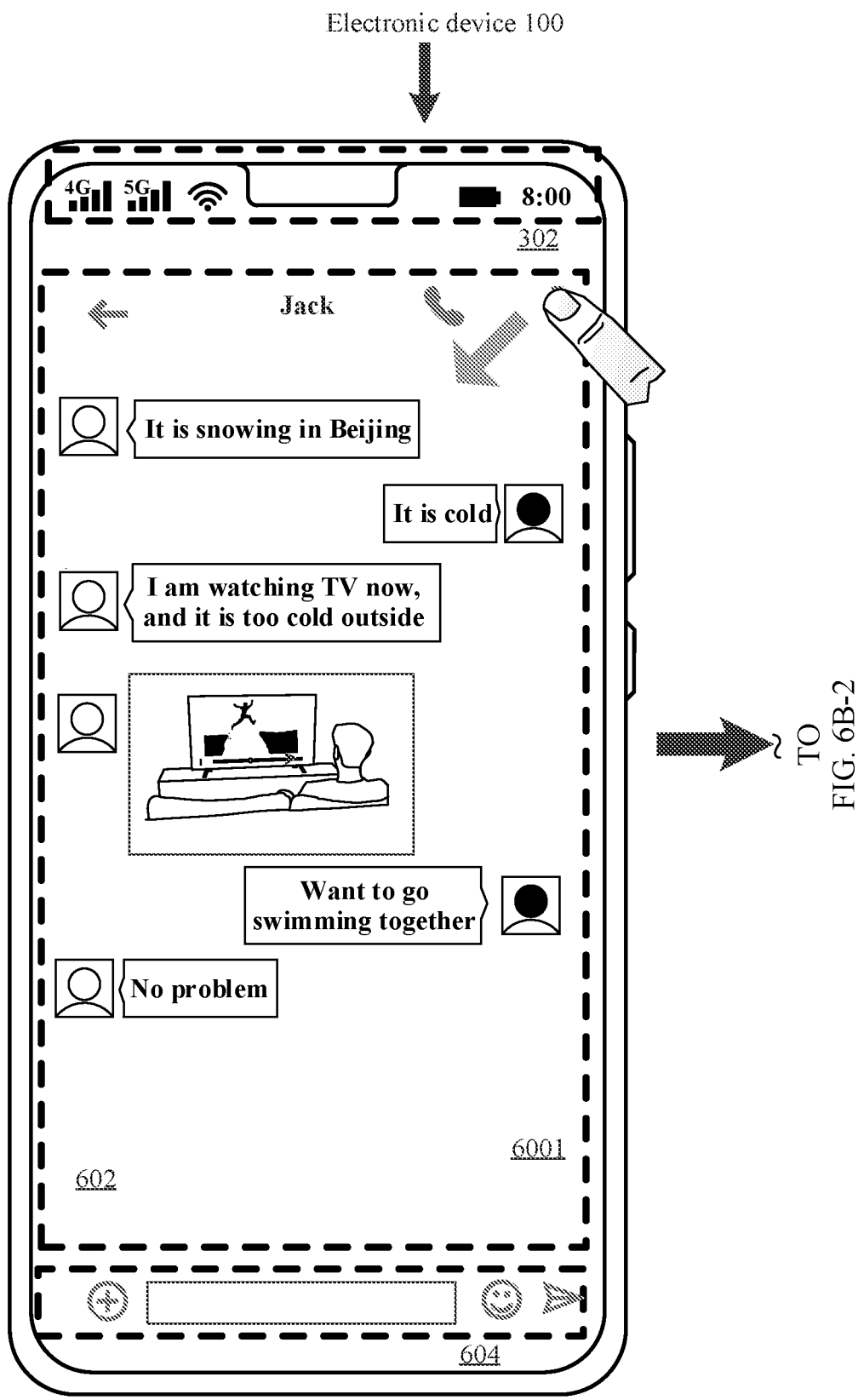
Figures 2, 6B:
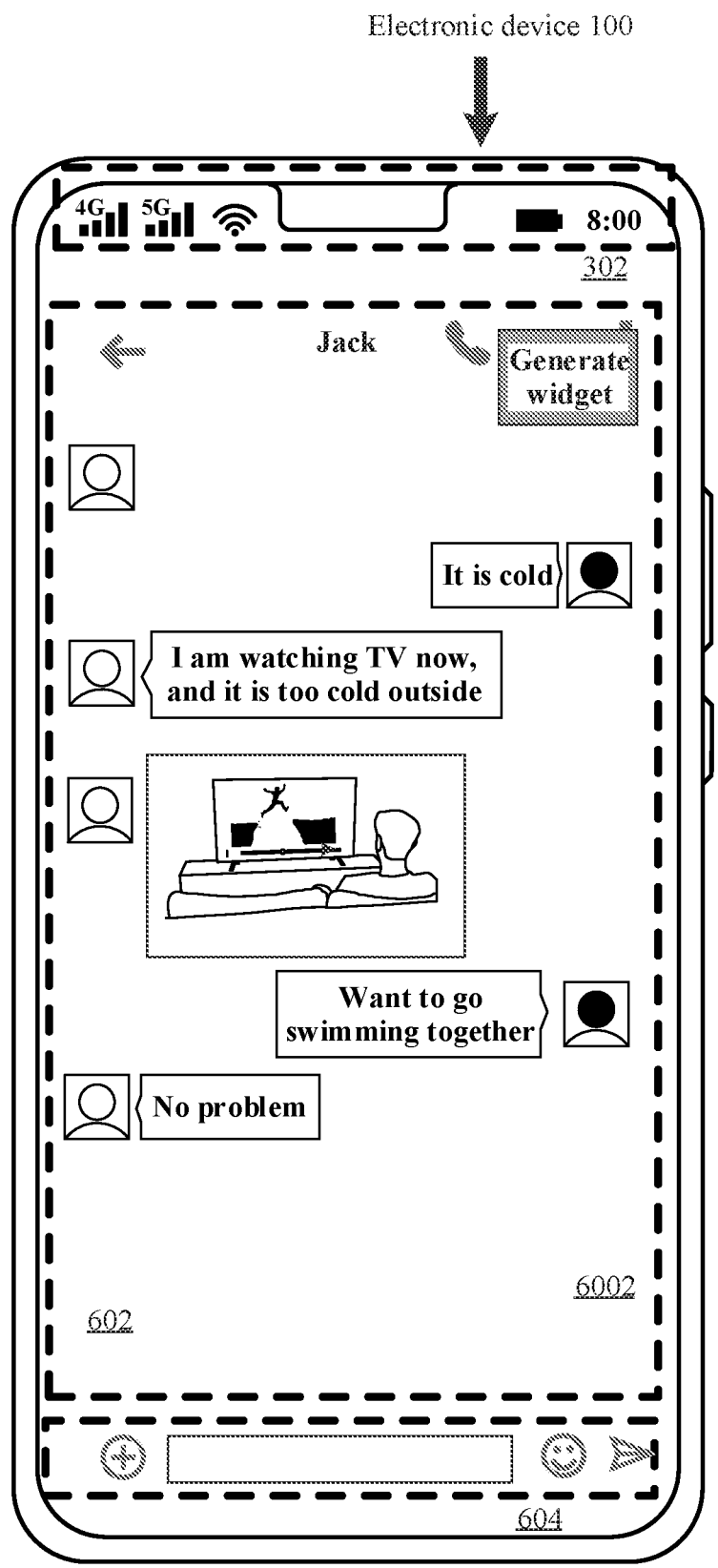
Figure 6C:
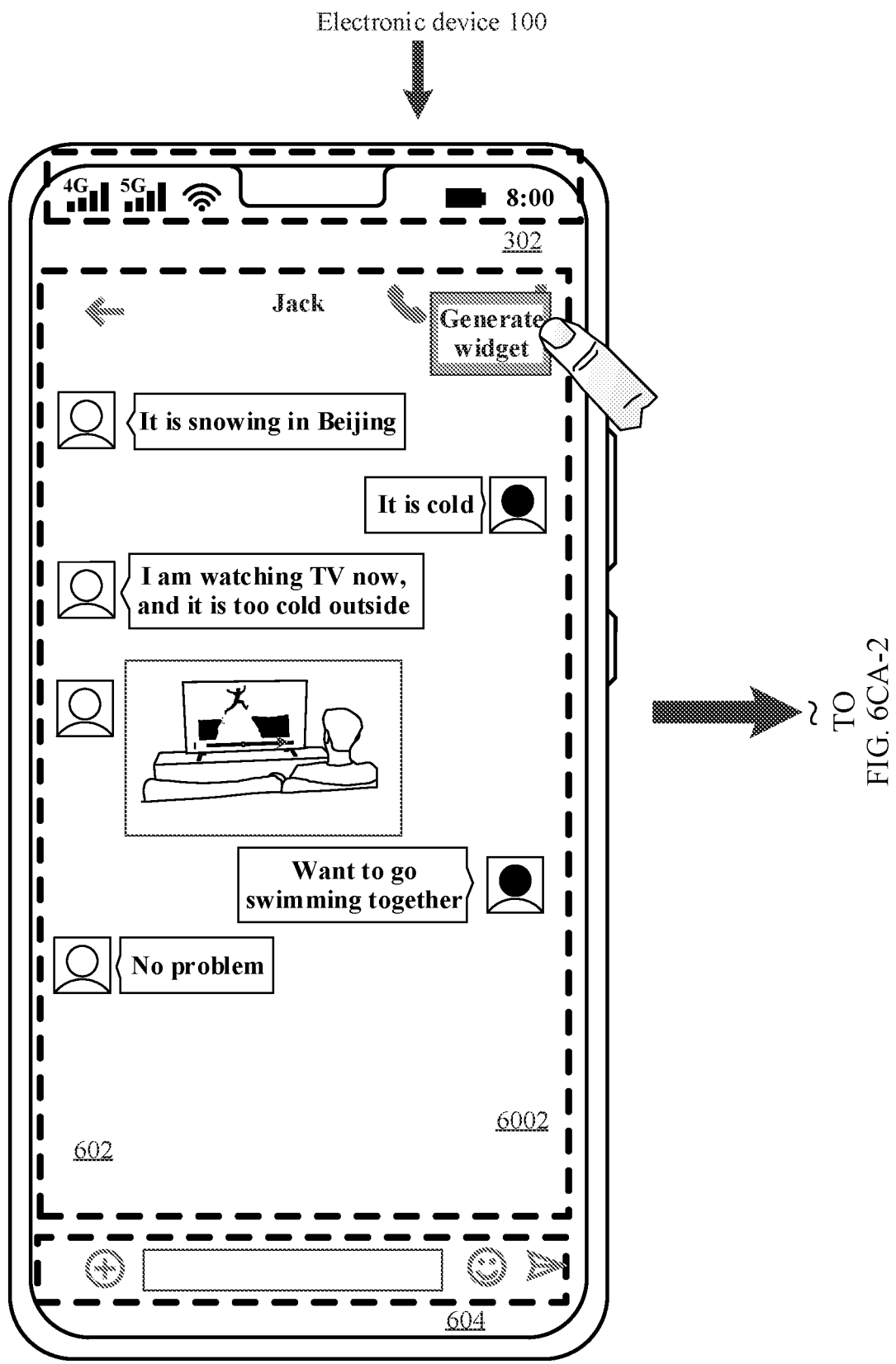
Figure 6C:
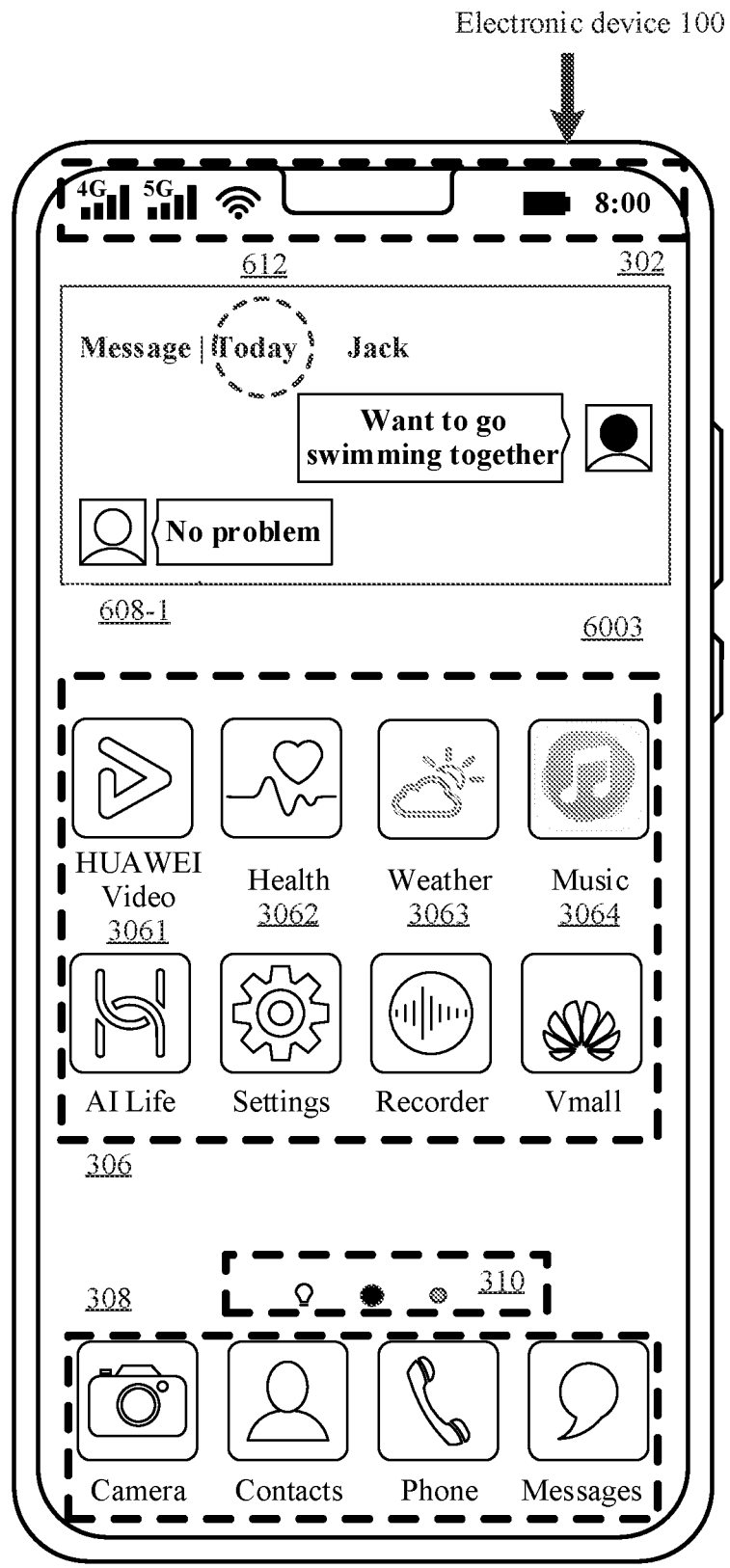
Figure 6C:
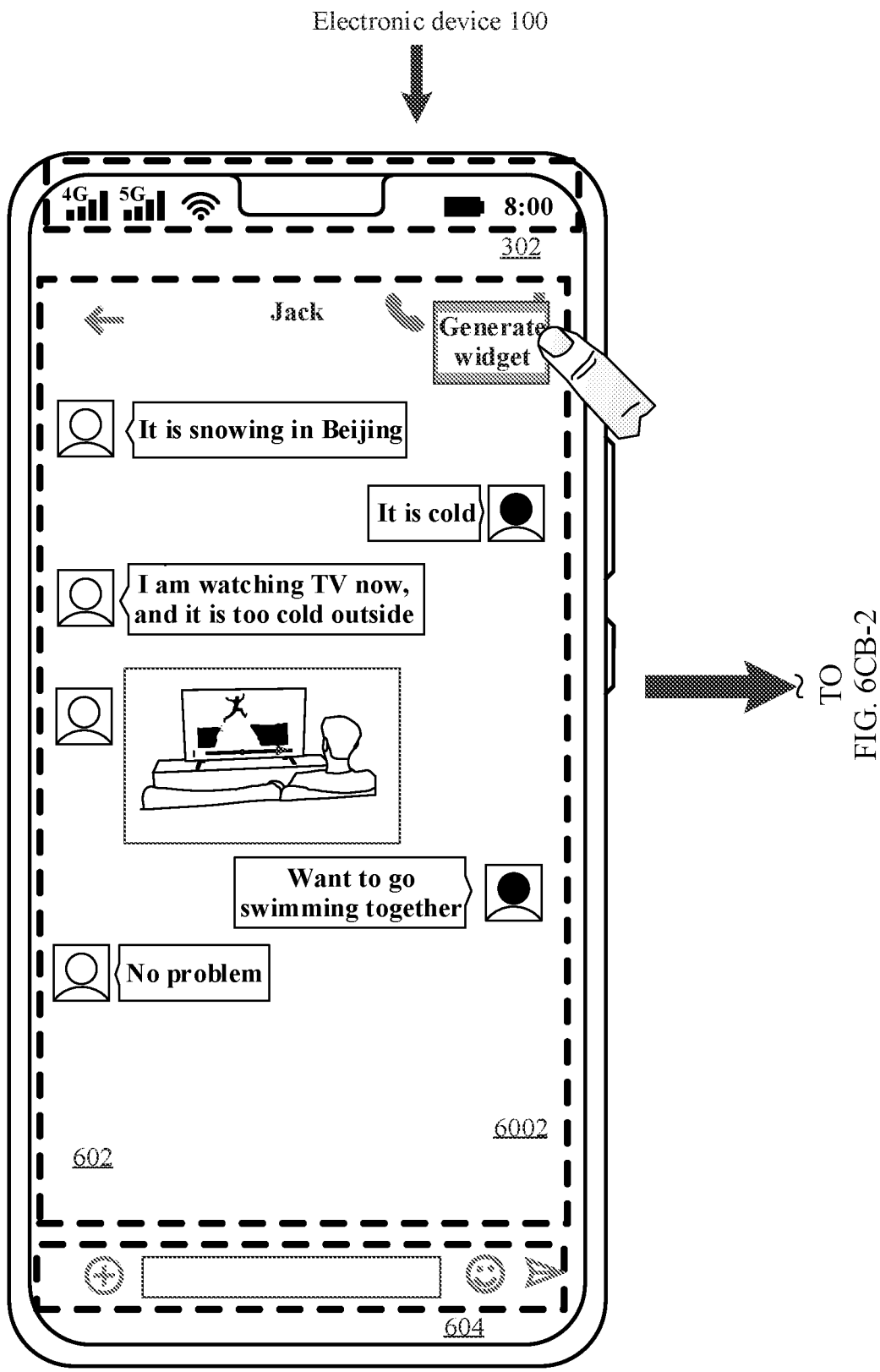
Figure 6C:
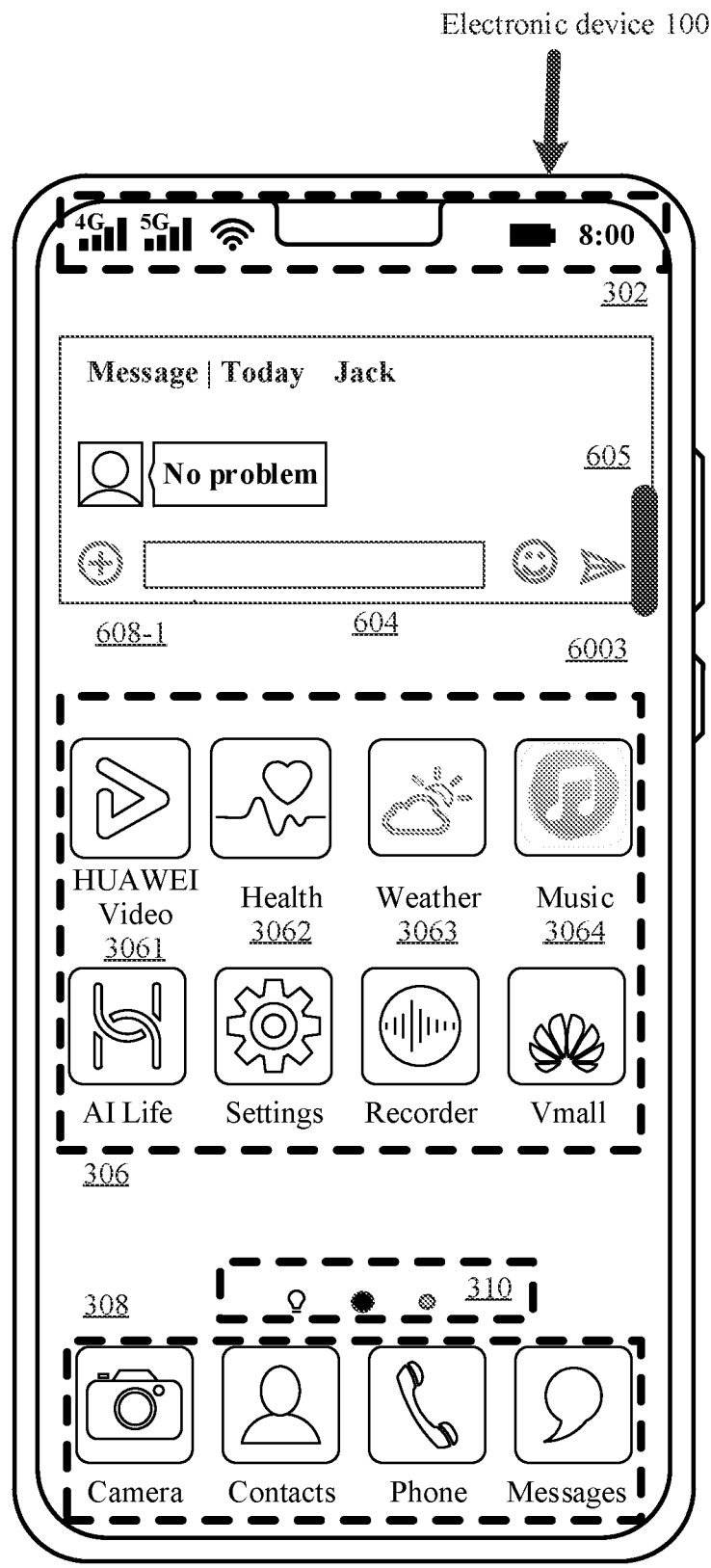

Optionally, after the electronic device 100 detects the predefined gesture operation (for example, sliding from an upper right corner to a lower left corner) performed by the user in the corner of the screen, the electronic device 100 may respond by displaying a control "Generate widget" in the upper right corner of the message window 602, as shown in FIG. 6B-1 and FIG. 6B-2. After the electronic device 100 detects, on the application interface, that the "Generate widget" control is activated (for example, the user taps the control once with a finger), the electronic device 100 responds by displaying the messages application widget on the home page of the home screen of the electronic device 100. As shown in FIG. 6CA-1 and FIG. 6CA-2, after the electronic device 100 detects the predefined gesture input on the application interface 6001, the electronic device 100 responds by displaying a messages widget 608-1 on the home page of the home screen.

In some embodiments, the messages widget 608-1 may display a part of the message content. In some embodiments, the content displayed by the messages widget 608-1 may include a newly updated message. In some embodiments, the messages widget 608-1 may display update time 612 of the message. For example, as shown in FIG. 6CA-1 and FIG. 6CA-2, the update time of the message displayed in the messages widget 608-1 is "Today". It should be understood that the update time of the message displayed by the messages widget 608-1 may dynamically change, for example, may be "Just now" or "One day ago".

In some embodiments, when the electronic device 100 detects the predefined gesture (for example, the finger slides up and down on the widget) input on the messages application widget, the electronic device 100 may adjust message content (not shown in the figure) displayed by the messages application widget.

In some embodiments, the messages widget 608-1 may further include an up and down slide control, as shown in FIG. 6CB-1 and FIG. 6CB-2. In some embodiments, the messages widget 608-1 displayed on the home page of the home screen of the electronic device 100 may further include the message reply window 604.

Figures 1, 6D:
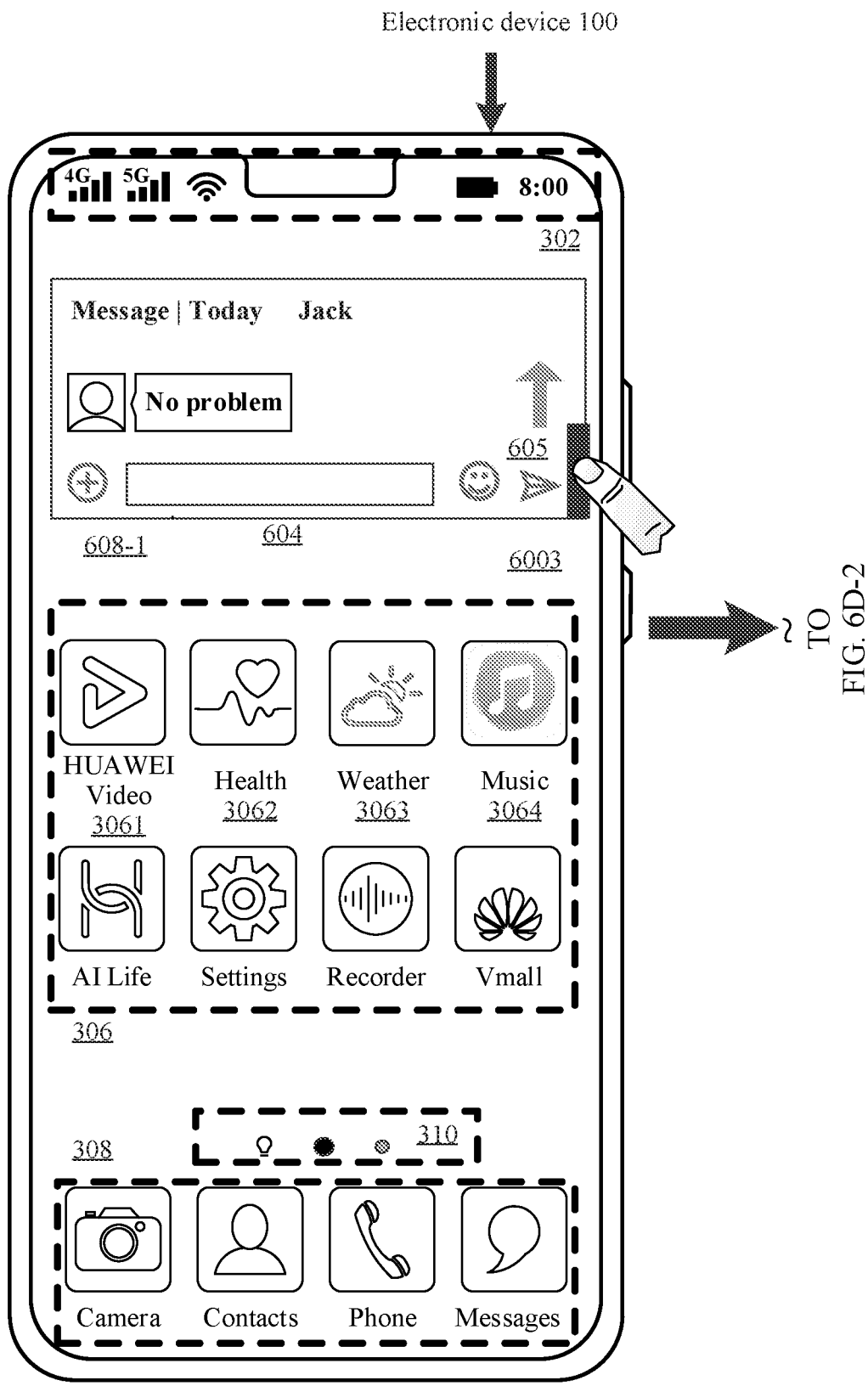
Figures 2, 6D:
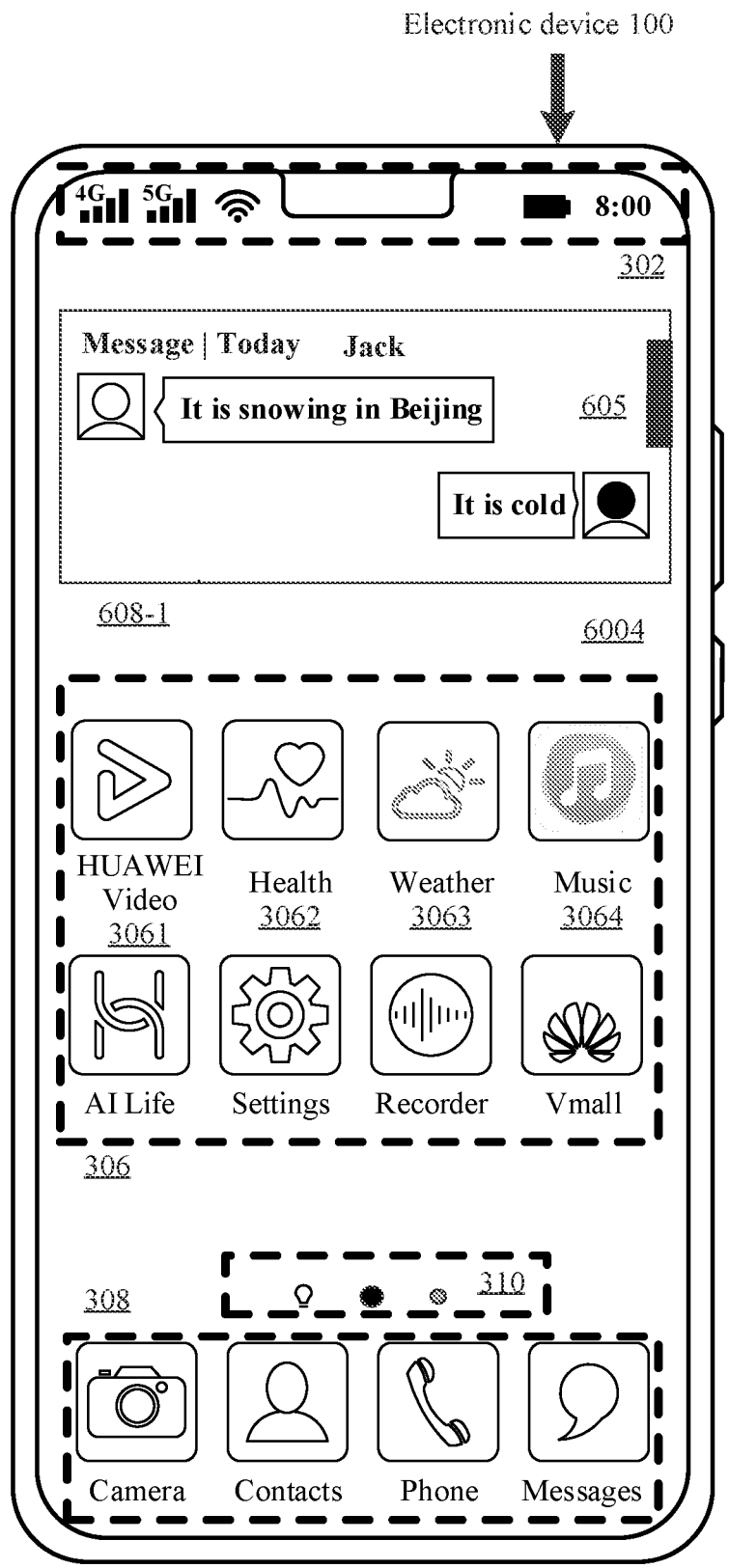

Optionally, if the messages widget 608-1 may further include the up and down slide control, when the electronic device 100 detects that the up and down slide control 605 is being slid up, the messages widget 608-1 may stop displaying the message reply window 604, and display more historical messages in limited space, as shown in FIG. 6D-1 and FIG. 6D-2.

Figure 6E:
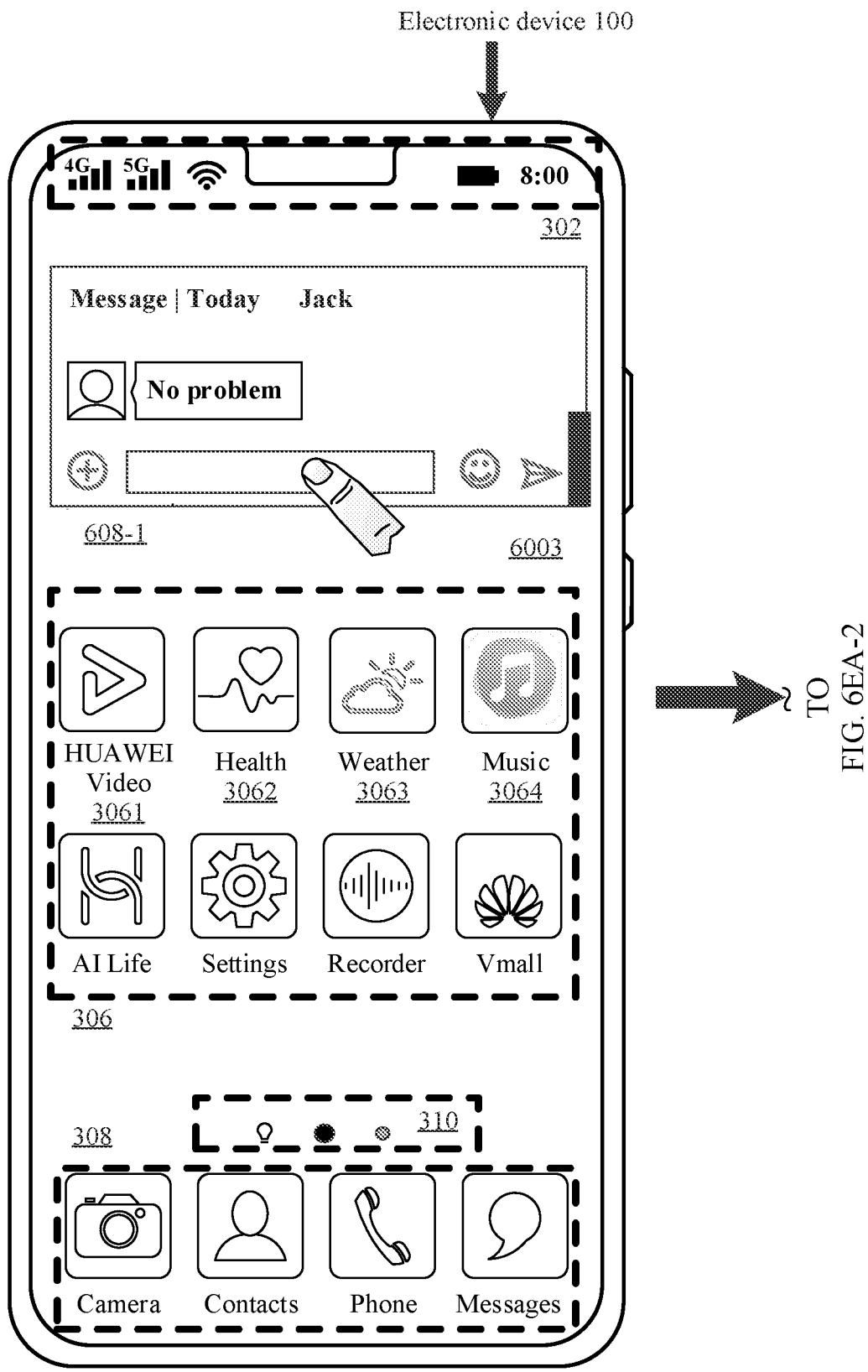
Figure 6E:
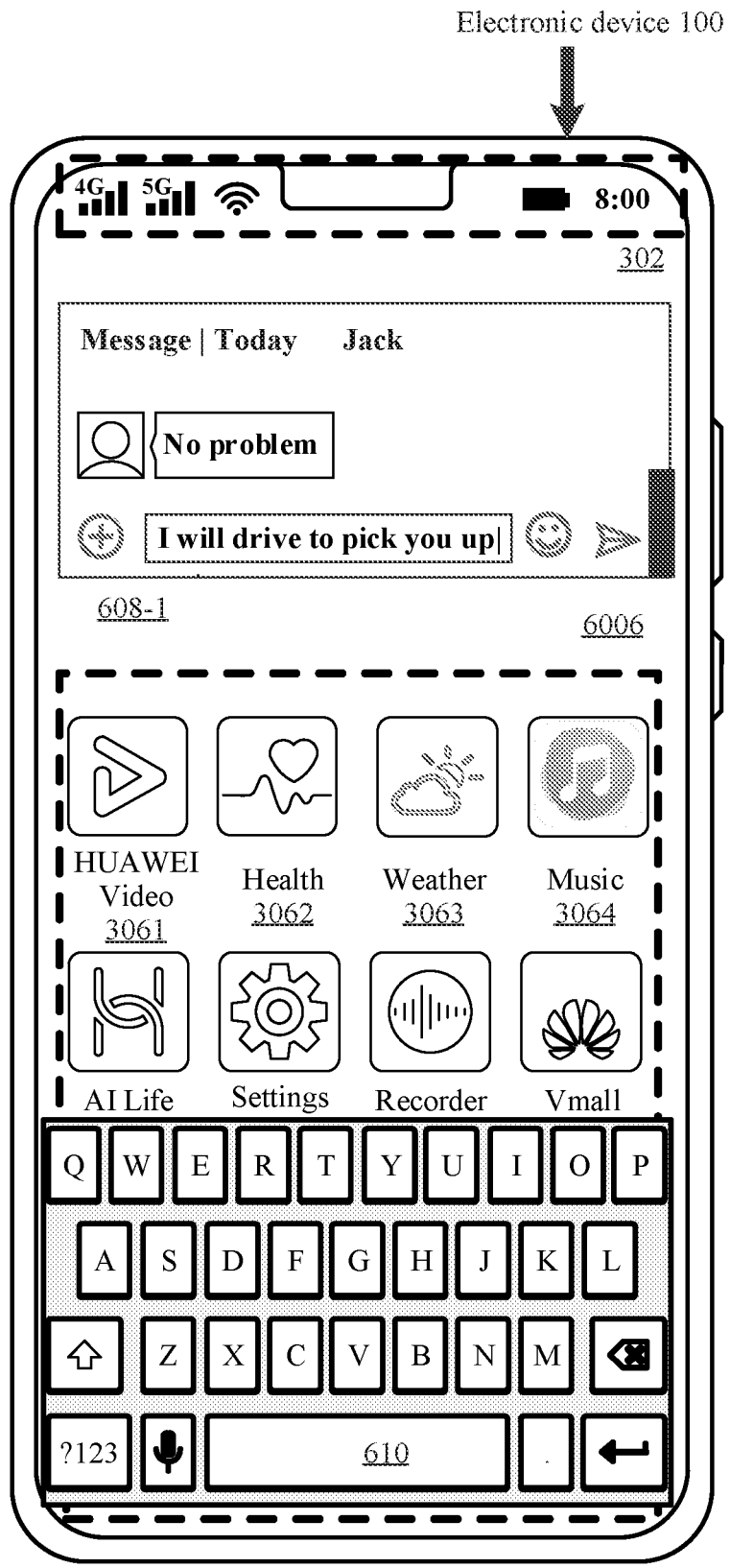
Figure 6E:
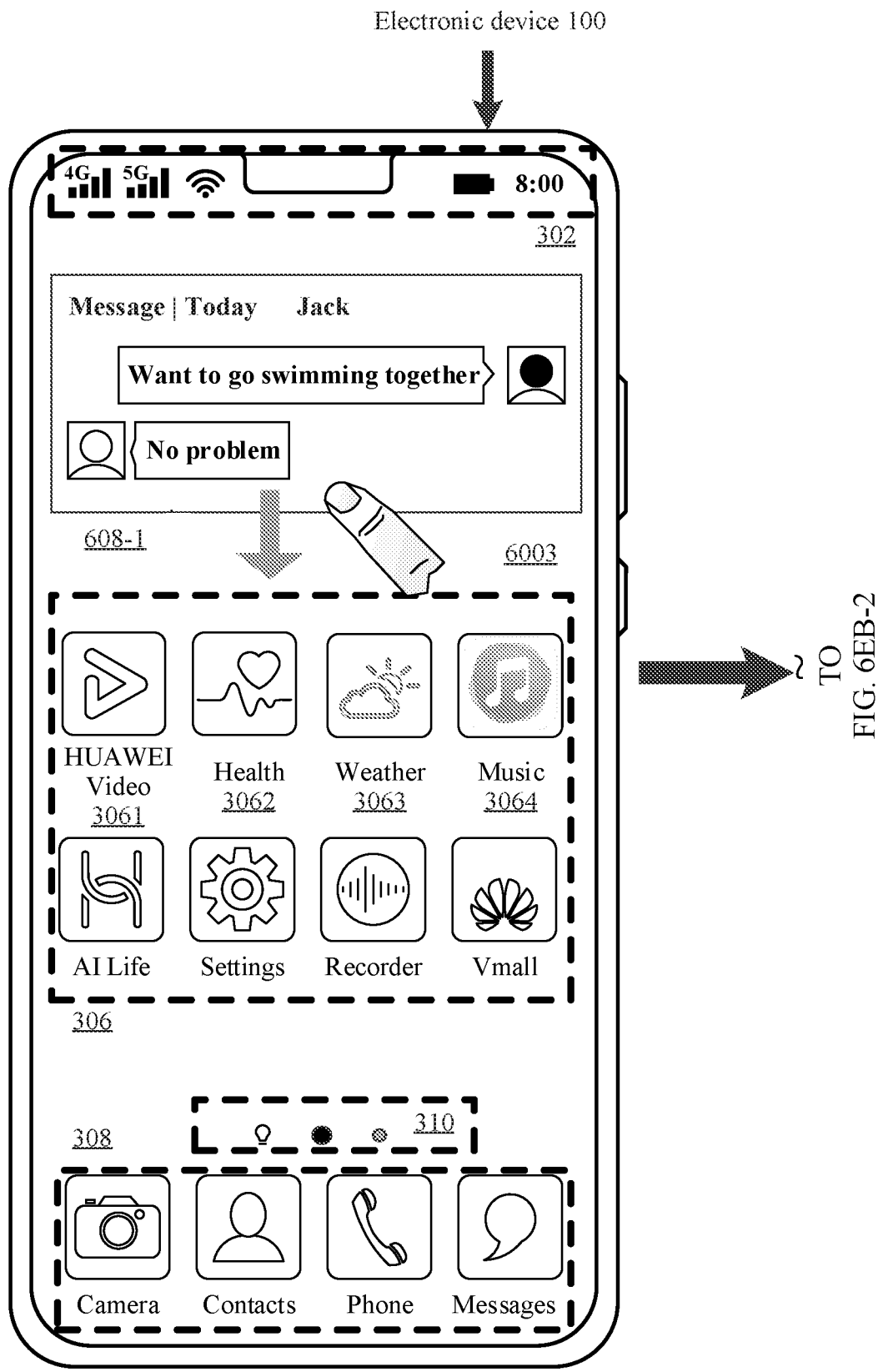
Figure 6E:
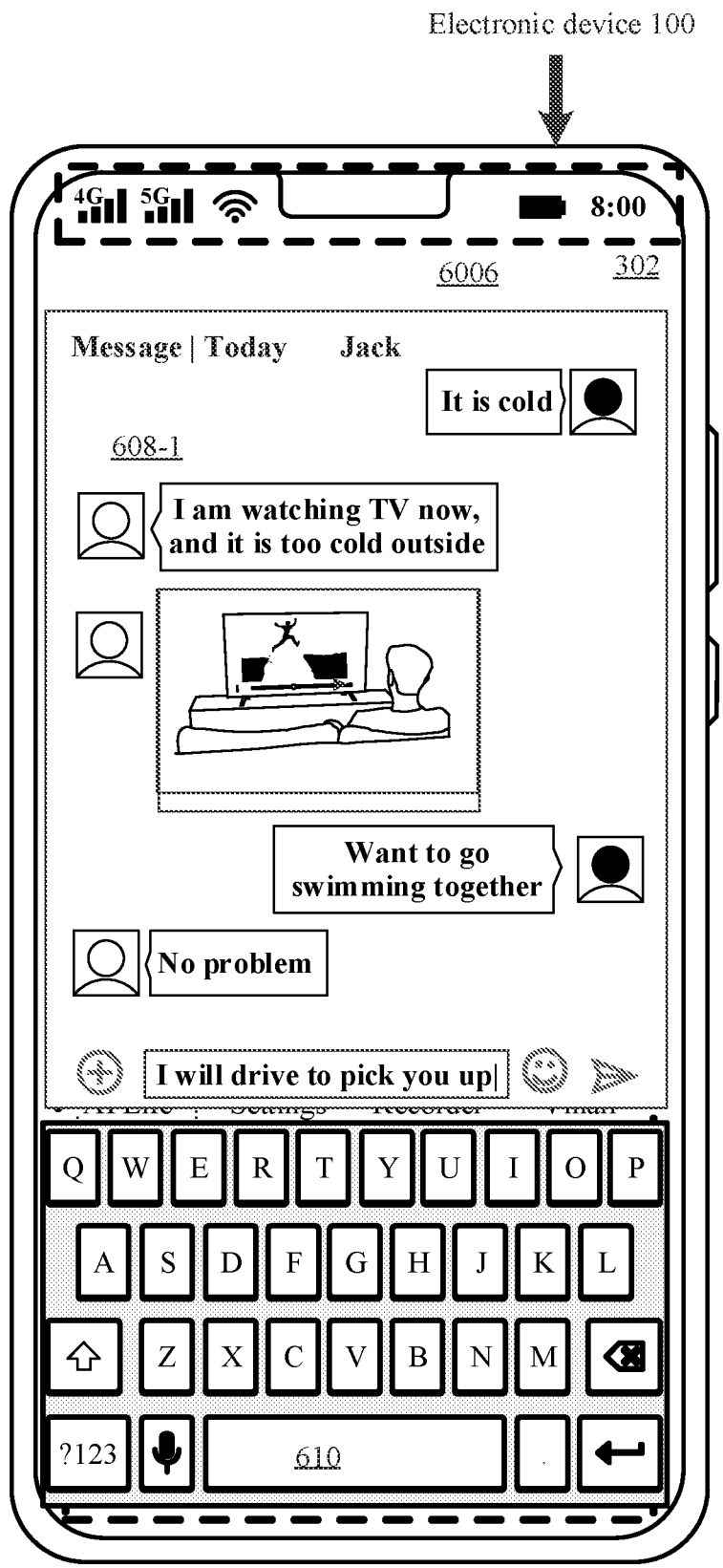

In some embodiments, when the electronic device 100 detects the predefined gesture (for example, tapping the message reply window once, or dragging down a bottom edge of the widget) input on the messages widget 608-1, the electronic device 100 may display a soft keyboard 610, and the user may input content in the message reply window 604 for sending, as shown in FIG. 6EA-1 and FIG. 6EA-2. Optionally, while displaying the soft keyboard 610, the electronic device 100 may enlarge a size of the messages application widget to display more content to the user, as shown in FIG. 6EB-1 and FIG. 6EB-2. It should be understood that content entered by the user in the message reply window 604 includes but is not limited to a voice, text, an emoji, a picture, a video, and the like. Optionally, the sent message may further include a sealed message (content is hidden and not directly displayed, and a screenshot or screen recordings are not allowed).

Because the user can directly reply to the message on the messages widget, the user does not need to access the "Messages" application interface by tapping the icon after finding the "Messages" application icon again, so that the user can receive the message and send the message more conveniently and quickly.

In some embodiments, the electronic device 100 may further refresh, after receiving the message, the content displayed by the messages application widget.

Optionally, the electronic device 100 may add a marked point (for example, a red dot) at the end of a newly received message, to remind the user. After detecting the input predefined gesture (for example, the user taps the messages application widget), the electronic device 100 stops displaying the marked point.

Optionally, the manner of reminding the user may alternatively be a manner such as widget jitter.

Optionally, the manner of reminding the user may alternatively be as follows: The electronic device 100 sets the messages application widget to be displayed with specific transparency, and highlights a newly received message above the messages application widget, as shown in FIG. 6G. In some embodiments, the electronic device 100 may display a control (for example, a "reply" control) while highlighting the newly received message above the messages application widget. The electronic device 100 detects that the "reply" control is activated, and displays a message reply interface, for example, a GUI 6006 in FIG. 6EA-1 and FIG. 6EA-2 or a GUI 6006 in FIG. 6EB-1 and FIG. 6EB-2.

In some embodiments, the electronic device 100 detects the predefined gesture (for example, touching and holding) of the user on a message, and may copy, delete, forward, and reply to the message.

In some embodiments, the instant messaging application widget displayed by the electronic device 100 includes a voice message. When playing the voice message, the electronic device 100 detects the input predefined gesture (for example, the user drags a progress bar), and may adjust playback progress.

In some embodiments, when the electronic device 100 detects the predefined gesture (for example, sliding inward from an upper right corner of the messages widget 608-1 or double tapping the widget) input on the messages application widget 608-1, the electronic device 100 may display a control (for example, at least one of a full-screen control, a delete control, a pin-to-top control, and the like) on the messages widget.

Figure 6F:
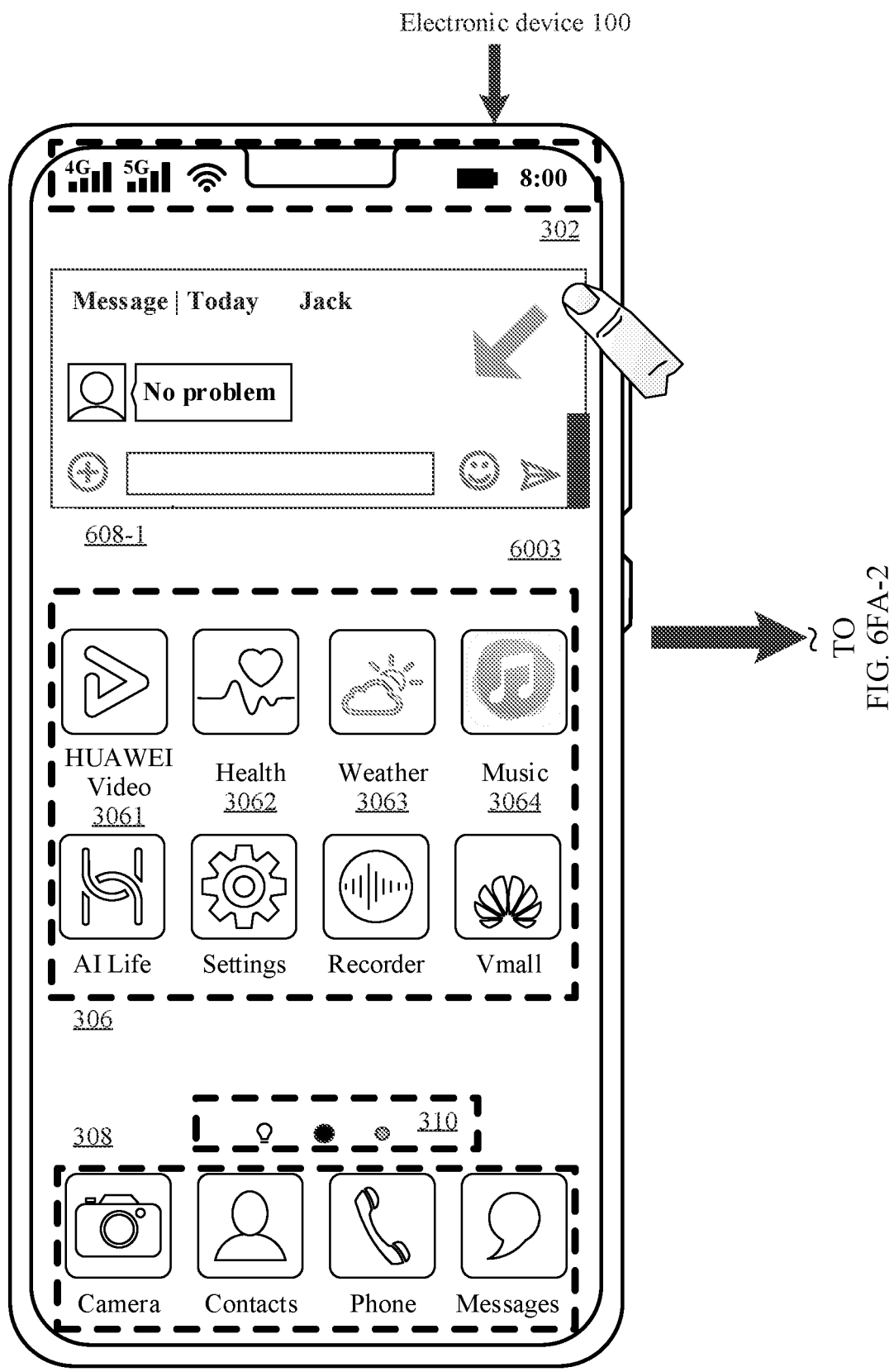
Figure 6F:
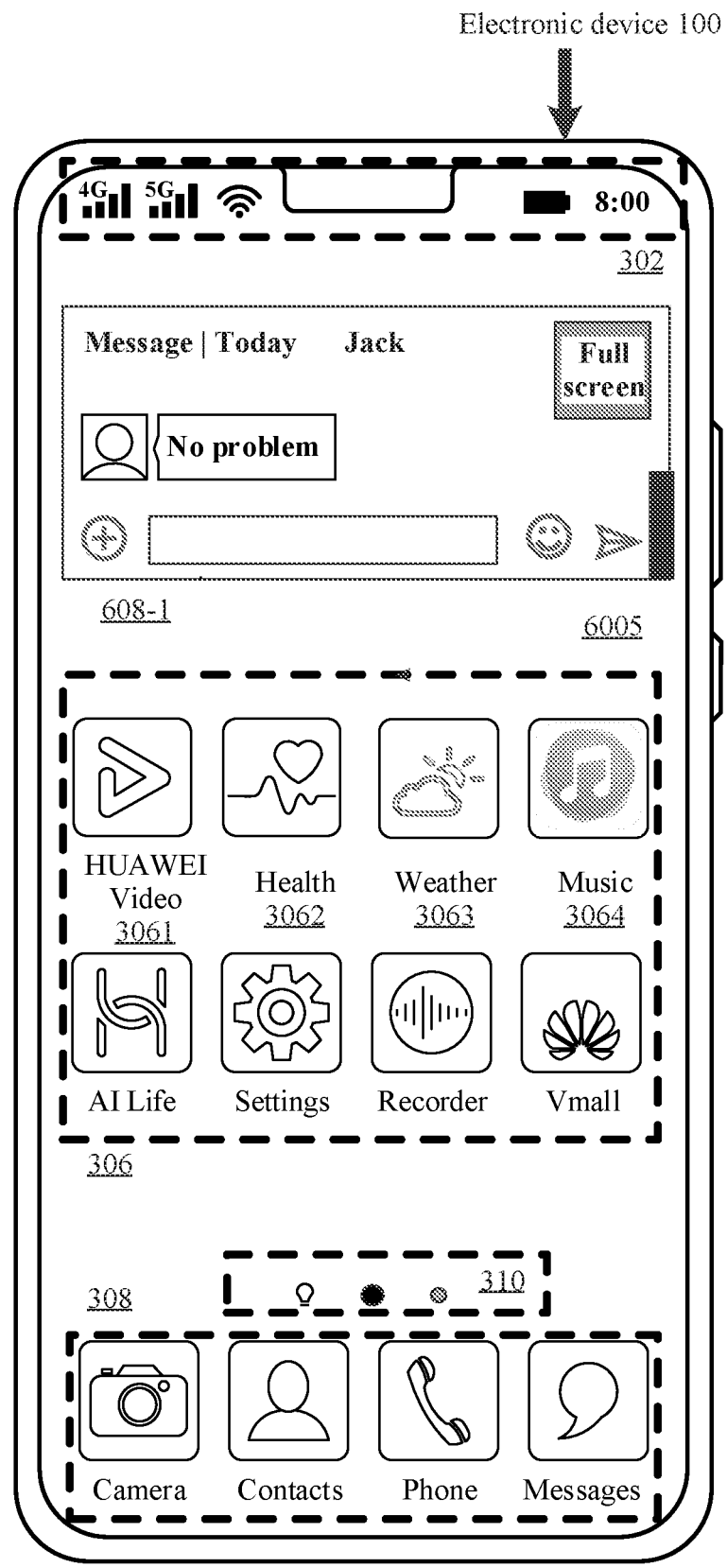
Figure 6F:
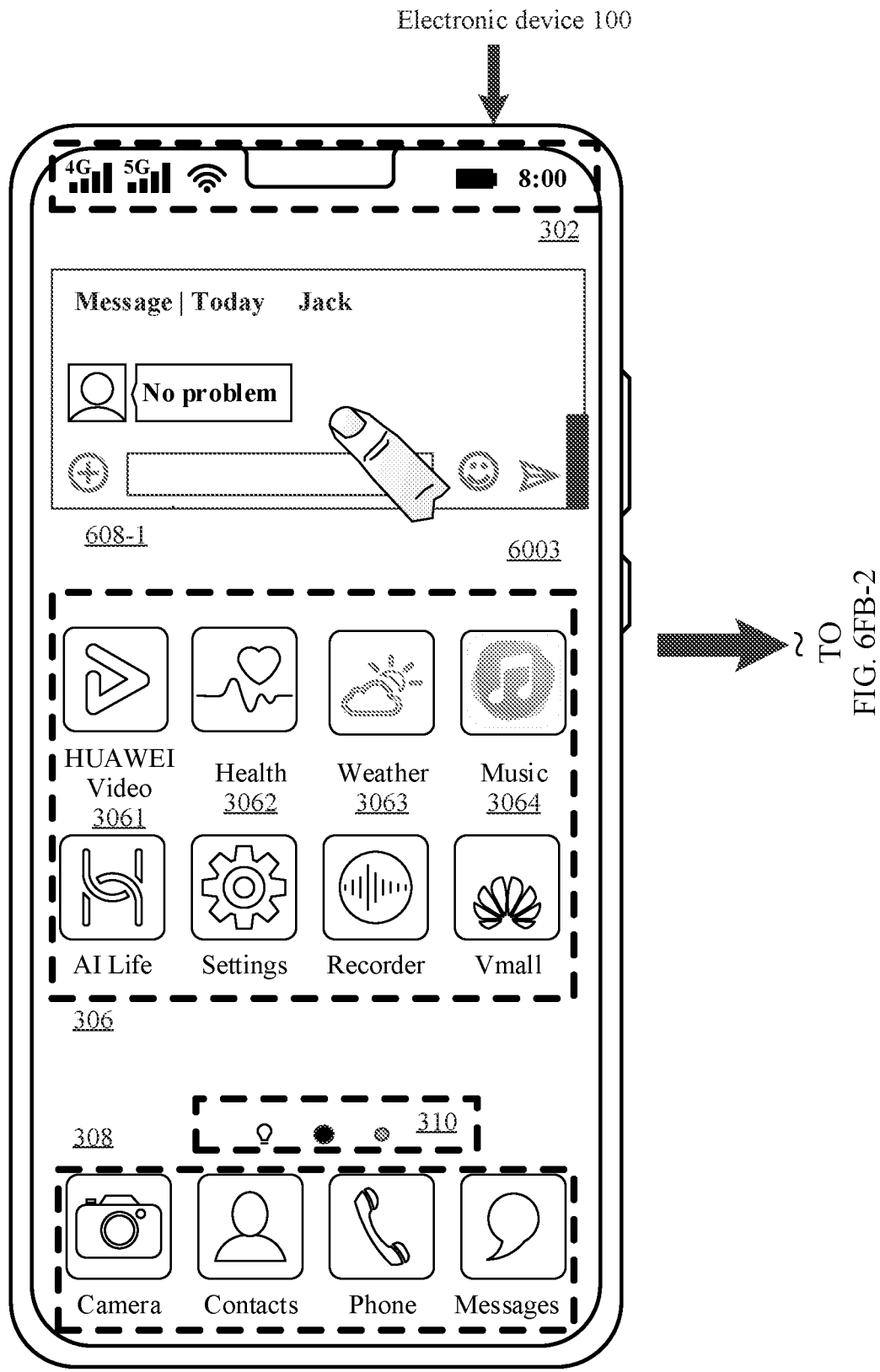
Figure 6F:
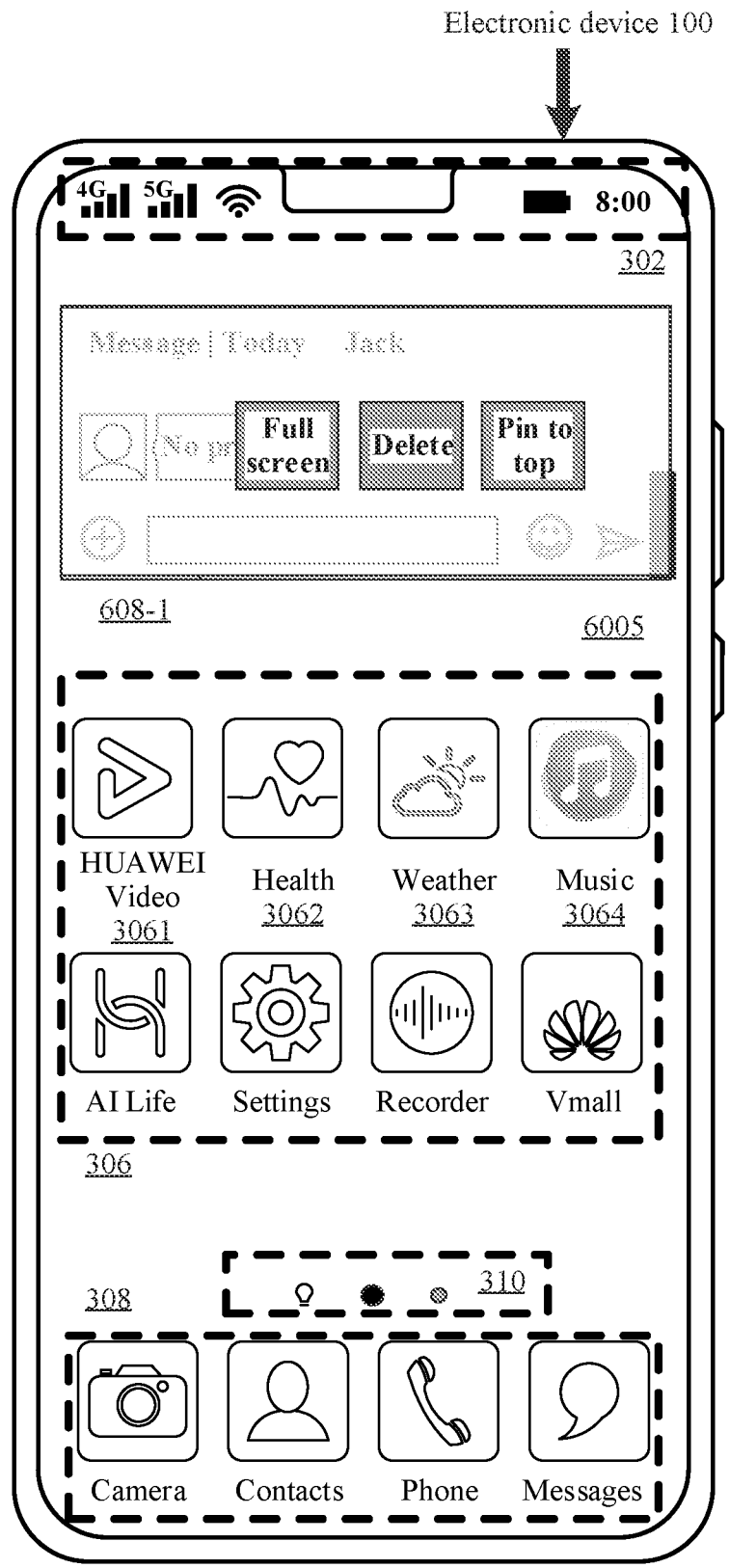
Figure 6G:

Optionally, the electronic device 100 may display the widget control on a corner of the widget, as shown in FIG. 6FA-1 and FIG. 6FA-2.

Optionally, after detecting the predefined gesture input on the messages widget 608-1, the electronic device 100 may set the widget to be displayed with specific transparency, and display the widget control on the widget, as shown in FIG. 6FB-1 and FIG. 6FB-2. It should be understood that FIG. 6FB-1 and FIG. 6FB-2 is merely an example for description, and a display location of the widget is not limited in this embodiment of this application.

The electronic device 100 displays the application widget 304-1 on the home screen, and after detecting the predefined input operation, the electronic device 100 displays the instant messaging application widget on the home page of the home screen. The content in FIG. 3FA-1 and FIG. 3FA-2 to FIG. 3FC-1 and FIG. 3FC-2 may be cited for the manner of displaying the instant messaging application widget on the home page of the home screen. Details are not described herein again.

In some embodiments, at least two application widgets are displayed on the home screen of the electronic device 100, and after detecting the predefined input operation, the electronic device 100 displays the instant messaging application widget on the home screen. The display manner of the media widget in FIG. 3L-1 and FIG. 3L-2 to FIG. 3M-1 and FIG. 3M-2 may be cited for the manner in which the electronic device 100 displays the instant messaging application widget on the home screen. Details are not described herein again.

In some embodiments, the electronic device 100 may display the instant messaging application widget on a lock screen interface after detecting the predefined input gesture of the user on the instant messaging application interface. The display manner of the instant messaging application widget on the home screen may be cited for the display manner of the instant messaging application widget on the lock screen page and beneficial effect. Details are not described herein again.

The manners of tapping the screen by the finger of the user in all the foregoing embodiments may be replaced with manners such as a stylus input, floating touch, and a voice input in some embodiments.

Figure 7:
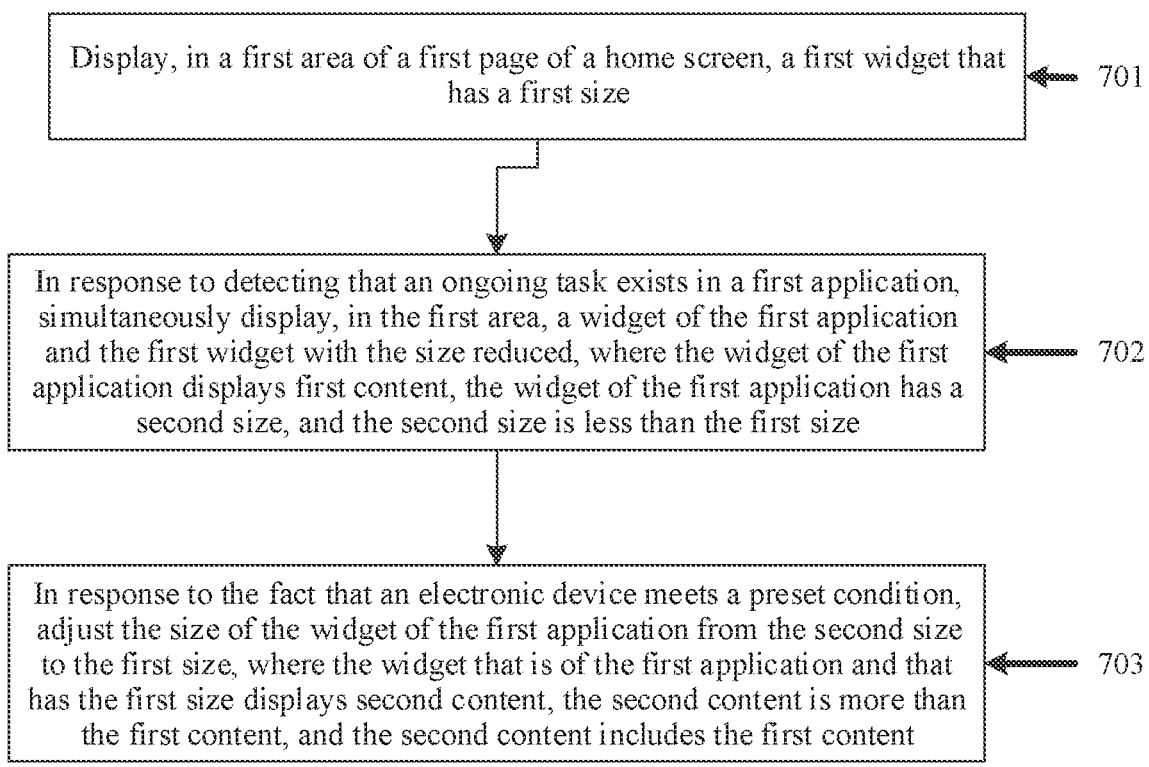
FIG. 7 is a schematic flowchart of a widget display method according to an embodiment of this application.

FIG. 7 is a schematic flowchart of some embodiments according to this application.

S701: Display, in a first area of a first page of a home screen, a first widget that has a first size.

For example, as shown in FIG. 3B, the electronic device 100 displays the time weather widget on the home screen.

S702: In response to detecting that an ongoing task exists in a first application, simultaneously display, in the first area, a widget of the first application and the first widget with the size reduced, where the widget of the first application displays first content, the widget of the first application has a second size, and the second size is less than the first size.

For example, as shown in FIG. 3FA-1 and FIG. 3FA-2, after detecting that the music playing control is activated (for example, the user taps the music playing control as shown in FIG. 3E-1 and FIG. 3E-2), the electronic device 100 displays the interface on which the music is being played. When there is the song being played in the music application, after the electronic device 100 detects the input predefined gesture (for example, making the upward slide gesture at the bottom of the screen), the electronic device 100 may switch to the home screen from the displayed music application interface GUI 3002. After the electronic device 100 switches to the home screen from the displayed music application interface GUI 3002, the home screen may simultaneously display the music widget 314-2 and the widget 304-2 (the application widget 304-1 with a size reduced).

For example, as shown in FIG. 5BA-1 and FIG. 5BA-2, if the electronic device 100 detects that the ticket itinerary information exists in the schedule content of the electronic device 100, the electronic device 100 identifies the ticket itinerary information (for example, the passenger, the departure station, the arrival station, the departure time, and the arrival time) in the schedule, and determines that the difference between the system time of 08:00 a.m. of the electronic device 100 and the departure time of 08:26 a.m. of the train is less than the time threshold, and/or the distance between the current geographical location of the electronic device 100 and the geographical location of the departure station Beijing of the train in the schedule content is less than the distance threshold. In this case, it is determined that the ticket itinerary of the schedule content is the ongoing task, and the electronic device 100 displays the schedule widget 502-2 and the time weather widget 304-2 on the home page of the home screen.

S703: In response to the fact that an electronic device meets a preset condition, adjust the size of the widget of the first application from the second size to the first size, where the widget that is of the first application and that has the first size displays second content, the second content is more than the first content, and the second content includes the first content.

It should be understood that, for all embodiments of this application, the electronic device 100 may detect the input predefined gesture, and change the order of the widgets displayed on the home screen or the lock screen interface. It should be understood that the widgets include all the widgets described in embodiments of this application. For example, as shown in FIG. 3G-1 to FIG. 3G-3, the electronic device 100 adjusts the display order of the time weather widget and the music widget after detecting the gesture operation of pressing the music widget and dragging the music widget to the right performed by the finger of the user.

It should be understood that, for all embodiments of this application, the electronic device 100 may detect the input predefined gesture, and adjust the sizes of the widgets displayed on the home screen or the lock screen interface and/or the content displayed by the widgets. It should be understood that the widgets include all the widgets described in embodiments of this application. In some embodiments, the electronic device 100 may detect the input predefined gesture, and change the layout of the content displayed by the widgets.

It should be understood that, for all embodiments of this application, the electronic device 100 may detect the scenario change (for example, the time difference between the system time of the electronic device 100 and the scenario time is less than the preset value of the time threshold, and/or the distance difference between the geographical location of the electronic device 100 and the scenario geographical location is less than the preset value of the distance threshold, to determine that the scenario changes), to adjust the sizes of the widgets displayed on the home screen page or the lock screen interface and/or the content displayed by the widgets, and/or the layout of the content displayed by the widgets. The related content in FIG. 3HB-1 and FIG. 3HB-2 may be cited for the specific method and beneficial effect. Details are not described herein again. It should be understood that, the widgets include all the widgets described in the embodiments of FIG. 3A to FIG. 3M-1 and FIG. 3M-2, the application widget described in the embodiments of FIG. 4A to FIG. 4F-1 and FIG. 4F-2, the schedule widget described in the embodiments of FIG. 5A to FIG. 5EC-1 and FIG. 5EC-2, and the instant messaging application widget described in the embodiments of FIG. 6A-1 and FIG. 6A-2 to FIG. 6G.

It should be understood that, for all embodiments of this application, the electronic device 100 may detect the input predefined gesture (for example, pinching, and two points of the pinching are respectively in contact with different widgets), and the electronic device 100 responds by combining two widgets (the two widgets are simultaneously on a same page, for example, the two widgets are simultaneously on the home page of the home screen) on the home screen or the lock screen interface into the composite widget. The content in FIG. 5C-1 and FIG. 5C-2 may be cited for the specific method. It should be understood that the widgets include all the widgets described in embodiments of this application.

It should be understood that, for all embodiments of this application, the electronic device 100 detects the input predefined gesture (for example, single-tap by the finger) when displaying the widget on the home screen. In this case, the electronic device 100 may display the application interface of the widget. The content in FIG. 4F-1 and FIG. 4F-2 may be cited for the specific method.

It should be understood that, for all embodiments of this application, when displaying the widget on the lock screen interface, the electronic device 100 detects the input predefined gesture (for example, single-tap by the finger), and an unlock request may be sent. When detecting an unlock operation entered by the user (for example, face recognition, touching and holding the icon 315 in FIG. 3A, or inputting a password), the electronic device 100 displays the application interface of the widget.

It should be further understood that "simultaneous display" in embodiments of this application is simultaneous result presentation instead of synchronization of a display process. For example, that both the music widget and the time weather widget are displayed on the home screen of the electronic device 100 is that the user can view the music widget and the time weather widget on the home screen of the electronic device 100 at a same moment, but not that the music widget and the time weather widget appear on the home screen of the electronic device 100 at a same moment.

It may be understood that, to implement the foregoing functions, the electronic device includes corresponding hardware and/or software modules for performing the functions. With reference to the example algorithm steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments, division into the modules is an example, is merely logical function division, and may be other division in an actual implementation.

When an integrated unit is used, the electronic device may include a processing module, a storage module, and a communication module. The processing module may be configured to control and manage actions of the electronic device, for example, may be configured to support the electronic device in performing the steps performed by the receiving unit, the detection unit, and the display unit. The storage module may be configured to support the electronic device in storing program code, data, and the like. The communication module may be configured to support communication between the electronic device and another device.

The processing module may be a processor or a controller. The processing module may implement or execute various example logical blocks, modules, and circuits described with reference to content disclosed in this application. Alternatively, the processor may be a combination implementing a computing function, for example, a combination of one or more microprocessors, a combination of a digital signal processor (digital signal processor, DSP) and a microprocessor, or the like. The storage module may be a memory. The communication module may be specifically a device, for example, a radio frequency circuit, a Bluetooth chip, a Wi-Fi chip, or the like that interacts with another electronic device.

In an embodiment, when the processing module is a processor and the storage module is a memory, the electronic device in embodiments may be a device with the structure shown in FIG. 1.

An embodiment further provides a computer storage medium. The computer storage medium stores computer instructions. When the computer instructions are run on an electronic device, the electronic device is enabled to perform the related method steps, to implement the widget display method in the foregoing embodiments.

An embodiment further provides a computer program product. When the computer program product runs on a computer, the computer is enabled to perform the related steps, to implement the widget display method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the widget display method in the foregoing method embodiments.

The electronic device, the computer storage medium, the computer program product, or the chip provided in embodiments is configured to perform the corresponding method provided above. Therefore, for beneficial effect that can be achieved by the electronic device, the computer storage medium, the computer program product, and the chip, refer to the beneficial effect in the corresponding method provided above. Details are not described herein again.

Based on the descriptions of the foregoing implementations, a person skilled in the art may understand that, for the purpose of convenient and brief description, division into the foregoing functional modules is merely used as an example for description. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A widget display method applied to an electronic device, wherein the method comprises:
    displaying, in a first area of a first page of a home screen, a first widget that has a first size;
    detecting that an ongoing task exists in a first application;
    in response to the detecting that the ongoing task exists in the first application, simultaneously displaying, in the first area, the first widget with a reduced size and a widget of the first application with a second size, wherein the widget of the first application displays first content, and the second size of the widget of the first application is less than the first size;
    detecting that the electronic device meets a preset condition; and
    in response to the detecting that the electronic device meets the preset condition, enlarging the size of the widget of the first application and stopping displaying the first widget.

2. The method according to claim 1, wherein the enlarged widget of the first application displays more content than the first content.

3. The method according to claim 1, wherein the enlarging the size of the widget of the first application comprises: enlarging the size of the widget of the first application from the second size to the first size.

4. The method according to claim 1, wherein when the widget of the first application and the first widget with the reduced size are simultaneously displayed, the method further comprises:
    detecting that an ongoing task exists in a second application; and
    in response to the detecting that the ongoing task exists in the second application, stopping displaying the first widget, and simultaneously displaying the widget of the first application and a widget of the second application in the first area.

5. The method according to claim 4, wherein the method further comprises:
    determining that the priority of the widget of the second application is higher than at least one of the first widget and the widget of the first application.

6. The method according to claim 1, wherein the first application is a schedule application, and the detecting that the ongoing task exists in the first application comprises at least one of the following:
    determining, by identifying schedule content in the schedule application, that a time difference between system time of the electronic device and time in the schedule content is less than a first time threshold; or
    determining, by identifying schedule content in the schedule application, that a distance difference between a geographical location of the electronic device and a geographical location in the schedule content is less than a first distance threshold.

7. The method according to claim 6, wherein the preset condition comprises at least one of the following conditions:
    determining that the time difference between the system time of the electronic device and the time in the schedule content is less than a second time threshold, wherein the second time threshold is less than the first time threshold; or
    determining that the distance difference between the geographical location of the electronic device and the geographical location in the schedule content is less than a second distance threshold, wherein the second distance threshold is less than the first distance threshold.

8. The method according to claim 1, wherein when the widget of the first application and the first widget with the reduced size are simultaneously displayed, the method further comprises:
    detecting a pinch gesture, wherein a first contact point of the pinch gesture is in contact with the widget of the first application, and a second contact point of the pinch gesture is in contact with the first widget; and
    in response to the pinch gesture, combining the widget of the first application and the first widget into a first composite widget for displaying in the first area.

9. The method according to claim 1, wherein the method further comprises:
    detecting that the system time of the electronic device exceeds an end time in the schedule content; and
    in response to the detecting that the system time of the electronic device exceeds the end time in the schedule content, stopping displaying the widget of the first application, and displaying, in the first area, the first widget that has the first size.

10. The method according to claim 1, wherein the detecting that the ongoing task exists in the first application further comprises:
    detecting, by using a broadcast receiver component, that the ongoing task exists in the first application.

11. The method according to claim 1, wherein the detecting that the ongoing task exists in the first application further comprises:
    detecting, by using a service component in the first application, that the ongoing task exists in the first application.

12. The method according to claim 1, wherein the detecting that the ongoing task exists in the first application further comprises:
    detecting that the ongoing task of the first application with a same user account logged-on exists on another electronic device; or
    after the electronic device is paired with another electronic device, detecting that the ongoing task of the first application exists on another electronic device.

13. The method according to claim 1, wherein the first area is above the first page.

14. The method according to claim 1, wherein the ongoing task is playing music.

15. An electronic device, comprising:
    a display, a memory, and one or more processors, wherein the memory comprises instructions, and when the instructions are executed by the one or more processors, the electronic device is enabled to perform:
    displaying, in a first area of a first page of a home screen, a first widget that has a first size;
    detecting that an ongoing task exists in a first application;
    in response to the detecting that the ongoing task exists in the first application, simultaneously displaying, in the first area, the first widget with a reduced size and a widget of the first application with a second size, wherein the widget of the first application displays first content, and the second size of the widget of the first application is less than the first size;

detecting that the electronic device meets a preset condition; and in response to the detecting that the electronic device meets the preset condition, enlarging the size of the widget of the first application and stopping displaying the first widget.

16. The electronic device according to claim 15, wherein the enlarged widget of the first application displays more content than the first content.

17. The electronic device according to claim 15, wherein the enlarging the size of the widget of the first application comprises: enlarging the size of the widget of the first application from the second size to the first size.

18. The electronic device according to claim 15, wherein when the widget of the first application and the first widget with the reduced size are simultaneously displayed, the instructions are executed by the one or more processors, the electronic device is further enabled to perform:

detecting that an ongoing task exists in a second application; and in response to the detecting that the ongoing task exists in the second application, stopping displaying the first widget, and simultaneously displaying the widget of the first application and a widget of the second application in the first area.

19. The electronic device according to claim 18, wherein the instructions are executed by the one or more processors, the electronic device is further enabled to perform:

determining that the priority of the widget of the second application is higher than at least one of the first widget and the widget of the first application.

20. The electronic device according to claim 15, wherein the first area is above the first page.

* * * * *